US006953642B2

(12) United States Patent
Yamamoto et al.

(10) Patent No.: US 6,953,642 B2
(45) Date of Patent: Oct. 11, 2005

(54) ION CONDUCTOR STRUCTURAL BODY, PROCESS FOR PRODUCING SAID ION CONDUCTOR STRUCTURAL BODY, RECHARGEABLE BATTERY PROVIDED WITH SAID ION CONDUCTOR STRUCTURAL BODY AND PROCESS FOR PRODUCING SAID RECHARGEABLE BATTERY

(75) Inventors: Tomoya Yamamoto, Nara (JP); Soichiro Kawakami, Nara (JP); Toshifumi Akasaka, Kyoto (JP)

(73) Assignee: Canon Kabushiki Kaisha, Tokyo (JP)

( * ) Notice: Subject to any disclaimer, the term of this patent is extended or adjusted under 35 U.S.C. 154(b) by 490 days.

(21) Appl. No.: 10/023,930

(22) Filed: Dec. 21, 2001

(65) Prior Publication Data

US 2002/0132169 A1 Sep. 19, 2002

(30) Foreign Application Priority Data

Dec. 21, 2000 (JP) .................................. 2000-388370
Dec. 20, 2001 (JP) .................................. 2001-387423

(51) Int. Cl.$^7$ .............................................. H01M 6/18
(52) U.S. Cl. ................ 429/317; 429/307; 29/623.1; 252/62.2
(58) Field of Search ................. 429/317, 314, 429/307, 231.95; 29/623.1; 252/62.2

(56) References Cited

U.S. PATENT DOCUMENTS

| | | | |
|---|---|---|---|
| 5,275,750 A | 1/1994 | Sato et al. ................ 252/62.2 |
| 5,521,229 A | 5/1996 | Lu et al. ..................... 522/40 |
| 5,585,039 A | 12/1996 | Matsumoto et al. ........ 252/500 |
| 5,609,974 A | 3/1997 | Sun ............................ 429/192 |
| 5,645,960 A | * 7/1997 | Scrosati et al. ............ 429/317 |
| 5,837,157 A | 11/1998 | Kohjiya et al. ........... 252/62.2 |
| 5,897,974 A | 4/1999 | LaFleur ..................... 429/192 |

FOREIGN PATENT DOCUMENTS

| | | |
|---|---|---|
| EP | 0 948 074 | 10/1999 |
| JP | 5-25353 | 2/1993 |

(Continued)

OTHER PUBLICATIONS

A.N. Dey et al., "The Electrochemical Decomposition of Propylene Carbonate on Graphite," 117(2) *J. Electrochem. Soc.* 222–224 (1970).

*Primary Examiner*—Laura Weiner
(74) *Attorney, Agent, or Firm*—Fitzpatrick, Cella, Harper & Scinto

(57) ABSTRACT

An ion conductor structural body principally comprising (a) a polymer matrix, (b) a solvent capable of functioning as a plasticizer and (c) an electrolyte, wherein said polymer matrix (a) comprises a polymer chain having at least a segment represented by the following general formula (1), a main chain portion of said polymer chain and a side chain portion of said segment have an orientation property, and said polymer matrix has a crosslinked structure.

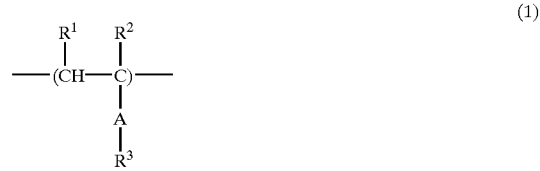

(1)

(wherein $R^1$ and $R^2$ are respectively H or an alkyl group of 2 or less carbon atoms, A is a group having at least a polyether group, and $R^3$ is a group having at least a alkyl group of more than 6 carbon atoms.)

7 Claims, 11 Drawing Sheets

FOREIGN PATENT DOCUMENTS

| | | |
|---|---|---|
| JP | 5-299119 | 11/1993 |
| JP | 5-303905 | 11/1993 |
| JP | 7-224105 | 8/1995 |
| JP | 9-324114 | 12/1997 |
| JP | 10-106345 | 4/1998 |
| JP | 11-302410 | 11/1999 |
| JP | 11-345629 | 12/1999 |
| JP | 2000-119420 | 4/2000 |
| JP | 3045120 | 5/2000 |
| JP | 2000-212305 | 8/2000 |
| JP | 2000285751 | * 10/2000 |

* cited by examiner

F I G. 1(a)
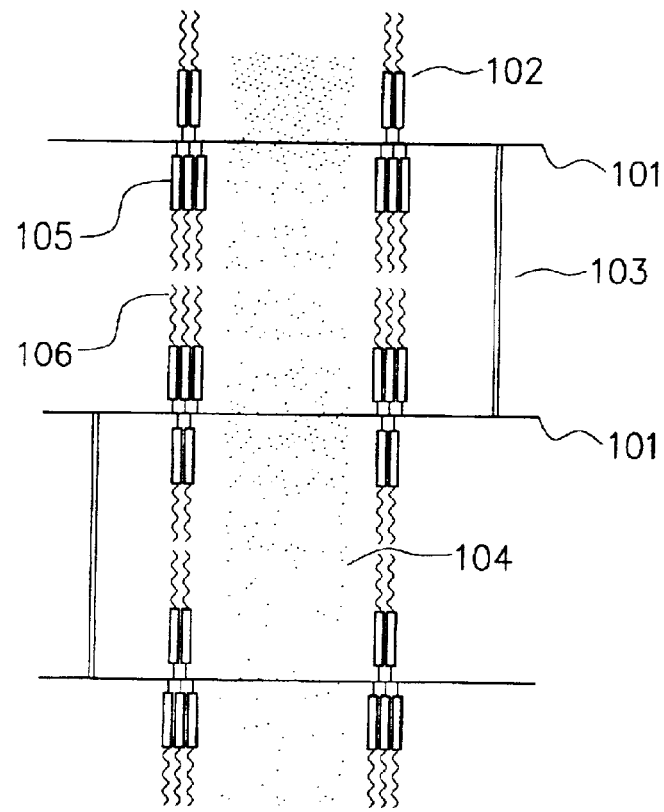
F I G. 1(b)
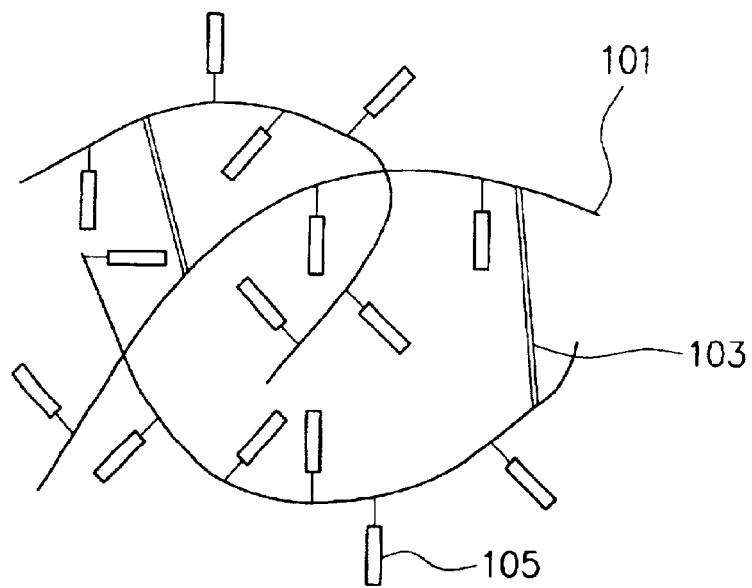

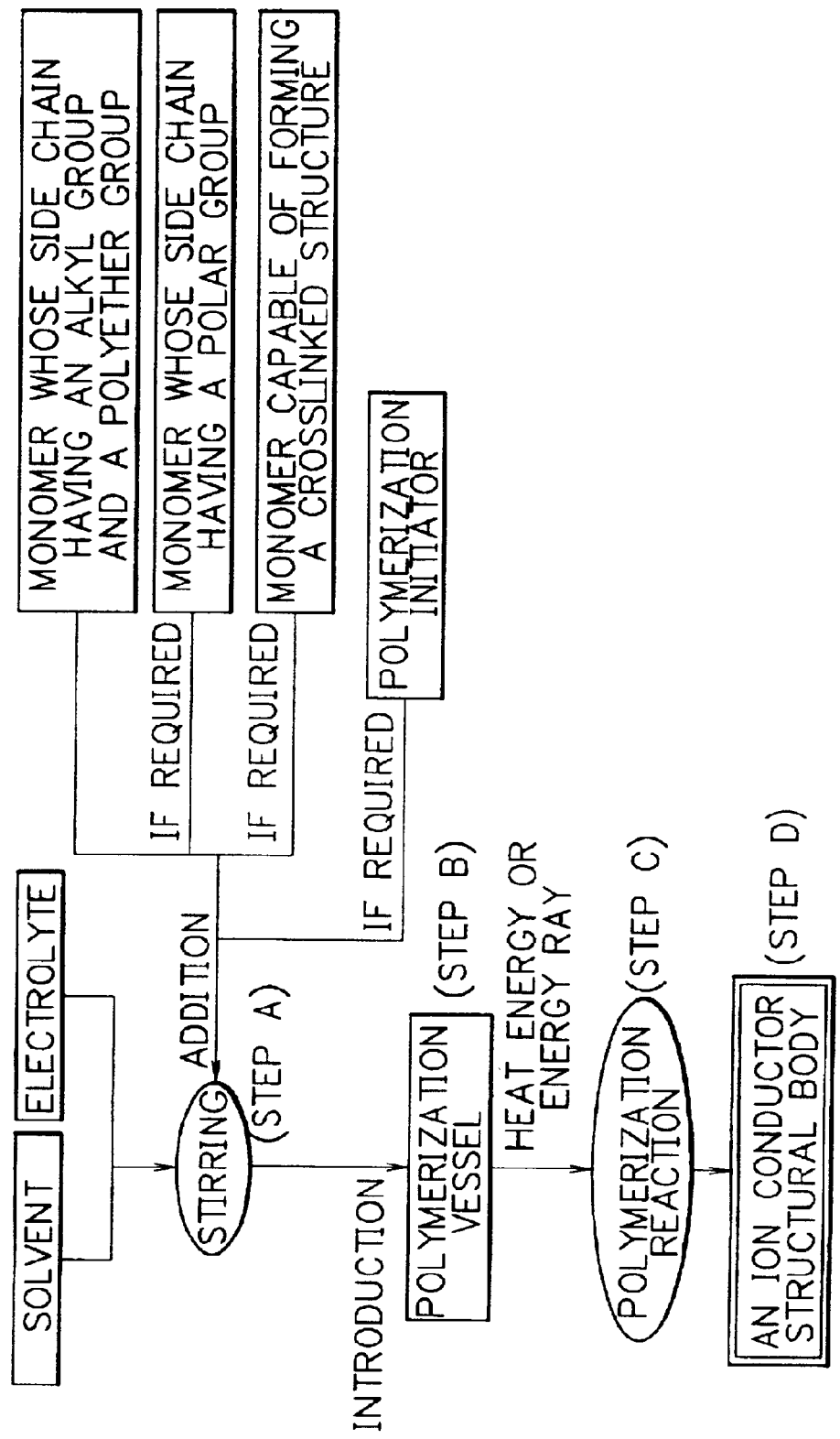

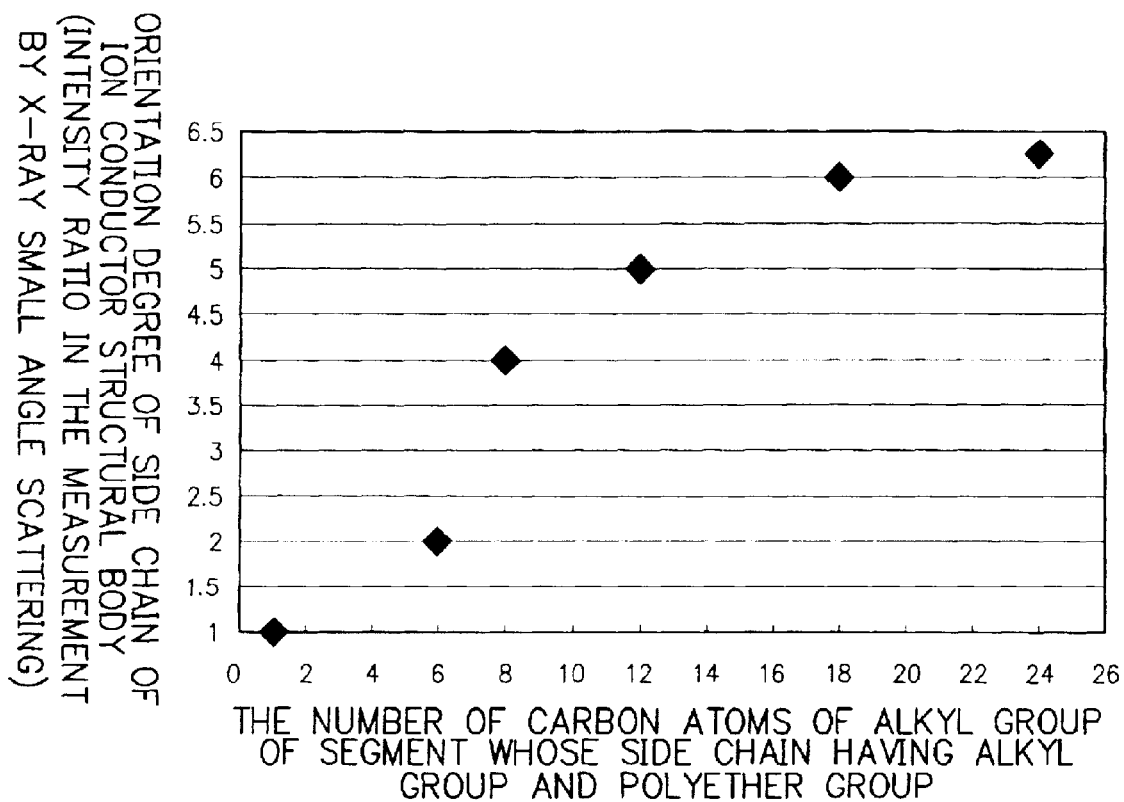
F I G. 8

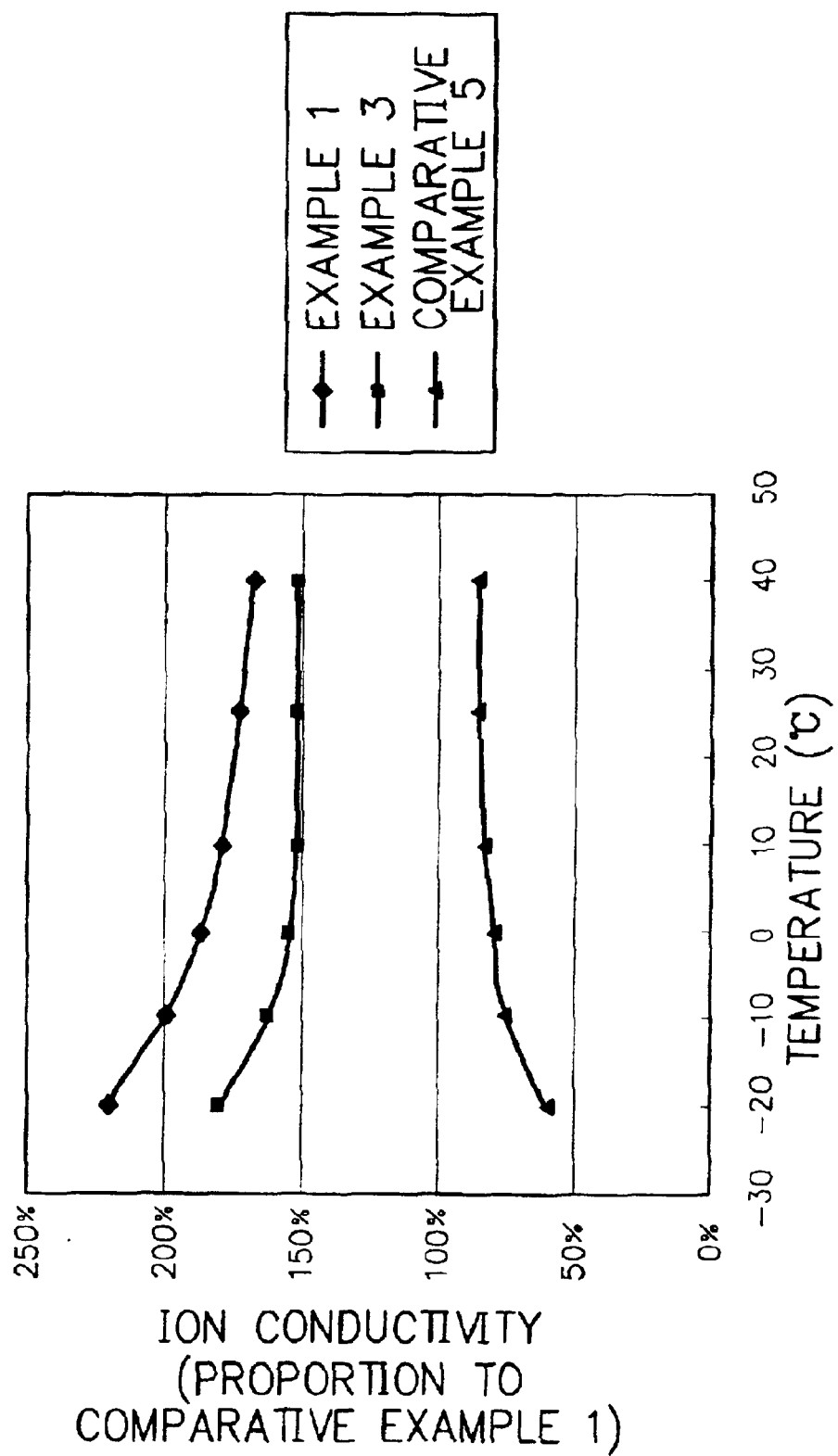

ION CONDUCTOR STRUCTURAL BODY, PROCESS FOR PRODUCING SAID ION CONDUCTOR STRUCTURAL BODY, RECHARGEABLE BATTERY PROVIDED WITH SAID ION CONDUCTOR STRUCTURAL BODY AND PROCESS FOR PRODUCING SAID RECHARGEABLE BATTERY

BACKGROUND OF THE INVENTION

1. Field of the Invention

The present invention relates to an ion conductor structural body, a process for producing said ion conductor structural body, a rechargeable battery provided with said ion conductor structural body, and a process for producing said rechargeable battery. More particularly, the present invention relates to an ion conductor structural body having a high ion conductivity, a process for producing said ion conductor structural body, a rechargeable battery provided with said ion conductor structural body and which exhibits an improved charge-and-discharge efficiency, and a process for producing said rechargeable battery.

2. Prior Art

In recent years, the global warming of the earth because of the so-called greenhouse effect to an increase in the content of $CO_2$ gas in the air has been predicted. For instance, in thermal electric power plants, thermal energy obtained by burning a fossil fuel is converted into electric energy, and along with burning of such fossil fuel, a large amount of $CO_2$ gas is exhausted in the air. Accordingly, in order to suppress this situation, there is a tendency of prohibiting to newly establish a thermal electric power plant. Under these circumstances, so-called load leveling practice has been proposed in order to effectively utilize electric powers generated by power generators in thermal electric power plants or the like, wherein a surplus power unused in the night is stored in rechargeable batteries installed at general houses and the power thus stored is used in the daytime when the demand for power is increased, whereby the power consumption is leveled.

Now, for electric vehicles which do not exhaust any air-polluting substances such as $CO_2$, $NO_x$, hydrocarbons and the like, there is an increased demand for developing a high performance rechargeable battery with a high energy density which can be effectively used therein. Besides, there is also an increased demand for developing a miniature, lightweight, high performance rechargeable battery usable as a power source for portable instruments such as small personal computers, word processors, video cameras, and cellular phones.

Since the use of a lithium-graphite intercalation compound as an anode of a rechargeable battery has reported in JOURNAL OF THE ELECTROCHEMICAL SOCIETY vol.117, No.2, p. 222–224 (1970), as such miniature, lightweight and high performance rechargeable battery, development has been proceeded of rocking chair type lithium ion batteries (which are so-called lithium-ion batteries) in which, for instance, a carbonous material such as graphite is used as an anode active material and an intercalation compound incorporating a lithium ion is used as a cathode active material, wherein lithium is stored in the carbonous material as the anode active material by intercalating said lithium at intercalation sites in the carbonous material in the battery reaction upon charging. Some of these lithium-ion batteries have been put to practical use. In these lithium-ion batteries, by using the carbonous material as a host material capable of intercalating lithium as a guest material at the intercalation sites as the anode, occurrence or growth of a lithium dendrite upon charging is prevented to achieve a desired charge-and-discharge cycle life.

However, in such rechargeable battery in which the battery reaction (the charge-and-discharge reaction) by virtue of lithium ion is used, an organic solvent is usually used as the solvent of the electrolyte solution, wherein when the rechargeable battery is over-charged, there is a tendency in that the organic solvent is decomposed to produce carbon dioxide, hydrocarbons, and the like which are never recombined into the original solvent. Because of this, there is a fear that the electrolyte solution is deteriorated to increase the internal impedance of the rechargeable battery. Besides, when the rechargeable battery is over-charged, there will be an occasion in that internal-shorts between the anode and the cathode are occurred to generate heat and along the heat generation, decomposition of the electrolyte solution is rapidly progressed, resulting in a reduction in the performance of the rechargeable battery.

In order to solve the problems relating to the decomposition or the deterioration of the electrolyte solution of the rechargeable battery in which the charge-and-discharge reaction by virtue of lithium ion is used, U.S. Pat. No. 5,609,974 (hereinafter referred to as Document 1) proposes use of an ion conductor structural body obtained by copolymerizing a diacrylate series monomer, a monoacrylate series monomer and a carbonate group-bearing acrylate series monomer in the presence of an organic solvent and a retaining electrolyte. Besides, Japanese Unexamined Patent Publication No. 25353/1993 (hereinafter referred to as Document 2) proposes use of an ion conductor structural body in which a polymer matrix obtained by copolymerizing a diacrylate series monomer, a monoacrylate series monomer and a vinylene carbonate is used, aiming at preventing leakage of the electrolyte solution of the rechargeable battery. However, any of the ion conductor structural bodies disclosed in Documents 1 and has a problem such that the ion conductivity thereof is less than ¼ of that of the electrolyte solution and therefore, when used in the rechargeable battery, it is difficult to achieve a desirably high energy density for the rechargeable battery. Separately, the results of experimental studies by the inventors of the present invention have revealed a fact that it is difficult to obtain an ion conductor structural body which has a necessary strength upon the production or use of a rechargeable battery in accordance with the technique described in Document 1 or 2 and the ion conductor structural body has an ion conductivity which is greatly decreased at low temperature which is lower than ordinary temperature, resulting in a sudden reduction in the energy density of the rechargeable battery.

Japanese Unexamined Patent Publication No. 95403/1995 (hereinafter referred to as Document 3) discloses an ion conductor structural body comprising a polymer matrix which is two-dimensionally crosslinked using a lipid, which is used in the rechargeable battery. Japanese Unexamined Patent Publication No. 224105/1995 (hereinafter referred to as Document 4) discloses an ion conductor structural body having a double continuous structure in which a hydrophilic polymer phase and a hydrophobic polymer phase are continued using a surface active agent, which is used in the rechargeable battery. However, in any of the techniques disclosed in Documents 3 and 4, there is a disadvantage in such that the lipid or the surface active agent is difficult to be completely removed in the washing process upon the preparation of the ion conductor structural body and the residual lipid or surface active agent results in deteriorating the charge-and-discharge cycle life of the rechargeable battery. There is also a disadvantage such that because the lipid or the surface active agent which are not connected with the polymer matrix is contained as above described, it is difficult to achieve a necessary mechanical strength for the ion conductor structural body upon the preparation thereof. Further, there is a disadvantage such that the removal of the lipid or the surface active agent in the washing process forms air gaps in the structure, resulting in a reduction in the mechanical strength of the ion conductor structural body.

In order to improve such shortcomings relating to the mechanical strength of the ion conductor structural body, Japanese Unexamined Patent Publication No. 299119/1993 (hereinafter referred to as Document 5) discloses an ion conductor structural body comprising a polymer phase having a high polarity and a polymer phase having a low polarity as a retaining phase. However, the ion conductor structural body disclosed in Document 5 has a disadvantage such that the low polarity polymer phase does not function as an ion conductor phase and because of this, the ion conductivity is insufficient. Besides, Japanese Patent Publication No. 3045120 (hereinafter referred to as Document 6) discloses an ion conductor structural body in which an alkylene oxide derivative having a substituent group comprising a liquid crystalline compound is used. Japanese Unexamined Patent Publication No. 303905/1993 (hereinafter referred to as Document 7) discloses an ion conductor structural body in which a polymer matrix obtained by curing a polyether group-bearing monomer is used. However, any one of the ion conductor structural bodies disclosed in Documents 6 and 7 has a disadvantage such that because the polymer matrix structure is irregular, the ion dispersing property is inferior and the ion conductivity is insufficient. Further, Japanese Unexamined Patent Publication No. 324114/1997 (hereinafter referred to as Document 8) and Japanese Unexamined Patent Publication No. 106345/1998 (hereinafter referred to as Document 9) disclose ion conductor structural bodies comprising a polymer matrix in which a polymer whose glass transition temperature is low is used. However, these ion conductor structural bodies disclosed in Documents 8 and 9 have disadvantages as described in the following. That is, the polymer chain of the polymer matrix is likely to be softened and because of this, the mechanical strength of the ion conductor structural body is insufficient. In Documents 8 and 9, it is described that a plasticizer is not necessary to be used. However, in accordance with the techniques described in Documents 8 and 9 except for using a plasticizer, the present inventors prepared a gel-like ion conductor structural body comprising a polymer matrix in which a plasticizer is used and an evaluation was conducted. As a result, it was found that the softening temperature of the polymer matrix is lowered due to the plasticizer. In addition, the rechargeable battery in which such gel ion conductor structural body is used was found to have a disadvantage in that when the battery temperature is increased, the anode and the cathode begin to suffer from internal shorts between them.

Separately, Japanese Unexamined Patent Publication No. 302410/1999(hereinafter referred to as Document 10), Japanese Unexamined Patent Publication No. 2000-119420 (hereinafter referred to as Document 11), and Japanese Unexamined Patent Publication No. 2000-212305 (hereinafter referred to as Document 12) disclose orientation type ion exchange films comprising a specific monomer structure. Any of the orientation type ion exchange films disclosed in Documents 10 to 12 provides effects as desired unless a plasticizer is contained therein. However, any of the techniques disclosed in Documents 10 to 12 is insufficient in order to form a polymer matrix structure having a regularity suitable for use in an ion conductor structural body in which use of a plasticizer such as a solvent is essential. Thus, it is difficult to achieve an ion conductor structural body having a high ion conductivity.

Incidentally, Japanese Unexamined Patent Publication No. 345629/1999 discloses a rechargeable battery having a prolonged charge-and-discharge cycle life in which an ion channel is orientated. In order to more improve the characteristics of the rechargeable battery, it is necessary to provide an ion conductor structural body having a high ion conductivity and an excellent mechanical strength.

SUMMARY OF THE INVENTION

The present invention has been accomplished in view of the foregoing situation in the prior art for the ion conductor structural body.

An object of the present invention is to provide an improved ion conductor structural body having a high ion conductivity and an excellent mechanical strength.

Another object of the present invention is to provide a process for producing said ion conductor structural body by a relatively simple manner at a reasonable production cost.

A further object of the present invention is to provide a high performance rechargeable battery provided with aforesaid ion conductor structural body and which has a high capacity and a prolonged charge-and-discharge cycle life.

A further object of the present invention is to provide a process for producing said rechargeable battery.

A typical embodiment of the ion conductor structural body of the present invention principally comprises (a) a polymer matrix, (b) a solvent capable of functioning as a plasticizer and (c) an electrolyte, characterized in that said polymer matrix comprises a polymer chain having at least a segment represented by the following general formula (1), a main chain portion of said polymer chain and a side chain portion of said segment have an orientation property, and said polymer matrix has a crosslinked structure.

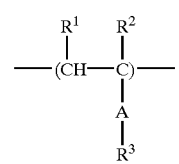

(wherein $R^1$ and $R^2$ are respectively H or an alkyl group of 2 or less carbon atoms, A is a group having at least a polyether group, and $R^3$ is a group having at least a alkyl group of more than 6 carbon atoms.)

A typical embodiment of the rechargeable battery of the present invention comprises (a) an anode, (b) a cathode and (c) an ion conductor structural body provided between said anode and said cathode, said anode having a face which is opposed to a face of said cathode, characterized in that said ion conductor structural body (c) comprises aforesaid ion conductor structural body, and the ion conductor structural body is arranged such that an ion conductivity in a direction of connecting said face of said anode (a) and said face of said cathode (b) is increased.

BRIEF DESCRIPTION OF THE DRAWINGS

FIG. 1(a) and FIG. 1(b) are schematic views for explaining of a polymer structure in an ion conductor structural body according to the present invention.

FIG. 2 is a schematic flow chart for explaining an embodiment of a process for producing an ion conductor structural body in the present invention.

FIG. 8 shows a graph showing correlations between the number of carbon atom(s) of an alkyl group of a segment whose side chain having said alkyl group and a polyether group which constitute an ion conductor structural body and orientation properties of said ion conductor structural body in the present invention.

FIG. 11 collectively shows a graph showing correlations between temperatures and ion conductivities of an ion conductor structural body obtained in Example 1 which will be described later, a graph showing correlations between temperatures and ion conductivities of an ion conductor structural body obtained in Example 3 which will be described later, and a graph showing correlations between temperatures and ion conductivities of an ion conductor structural body obtained in Comparative Example 5 which will be described later.

DESCRIPTION OF THE INVENTION AND PREFERRED EMBODIMENTS

Figure 3:
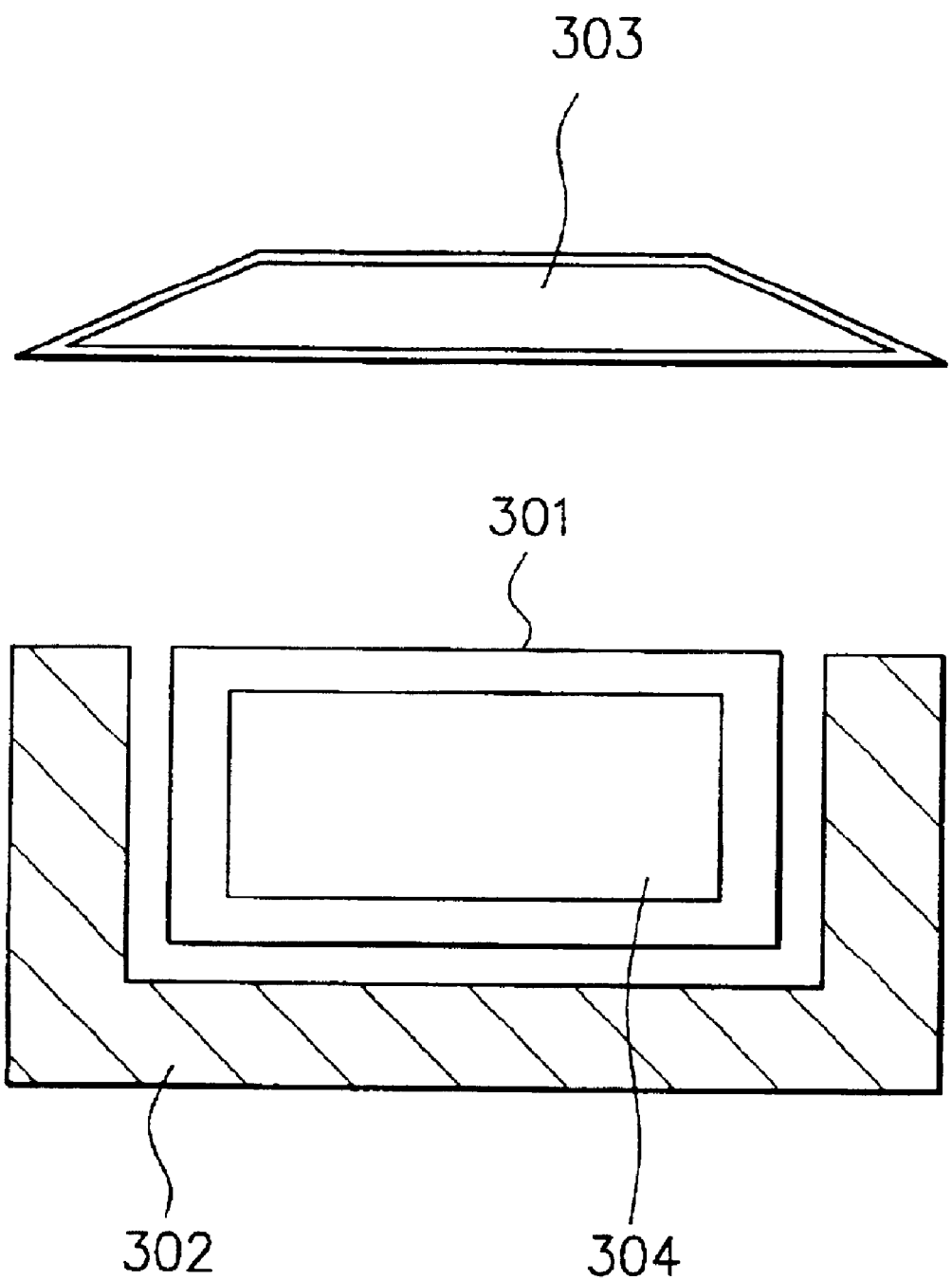
FIG. 3 is a schematic diagram illustrating an example of a polymerization apparatus used in the process shown in FIG. 2.

As previously described, the present invention provides an ion conductor structural body having a high ion conductivity and an excellent mechanical strength, principally comprising (a) a polymer matrix, (b) a solvent capable of functioning as a plasticizer and (c) an electrolyte, wherein said polymer matrix (a) comprises a polymer chain having at least a segment represented by the following general formula (1), a main chain portion of said polymer chain and a side chain portion of said segment have an orientation property, and said polymer matrix has a crosslinked structure.

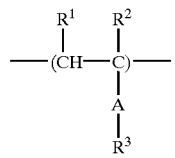

(wherein $R^1$ and $R^2$ are respectively H or an alkyl group of 2 or less carbon atoms, A is a group having at least a polyether group, and $R^3$ is a group having at least a alkyl group of more than 6 carbon atoms.)

The present invention provides a process for producing aforesaid ion conductor structural body, typically comprising a step of mixing a prescribed monomer capable of forming aforesaid polymer matrix by way of polymerization, a solvent capable of functioning as a plasticizer and an electrolyte to obtain a mixture, and a step of subjecting said mixture to a polymerization treatment, if necessary further to a crosslinking treatment.

The present invention provide a high performance rechargeable battery which has a high capacity and a prolonged charge-and-discharge cycle life, comprising (a) an anode, (b) a cathode and (c) an ion conductor structural body provided between said anode and said cathode, said anode having a face which is opposed to a face of said cathode, wherein said ion conductor structural body (a) comprises aforesaid ion conductor structural body of the present invention, and the ion conductor structural body is arranged such that an ion conductivity in a direction of connecting said face of said anode (a) and said face of said cathode (b) is increased.

The present invention provides a process for producing a rechargeable battery comprising (a) an anode, (b) a cathode and (c) an ion conductor structural body provided between said anode and said cathode, said anode having a face which is opposed to a face of said cathode, said process is characterized by including a first step of producing an ion conductor structural body in accordance with the foregoing process for the production of the ion conductor structural body and a second step of arranging the ion conductor structural body obtained in the first step as said ion conductor structural body (c) such that an ion conductivity in a direction of connecting said face of said anode (a) and said face of said cathode (b) is increased.

In the following, the present invention will be detailed.

As previously described, the ion conductor structural body of the present invention principally comprises (a) a polymer matrix, (b) a solvent capable of functioning as a plasticizer and (c) an electrolyte, wherein said polymer matrix (a) comprises a polymer chain having at least a segment represented by the foregoing general formula (1), a main chain portion of said polymer chain and a side chain portion of said segment have an orientation property, and said polymer matrix has a crosslinked structure.

Detailed description will be made of the polymer matrix (a).

It is preferred that the side chain portion of the segment [the foregoing general formula (1)] of the polymer chain of the polymer matrix (a) has an orientation direction which is perpendicular to that of the main chain portion of the polymer chain.

The substituent group $R^3$ in the general formula (1) is desired to be preferably a straight chain alkyl group of 6 to 22 carbon atoms or a alkyl benzyl group having a straight chain alkyl group of 6 to 22 carbon atoms, or more preferably a straight chain alkyl group of 8 to 18 carbon atoms.

The substituent group A in the general formula (1) is desired to contain preferably at least a group selected from the group consisting of —(CH$_2$—CH$_2$—O)$_n$—, —(CH$_2$—CH(CH$_3$)—O)$_n$—, and —(CH$_2$—CH$_2$—O)$_m$—(CH$_2$—CH(CH$_3$)—O)$_n$— [wherein m and n are respectively a positive integer], more preferably a group containing at least —(CH$_2$—CH$_2$—O)$_n$— [wherein n=2 to 100], most preferably a group containing at least —(CH$_2$—CH$_2$—O)$_n$— [wherein n=5 to 30].

For the general formula (1), it is desired that the ratio between the polyether group of the substituent group A and the alkyl group of the substituent group R$^3$ is preferably in a range of 0.05 to 3.0 or more preferably in a range of 0.1 to 1.0 respectively as a ratio of the molecular weight of the alkyl group of the substituent group R$^3$/the molecular weight of the polyether group of the substituent group A.

In addition, for the general formula (1), it is desired that the ratio between the group —(CH$_2$—CH$_2$—O)$_n$— of the substituent group A and the alkyl group of the substituent group R$^3$ is preferably in a range of 0.05 to 10 or more preferably in a range of 0.5 to 5.0 respectively as a ratio of the number of carbon atoms of the alkyl group of the substituent group R$^3$/the number of the n of the group —(CH$_2$—CH$_2$—O)$_n$— of the substituent group A.

It is desired that the foregoing polymer matrix contains at least a segment represented by the following general formula (2).

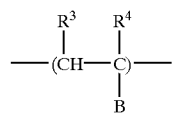

(2)

(wherein R$^3$ and R$^4$ are respectively H or an alkyl group of 2 or less carbon atoms, and B is a group containing at least a polar group selected from the group consisting of polyether group, cyano group, amino group, amido group and carbonate group.)

It is desired that the substituent group B of the general formula (2) is preferably a group containing at least a group selected from the group consisting of —(CH$_2$—CH$_2$—O)$_n$—Z, —(CH$_2$—CH(CH$_3$)—O)$_n$—Z, —(CH$_2$—CH$_2$—O)$_m$—(CH$_2$—CH(CH$_3$)—O)$_n$—Z, —(CH$_2$—CH(CH$_3$)—O)$_m$—(CH$_2$—CH$_2$—O)$_n$—Z, —(CH$_2$—CH$_2$—O)$_k$—(CH$_2$—CH(CH$_3$)—O)$_m$—(CH$_2$—CH$_2$—O)$_n$—Z, and —(CH$_2$—CH(CH$_3$)—O)$_k$—(CH$_2$—CH$_2$—O)$_m$—(CH$_2$—CH(CH$_3$)—O)$_n$—Z [wherein k, m and n are respectively a positive integer, and Z is H or an alkyl group of 1 to 4 carbon atoms] or more preferably a group containing at least —(CH$_2$—CH$_2$—O)$_n$—Z [wherein n=2 to 100, and Z is H or an alkyl group of 1 to 4 carbon atoms].

The solvent (b) is preferred to comprise a solvent capable of functioning as a plasticizer which plasticizes the polymer matrix constituting the ion conductor structural body of the present invention. As such solvent, nonprotic polar solvents are preferred. Such nonprotic polar solvent can include ethers, carbonates, nitriles, amides, esters, nitro compounds, sulfur compounds, and halogen compounds. These may be used either singly or in combination two or more of them as the solvent (b).

The electrolyte (c) is preferred to comprise a lithium salt.

The ion conductor structural body is preferred to include a retaining material comprising a powdery resin material, a powdery glass material, a powdery ceramic material, a nonwoven fabric or a porous film. The proportion of the retaining material in the ion conductor structural body is preferred to be in a range of 1 to 50 wt. %.

The ion conductor structural body may be produced by a process of sequentially performing a step (1) of mixing a monomer represented by the following general formula (3), a solvent and an electrolyte to obtain a mixture, a step (2) of subjecting said mixture to a treatment by polymerization reaction to obtain a polymer matrix as an ion conductor structural body.

(3)

(wherein R$^1$ and R$^2$ is respectively H or an alkyl group of 2 or less carbon atoms, A is a group containing at least a polyether group, and R$^3$ is a group having at least an alkyl group of 6 or more carbon atoms.)

In the step (1), it is preferred to admix a polymerization initiator.

The above process is preferred to further include a step of forming a crosslinked structure in the polymer matrix obtained in the step (2) by way of crosslinking reaction. In this case, it is preferred that the crosslinked structure comprises a covalent bond.

In the step (1), it is preferred to admix a monomer capable of forming a crosslinked structure, and the treatment by the polymerization reaction is preferred to include crosslinking reaction.

It is desired that the substituent group R$^3$ in the general formula (3) is preferably a straight chain alkyl group of 6 to 22 carbon atoms or a alkyl benzyl group having a straight chain alkyl group of 6 to 22 carbon atoms or more preferably a straight chain alkyl group of 8 to 18 carbon atoms.

The substituent group A in the general formula (3) is desired to contain preferably at least a group selected from the group consisting of —(CH$_2$—CH$_2$—O)$_n$—, —(CH$_2$—CH(CH$_3$)—O)$_n$—, and —(CH$_2$—CH$_2$—O)$_m$—(CH$_2$—CH(CH$_3$)—O)$_n$— [wherein m and n are respectively a positive integer], more preferably a group containing at least —(CH$_2$—CH$_2$—O)$_n$—[wherein n=2 to 100], most preferably a group containing at least —(CH$_2$—CH$_2$—O)$_n$— [wherein n=5 to 30].

For the general formula (3), it is desired that the ratio between the polyether group of the substituent group A and the alkyl group of the substituent group R$^3$ is preferably in a range of 0.05 to 3.0 or more preferably in a range of 0.1 to 1.0 respectively as a ratio of the molecular weight of the alkyl group of the substituent group R$^3$/the molecular weight of the polyether group of the substituent group A.

In addition, for the general formula (3), it is desired that the ratio between the group —(CH$_2$—CH$_2$—O)$_n$— of the substituent group A and the alkyl group of the substituent group R$^3$ is preferably in a range of 0.05 to 10 or more preferably in a range of 0.5 to 5.0 respectively as a ratio of the number of carbon atoms of the alkyl group of the substituent group R$^3$/the number of the n of the group —(CH$_2$—CH$_2$—O)$_n$— of the substituent group A.

In the step (1) of the foregoing production process, it is preferred to admix a monomer represented by the following formula (4).

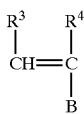

(4)

(wherein $R^3$ and $R^4$ is respectively H or an alkyl group of 2 or less carbon atoms, and B is a group having at least a polar group selected from the group consisting of polyether group, cyano group, amino group, amide group and carbonate group.)

It is desired that the substituent group B in the general formula (4) is preferably a group containing at least a group selected from the group consisting of —$(CH_2$—$CH_2$—$O)_n$—Z, —$(CH_2$—$CH(CH_3)$—$O)_n$—Z, —$(CH_2$—$CH_2$—$O)_m$—$(CH_2$—$CH(CH_3)$—$O)_n$—Z, —$(CH_2$—$CH(CH_3)$—$O)_m$—$(CH_2$—$CH_2$—$O)_n$—Z, —$(CH_2$—$CH_2$—$O)_k$—$(CH_2$—$CH(CH_3)$—$O)_m$—$(CH_2$—$CH_2$—$O)_n$—Z, and —$(CH_2$—$CH(CH_3)$—$O)_k$—$(CH_2$—$CH_2$—$O)_m$—$(CH_2$—$CH(CH_3)$—$O)_n$—Z [wherein k, m and n are respectively a positive integer, and Z is H or an alkyl group of 1 to 4 carbon atoms] or more preferably a group containing at least —$(CH_2$—$CH_2$—$O)_n$—Z [wherein n=2 to 100, and Z is H or an alkyl group of 1 to 4 carbon atoms].

The solvent used in the step (1) of the above production process is preferred to comprise a nonprotic polar solvent. The nonprotic polar solvent can include ethers, carbonates, nitrites, amides, esters, nitro compounds, sulfur compounds, and halogen compounds. These may be used either singly or in combination two or more of them as the solvent.

The electrolyte used in the step (1) of the above production process is preferred to comprise a lithium salt.

The polymerization reaction in the step (2) of the above production process is preferred to be performed using heat energy.

The above production process is preferred to include a step of incorporating a retaining material comprising a powdery resin material, a powdery glass material, a powdery ceramic material, a nonwoven fabric or a porous film. The proportion of the retaining material in the ion conductor structural body is preferred to be in a range of 1 to 50 wt. %.

As previously described, the present invention provide a high performance rechargeable battery which has a high capacity and a prolonged charge-and-discharge cycle life, comprising (a) an anode, (b) a cathode and (c) an ion conductor structural body provided between said anode and said cathode, said anode having a face which is opposed to a face of said cathode, wherein said ion conductor structural body (a) comprises aforesaid ion conductor structural body of the present invention, and the ion conductor structural body is arranged such that an ion conductivity in a direction of connecting said face of said anode (a) and said face of said cathode (b) is increased. In the rechargeable battery of the present invention, it is possible to design such that the anode (a) or/and the cathode (b) include an ion conductor structural body. The ion conductor structural body in this case is preferred to comprise the ion conductor structural body of the present invention.

It is preferred that the anode (a) is constituted by a material capable of entrapping lithium ion in the charge reaction and releasing said lithium ion in the discharge reaction, and the cathode (b) is constituted by a material capable of releasing lithium ion in the charge reaction and entrapping lithium ion in the discharge reaction.

As previously described, the present invention provides a process for producing a rechargeable battery comprising (a) an anode, (b) a cathode and (c) an ion conductor structural body provided between said anode and said cathode, said anode having a face which is opposed to a face of said cathode, said process is characterized by including a first step of producing an ion conductor structural body in accordance with the foregoing process for the production of the ion conductor structural body and a second step of arranging the ion conductor structural body obtained in the first step as said ion conductor structural body (c) such that an ion conductivity in a direction of connecting said face of said anode (a) and said face of said cathode (b) is increased.

In the rechargeable battery production process, it is preferred that the ion conductor structural body is formed on the anode (a) or/and the cathode (b), and the anode and the cathode are arranged to oppose to each other.

It is possible that the anode (a) or/and the cathode (b) include a ion conductor structural body. The rechargeable battery production process in this case is made to include a step of forming an anode containing an ion conductor structural body as the anode (a) or/and a step of forming a cathode containing an ion conductor structural body as the cathode (b). The formation of the anode or the cathode containing said ion conductor structural body is preferred to be performed by a method comprising a step (i) of incorporating a solution containing one or more kinds of compounds selected from the group consisting of polymers, monomers and oligomers capable of contributing to the formation of a polymer matrix of said ion conductor structural body into a material for the formation of an electrode active layer of the anode or the cathode and a step (ii) of forming said electrode active layer while forming a polymer matrix as said ion conductor structural body therein. In the step (ii), it is preferred to adopt polymerization reaction or/and crosslingking reaction.

The electrode active material layer containing the ion conductor structural body as the anode active material layer or the cathode active material layer is preferred to be formed on a collector as an anode collector or a cathode collector.

In the following, the ion conductor structural body of the present invention will be described in more detail with reference to the drawings.

As a result of experimental studies, the present inventors obtained the following findings. That is, in an ion conductor structural body principally comprising (a) a polymer matrix, (b) a solvent as a plasticizer and (c) an electrolyte, when said polymer matrix (a) is made to be such that it comprises a polymer chain having at least a segment represented by the previously described general formula (1) and a main chain portion of said polymer chain and a side chain portion [that is, A in the general formula (1)] of said segment have an orientation property, the ion conductivity of the ion conductor structural body is highly improved. And when said polymer matrix is made have a crosslinked structure, the mechanical strength of the ion conductor structural body is also highly improved.

And this ion conductor structural body can be produced by a relatively simple manner at a reasonable production cost. In addition, when this ion conductor structural body is used in a rechargeable battery, the resulting rechargeable battery has a high capacity, a high charge-and-discharge efficiency and a prolonged charge-and-discharge cycle life. And this rechargeable battery can be produced by a relatively simple manner at a reasonable production cost.

The reason why the ion conductor structural body has such advantages as above described can be considered as will be described below.

FIG. 1(a) and FIG. 1(b) are schematic views for explaining a polymer structure of the ion conductor structural body of the present invention. In FIGS. 1(a) and 1(b), reference numeral 101 indicates a main chain portion, reference numeral 102 a side chain portion, reference numerals 103 crosslinking bond, reference numeral 104 ion conducting path, reference numeral 105 polyether group, and reference numeral 106 alkyl group.

As shown in FIG. 1(a), the side chain portion 102 and the main chain portion 101 of a polymer chain constituting a polymer matrix are respectively orientated. It is considered that this makes it possible to form a matrix structure comprising a regular polymer chain. In addition, as shown in FIG. 1(a), the polymer chain constituting the ion conductor structural body of the present invention forms the crosslinking bond 103. It is considered that this makes it possible to form a strong matrix structure having a structurally regularity and because of this, an ion conductor structural body having an excellent mechanical strength is afforded. At this time, because the side chain portion 102 containing the polyether group 105 and the alkyl group 106 is orientated in a fixed direction as shown in FIG. 1(a), an ion conducting path 104 in which polyether groups having a polarity are arranged is formed in a fixed direction. Thus, it is considered that ions are made to be more readily mobilized in an ion conducting path direction in comparison with a case shown in FIG. 1(b) wherein polyether groups 105 are randomly present without being orientated in a fixed direction and wherein no ion conducting path is formed, and this situation provides an improved ion conductivity. Specifically, when the ion conducting path 104 is formed in a fixed direction as shown in FIG. 1(a), ions are capable of readily mobilizing along the ion conducting path. But in the case shown in FIG. 1(b), wherein no ion conducting path is formed, ions cannot mobilize in a fixed direction. However, the ions mobilize in a complicated manner to detour or the like and therefore, their mobilizing path inevitably becomes longer. The ion conductivity is increase in proportion to the ion concentration and the ion traveling speed in an inter-electrode direction. Therefore, when the number of ions and their mobility are the same in a given space of the ion conductor structural body, as the ion mobilizing path is shortened, the ion starveling speed in the inter-electrode direction is increased to increase the ion conductivity. Therefore, the ion conductivity in a direction along the ion conducting path 104 of FIG. 1(a) is improved in comparison with that in a direction that is different from said direction, and therefore, the ion conductivity exhibits anisotropy.

Further, by making the polymer matrix have a network structure by the crosslinking as shown in FIG. 1(a), the ion conducting path 104 is stably maintained without being broken. Because of this, the stability of the ion conductor structural body against heat is improved. Particularly even upon drying, the polymer matrix is stably maintained without suffering structural changes such as shrinkage. In addition, the network structure which is stable in this way functions to stably retain the solvent in a large amount. This makes it possible to increase the content of the solvent, that is, to decrease the amount of the polymer matrix, wherein it is possible to increase the amount of the solvent and the number of ions in a given space of the ion conductor structural body. This improves the ion conductivity of the ion conductor structural body.

For the main chain portion 101 and the side chain portion 102 constituting the polymer matrix to be orientated, it is considered such that the side chain portion 102 of the polymer matrix which contains the polyether group 105 and the alkyl group 106 exhibits a function in the same manner as an amphipatic molecular having a hydrophilic group and a hydrophobic group functions to form a two-component film having a structure in that hydrophilic groups and hydrophobic groups of the molecules are mutually opposed to each other, to form a two-molecular structure in which the alkyl groups as the hydrophobic groups and the polyether groups as the hydrophilic groups are arranged so as to mutually oppose to each other in a layer state (a lamella structure), whereby causing orientation for the side chain portion of the polymer chain. It is considered that the situation in which the side chain portion is orientated in this way makes the main chain portion have an orderly property, that is, the main chain portion is orientated, and therefore, both the main chain portion and the side chain portion respectively have an orientation property. At this time, when the alkyl group comprises a long alkyl group having a great many carbon atoms makes it possible to readily form a lamella structure having a regular arrangement.

For the orientation direction of each of the side chain portion and the main chain portion of the polymer chain, when the orientation direction of the side chain portion differs from that of the main chain portion, by making the matrix structure to be multi-dimensionally structured in a stable state, the ion conducting path becomes to be readily formed. Thus, this manner is desirable. Further, it is more desirable that the orientation direction of the side chain portion is perpendicular to that of the main chain portion as shown in FIG. 1(a). In this case, the polymer chain becomes possible to constitute the most stable polymer matrix, wherein the ion conductive path is formed in a stable state. This makes it possible to obtain an ion conductor structural body whose ion conductivity has a desirable anisotropy.

In the case where the ion conductor structural body is used in a film-like state in a rechargeable battery, to orientate the side chain portion of the polymer chain which contains the alkyl group and the polyether group so as to be perpendicular to the widest face of the film is preferred because this makes it possible to readily form the ion conducting path in a perpendicular direction. In addition, to orientate the main chain portion of the polymer chain so as to be group so as to be perpendicular to the widest face of the film is more preferred, because this makes it possible to improve the mechanical strength in a direction of the film face and to prevent occurrence of rupture and the like in the production of a rechargeable battery.

As the method to orientate as above described, there can be mentioned a method of a polymer matrix by subjecting a prescribed monomer to polymerization and crosslinking reaction or a prescribed polymer to crosslinking reaction while impressing a magnetic field or an electric field, a method of forming a polymer matrix by performing polymerization and crosslinking reaction of a prescribed monomer or crosslinking reaction of a prescribed monomer on a substrate for which a rubbing treatment or a hydrophobic treatment by a fluororesin coat or the like has been performed, and a method of forming a polymer matrix by providing a given polymer matrix material and subjecting said polymer matrix material to an orientation treatment.

In the case where the ion conductor structural body is used in a rechargeable battery, other than the above-mentioned methods, it is possible to adopt a method wherein a polymer matrix is formed by subjecting a prescribed monomer to polymerization reaction or a prescribed polymer to crosslinking reaction on an electrode structural body formed by incorporating a hydrophobic binder comprising a fluororesin such as tetrafluoroethylene, polyvinylidene fluoride, or the like or a polyethylene-polypropylene resin therein. In this method, the surface of the electrode structural body becomes hydrophobic due to the hydrophobic binder and because of this, orientation will be readily occurred on the hydrophobic surface of the electrode structural body as well as in the case of the above-described substrate applied with the hydrophobic treatment by means of a fluororesin coat.

As the method of examining the presence or absence of the foregoing orientation property and the foregoing orientation direction, (i) a method of performing direct observation by mean of a polarization microscope, an X-ray diffractometer, an X-ray small angle scattering measurement apparatus, and an electron microscope, (ii) a method of examining a given crystal structure in an ion conductor structural body by means of an infrared absorption spectrum analyzer, a nuclear magnetic resonance spectrum analyzer, and a thermal analysis measuring apparatus and performing examination with reference to a result obtained and the result obtained by the method (i), and (iii) a method of performing examination by combining the method (i) with the above orientation process wherein a change between the sate before the orientation and that after the orientation is examined.

The examination method by means of a polarization microscope may be performed, for instance, by a manner wherein from a change of a sample in a light field and a dark field under cross polarized light from a Nicol prism, its optical anisotropy is examined to inspect the presence or absence of orientation or orientation direction and a variation of an orientated state is measured.

The method of examining the orientation property by means of an X-ray diffractometer or an X-ray small angle scattering measurement apparatus may be performed, for instance, by a manner wherein the examination is performed on the basis of a diffraction pattern or a scattering pattern obtained by radiating X-ray to a sample. Specifically, in this method, when X-ray in a point beam state is radiated to a sample, if a spot-like Laue pattern is formed, the sample is judged to have an orientation property. When the orientation property is diminished, the pattern is changed to a pattern approximate to a ring pattern. When the pattern is a complete ring pattern, it is judged that the orientation property is completely extinguished. In this method, it is possible to examine the orientation direction from the spot-like Laue pattern. As other method, it is possible that by radiating X-ray in a point beam state to a sample from different directions to measure a diffraction peak or a scattering peak of a microcrystal, whereby the presence or absence of nonorientation, plane orientation, uniaxial orientation, and double orientation and the direction of orientation are inspected. Specifically, for a sample having a microcrystal phase, in the case where X-ray is radiated to the sample from various directions including X, Y and Z axial directions to measure diffraction or scattering peaks, when a peak which is appeared at a specific position only when the X-ray is radiated from a specific direction is present, it is understood that a microcrystal phase having a spacing to comply with the peak position is present only in a direction along with the radiation direction. This indicates that the microcrystal phase is orientated in the specific direction. For instance, in the case where it is known in advance by the following method that a sample to be inspected has a microcrystal phase, the sample is made to be in a powdery state and where X-ray is radiated to the sample from various directions including X, Y and Z axial directions to measure diffraction or scattering peaks, whereby finding out a direction for the X-ray to be radiated where a peak corresponding to the spacing which is possessed by the sample is appeared. If the direction for a specific peak which is appeared when measured by a transmission method (at a small angle) is only a X-axial direction of the sample, it can be judged that the sample is uniaxially orientated in a direction along the X-axis. When a specific peak is appeared only for a direction along the X-Y face, it can be judged that the sample is face-orientated in a direction in parallel to the X-Y face. When a specific peak is appeared only for a direction of the X-axis and for a direction of the Y-axis, it can be judged that the sample is double orientated in a direction along the X-axis and in a direction along the Y-axis. When peaks are appeared for various directions and their peak intensity ratios are the same, it can be judged that the sample is not regular, that is, nonorientated. When peaks are appeared for various directions and their peak intensity ratios are different, it is can be judged that the sample has an orientation property but is inferior in terms of the regularity, that is, the orientation property as a whole.

Upon measuring a peak intensity ratio by changing the radiation direction, it is possible to adopt a method of performing the measurement by making a sample to be inspected into a round form or a method of making a sample to be inspected have a form capable of complying with the radiation direction and subjecting the sample to the measurement, wherein the sample can be more accurately measured.

Separately, for a sample to be inspected, having a specific crystal structure, when the crystal structure of the sample is changed depending on a temperature change, specifically, for instance, when the crystal phase of the sample is changed into an amorphous phase upon the application of heat whereby the specific spacing is extinguished, it is possible to observe the orientation of only a given portion of the internal structure by measuring a change of a specific peak depending on the temperature change.

As the method of measuring a given portion of a polymer matrix in a ion conductor structural body, there can be mentioned a method using an infrared absorption spectrum analyzer wherein the measurement is performed on the basis of the presence or absence of a specific absorption band or a specific band intensity corresponding to the given portion; a method using a nuclear magnetic resonance spectrum analyzer wherein the measurement is performed on the basis of a change in a peak form upon heating or cooling, specifically, on the basis of a change in a wide peak corresponding to a crystal phase and a change in a narrow peak corresponding to an amorphous phase (this is a phenomenon wherein a peak is multi-divided due to a cause in that in the chemical shift of the spin of a given atom of the crystal phase where the rotation of the atomic bond is limited, the shift magnitude due to the interarrangement with the adjacent atoms is not so averaged in comparison with a given atom of the amorphous phase where the atomic bond is capable of being freely rotated); a method using a thermal analysis measuring apparatus wherein the measurement is performed on the basis of the magnitude of a difference between a thermal energy required in the crystallization and that required in the fusion, obtained by differential thermal analysis; and a method by way of viscoelasticity measurement wherein the measurement is performed on the basis of the temperature required to soften or disperse the above given portion of the polymer matrix or on the basis of the quantity of the energy required in said softening or said dispersing. Besides, there can be also a method in that the measurement by any of the above-mentioned methods is performed after the sample of the above given portion of the polymer matrix) is subjected to drawing, wherein the orientation property of the sample is examined, for instance, on the basis of a peak form and a peak intensity change or a change of thermal energy quantity before and after the drawing or in the drawn direction.

The term "orientation property" in the present invention is meant an orientation property obtained by the measurement by any of the above-described methods. In the case where a sample is definitely not orientated but slightly orientated, it can be said in the present invention that the sample has an orientation property. But, a case wherein a sample is orientated to have a strong orientation property is preferred in the present invention. The orientation magnitude (the magnitude for the orientation property to be strong or weak) can be judged by measuring the rate for the orientation in a given direction by means of a polarization microscope or an X-ray small angle scattering measurement apparatus.

The method of measuring the orientation magnitude by the polarization microscope is performed, for instance, by a manner wherein in a change of a sample (to be inspected) in a light field and a dark field under cross polarized light from a Nicol prism, (i) an area rate in the light field and (ii) an area rate in the dark field are measured, and a ratio between the area rate (i) and the area rate (ii) is computed to obtain an orientation magnitude for the sample. A preferred orientation magnitude in the present invention measured by this method is preferably 1.2 or more or more preferably 1.5 or more respectively for the ratio of the area rate in the light field (in a state in that the light field becomes the largest)/the area rate in the dark filed.

The method of measuring the orientation magnitude by the X-ray small angle scattering measurement apparatus is performed, for instance, by a manner wherein X-ray is radiated to a sample (to be inspected) from all the directions to measure peak intensities corresponding to a given spacing, and the orientation magnitude is computed from the measured peak intensities. A preferred orientation magnitude in the present invention measured by this method is preferably 1.2 or more or more preferably 2.0 or more respectively for the ratio of a peak intensity in the radiation direction where the strongest peak intensity is afforded/a peak intensity in the radiation direction where the weakest peak intensity is afforded in terms of the peak intensity ratio corresponding to the given spacing.

Figure 7:
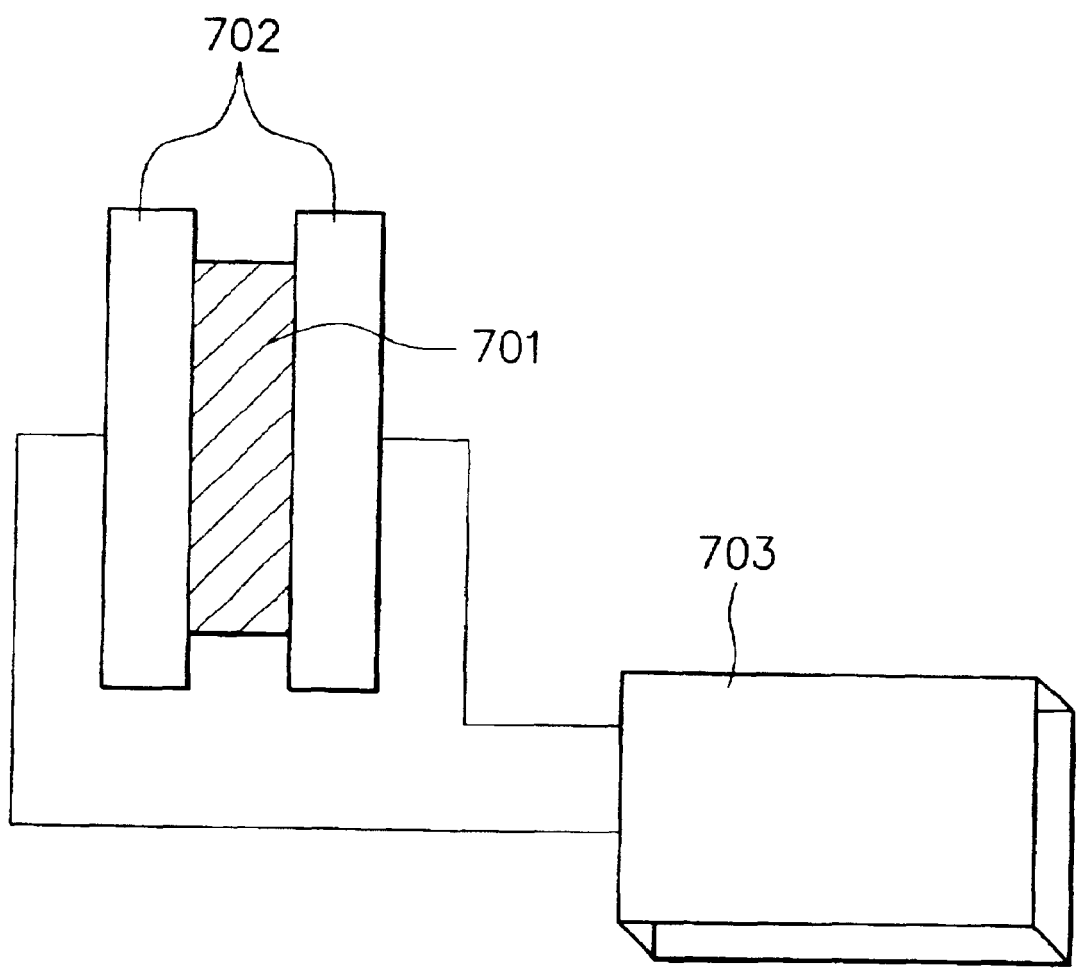
FIG. 7 is a schematic diagram illustrating a system for measuring an impedance of an ion conductor structural body, used in examples which will be described later.

As a preferable example of the method of measuring the ion conductivity of an ion conductor structural body, there can be mentioned a method of measuring a resistance value for a given interval of the ion conductor structural body. Specifically, for instance, the measurement is formed in the following manner. That is, as shown in FIG. 7, an ion conductor structural body 701 is sandwiched between a pair of electrode plates 702, and the two electrode plates are electrically connected to an impedance measuring apparatus 703 as shown in FIG. 7. The resistance value of the ion conductor structural body 701 situated between the two electrode plates 702 is measured to obtain a resistance value (r) by the impedance measuring apparatus 703. The thickness (d) and the area (A) of the ion conductor structural body 701 situated between the two electrode plates 702 are measured. Then, in accordance with the equation: $\delta$(ion conductivity)=d/(A×r), there is obtained an ion conductivity ($\delta$) of the ion conductor structural body.

Besides, the ion conductivity of an ion conductor structural body can be measured by a method wherein the ion conductor structural body is contacted to a gap electrode comprising a pair of electrodes having an electrode interval (W) and an electrode length (L) and which is electrically connected to an impedance measuring apparatus, a resistance value (r) of the ion conductor structural body between the two electrodes of the gap electrode by the impedance measuring apparatus, the thickness (d) of the ion conductor structural body is measured, then in accordance with the equation: $\delta$(ion conductivity)=W/(L×d×r), an ion conductivity ($\delta$) of the ion conductor structural body is obtained.

Now, as previously described, a preferred embodiment of the polymer matrix constituting the matrix of the ion conductor structural body of the present invention comprises a polymer chain having a crosslinked structure comprising a segment having a side chain containing an alkyl group of 6 or more carbon atoms and a polyether group.

As the method of analyzing the chemical composition or the chemical structure of the polymer matrix constituting the matrix of the ion conductor structural body, there can mentioned a method wherein the composition of an atomic bond or an atomic group is analyzed by means of an infrared absorption spectrum analyzer or a visible ultraviolet ray absorption spectrum analyzer; a method wherein the composition and structure of an atomic bond or an atomic group are analyzed by means of a nuclear magnetic resonance spectrum analyzer, an electron spin resonance absorption spectrum analyzer, or a rotatory dispersion analyzer; a method wherein the composition of an atomic group is analyzed by means of a mass spectrum analyzer; a method wherein the composition of an atomic group and the structure including polymerization degree and the like of the atomic group by means of adequate chromatography such as liquid chromatography, gas chromatography, or the like; and a method wherein a functional group is identified and determined by a direct titration method and the like. In any case, a sample to be inspected is subjected to the measurement as it is or it is subjected to the measurement after treated, for instance, chemically decomposed, depending on the measurement method adopted.

The segment containing the alkyl group and the polyether group which forms the polymer matrix may have a side chain containing either the alkyl group nor the polyether group, as long as the side chain portion bonded to the main chain has repeating units each comprising a structure having a group containing the alkyl group and the polyether group and at least a side chain comprising a group containing the alkyl group and the polyether group. For the repetition of the segment, it is not always necessary to be repetition in which the repeating units are repeated in the same form. It is possible to be repetition in which the direction for the repeating units to be repeated is reversed or the repeating units are discontinuously repeated such that a segment having a different structure is inserted, for instance, between given two of the repeating units.

In an embodiment of the segment having the side chain portion containing the alky group of 6 or more carbon atoms and the polyether group, as long as the segment has the structure represented by the foregoing general formula (1), the side chain portion may contain other functional group.

In this case, $R^1$ and $R^2$ in the general formula (1) are respectively H or an alkyl group of 2 or less carbon atoms, preferably H or a methyl group because the orientation property of the polymer matrix is improved. And as long as $R^3$ is a group having an alkyl group of at least 6 carbon atoms, the substituent group $R^3$ may have other functional group or it may be a straight chain or branched chain alkyl group. Specifically, it is desired to contain preferably a straight chain alkyl group of 6 to 22 carbon atoms or an alkylbenzyl group having a straight chain alkyl group of 6 to 22 carbon atoms or more preferably a straight chain alkyl group of 8 to 18 carbon atoms, particularly in terms of forming the ion conducting path.

As will be clearly understood from FIG. 8 in which correlations between the number of carbon atom(s) of an alkyl group of a segment whose side chain having said alkyl group and a polyether group which constitute an ion conductor structural body and orientation properties of said ion conductor structural body, when the number of the carbon atoms of the alkyl group is less than 6, substantially no orientation property is afforded and therefore, it is impossible to achieve a ion conductor structural body having a desirable ion conductivity. On the other hand, when the number of the carbon atoms of the alkyl group exceeds 22, the affinity of the polymer matrix with the solvent is liable to deteriorate.

Figure 9:
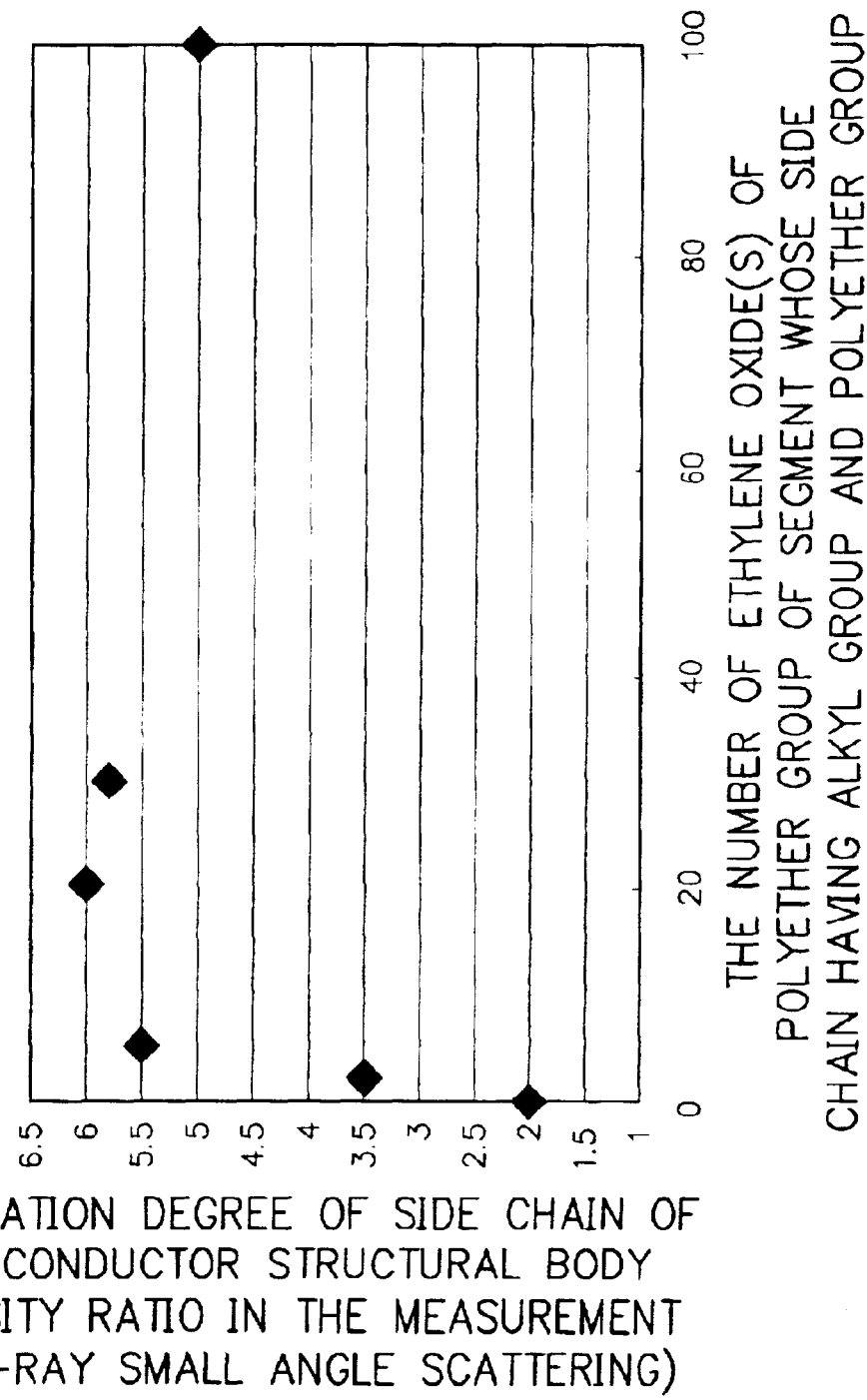
FIG. 9 shows a graph showing correlations between the number of ethylene oxide(s) of an polyether group of a segment whose side chain having an alkyl group and said polyether group which constitutes an ion conductor structural body and orientation properties of said ion conductor structural body in the present invention.

As long as the substituent group A in the general formula (1) is a group containing a polyether group having more than two ether structures represented by C—O—C, it may have other functional group or straight chain or branched chain structure. Such group as the substituent group A is desired to be preferably a group containing at least a group selected from the group consisting of —(CH$_2$—CH$_2$—O)$_n$—, —(CH$_2$—CH(CH$_3$)—O)$_n$—, and —(CH$_2$—CH$_2$—O)$_m$—(CH$_2$—CH(CH$_3$)—O)$_n$— [wherein m and n are respectively a positive integer], more preferably a group containing at least —(CH$_2$—CH$_2$—O)$_n$— [wherein n=2 to 100], most preferably a group containing at least —(CH$_2$—CH$_2$—O)$_n$— [wherein n=5 to 30], particularly in terms of forming the ion conducting path. FIG. 9 is a graph showing correlations between the number of ether group in the polyether group of the substituent group A in the general formula (1) and orientation property of the side chain portion of the polymer matrix. As will be understood with reference to FIG. 9, when the number of the ether group is small, the orientation property is deteriorated to make it difficult to attain a high ion conductivity for the ion conductor structural body. On the other hand, when the number of the ether group is excessive, the proportion of the polyether content in the polymer matrix is undesirably increased to result in a reduction in the mechanical strength of the ion conductor structural body.

Figure 10:
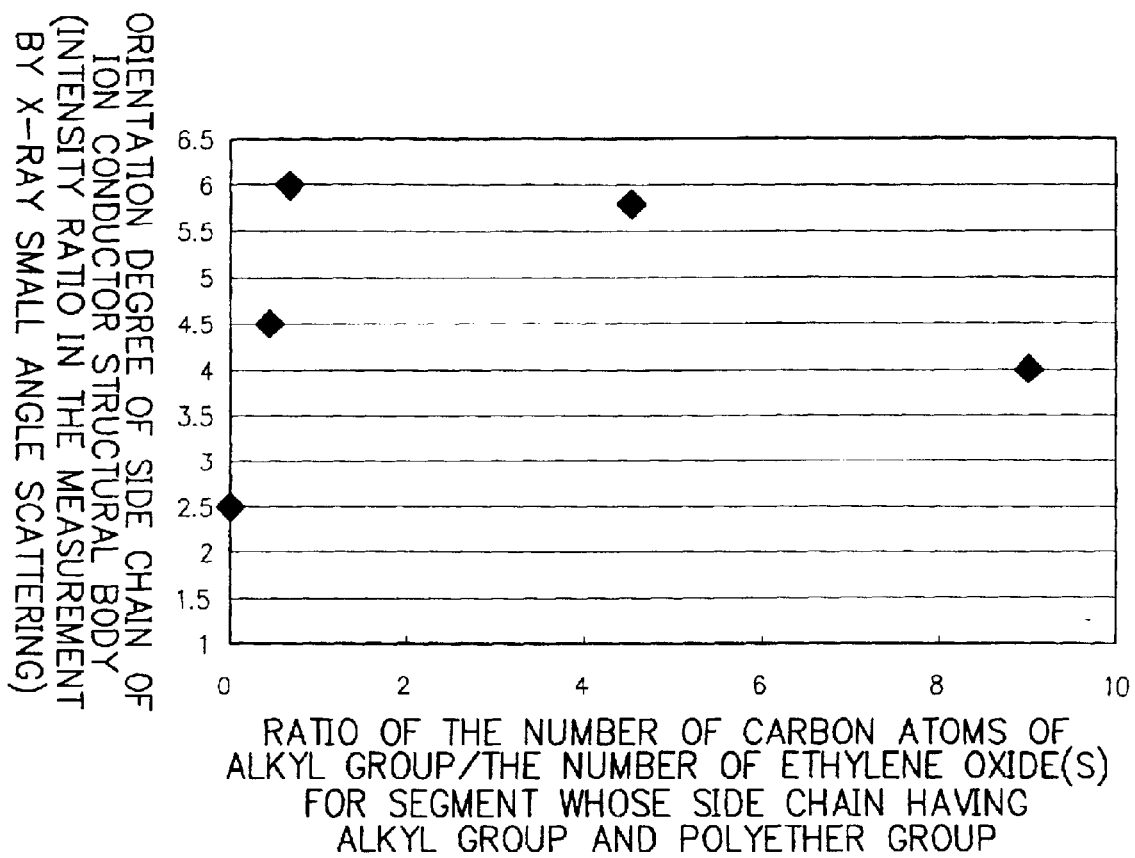
FIG. 10 shows a graph showing correlations between a ratio of the number of carbon atom(s) and that of ethylene oxide(s) of an polyether group of a segment whose side chain having said alkyl group and said polyether group which constitutes an ion conductor structural body and orientation properties of said ion conductor structural body in the present invention.

For the general formula (1), it is desired that the ratio between the polyether group of the substituent group A and the alkyl group of the substituent group R$^3$ is preferably in a range of 0.05 to 3.0 or more preferably in a range of 0.1 to 1.0 respectively as a ratio of the molecular weight of the alkyl group of the substituent group R$^3$/the molecular weight of the polyether group of the substituent group A. This makes it possible to improve the orientation property of the side chain portion of the polymer matrix. Particularly, when the substituent group A contains at least —(CH$_2$—CH$_2$—O)$_n$—, it is desired that the ratio between the group —(CH$_2$—CH$_2$—O)$_n$— of the substituent group A and the alkyl group of the substituent group R$^3$ is preferably in a range of 0.05 to 10 or more preferably in a range of 0.5 to 5.0 respectively as a ratio of the number of carbon atoms of the alkyl group of the substituent group R$^3$/the number of the n of the group —(CH$_2$—CH$_2$—O)$_n$— of the substituent group A. This makes it possible to more improve the orientation property of the side chain portion of the polymer matrix. This situation can be understood with reference to FIG. 10 of a case where the substituent group A of the general formula comprises a group containing at least —(CH$_2$—CH$_2$—O)$_n$—. Specifically, FIG. 10 is a graph showing correlations between a ratio of the number of carbon atoms of the alkyl group of the substituent group R$^3$/the number of the n of the group —(CH$_2$—CH$_2$—O)$_n$— of the substituent group A and orientation property of the side chain portion.

It is preferred that the polymer matrix further contains a segment represented by the foregoing general formula (2) in addition to the segment represented by the general formula (1). In this case, in addition to the above-described advantages, there are also provided advantages such that the affinity of the polymer matrix with the solvent is improved and leakage of the solvent from the ion conductor structural body is desirably prevented.

In addition, by making the polymer matrix contain the segment represented by the general formula (2), the proportion of the solvent content in the ion conductor structural body can be increased. This makes it possible that the solvent of the electrolyte is stably retained in a large amount and not only the solvent content but also the number of ions in given spaces of the ion conductor structural body are increased. This situation results in more improving the ion conductivity of the ion conductor structural body.

Incidentally, it is desired that R$^3$ and R$^4$ in the general formula (2) are respectively H or an alkyl group of 2 or less carbon atoms or preferably H or a methyl group.

For the substituent group B in the general formula (2), as long as it is a group containing at least one kind of a polar group selected from the group consisting of polyether group, cyano group, amino group, and carbonate group, it may contain other functional group or an alkyl group of straight chain or branched chain structure. In the case where the ion conductor structural body is used in a rechargeable lithium battery, the substituent group B is preferred to comprise a polyether group because the polyether group is difficult to react with lithium. Such polyether group is preferred to be a polyether group containing at least a group selected from the group consisting of —(CH$_2$—CH$_2$—O)$_n$—Z, —(CH$_2$—CH(CH$_3$)—O)$_n$—Z, —(CH$_2$—CH$_2$—O)$_m$—(CH$_2$—CH(CH$_3$)—O)$_n$—Z, —(CH$_2$—CH(CH$_3$)—O)$_m$—(CH$_2$—CH$_2$—O)$_n$—Z, —(CH$_2$—CH$_2$—O)$_k$—(CH$_2$—CH(CH$_3$)—O)$_m$—(CH$_2$—CH$_2$—O)$_n$—Z, and —(CH$_2$—CH(CH$_3$)—O)$_k$—(CH$_2$—CH$_2$—O)$_m$—(CH$_2$—CH(CH$_3$)—O)$_n$—Z [wherein k, m and n are respectively a positive integer, and Z is H or an alkyl group of 1 to 4 carbon atoms]. It is more preferred to be a polyether group containing a group of —(CH$_2$—CH$_2$—O)$_n$—Z [wherein n=2 to 100, and Z is H or an alkyl group of 1 to 4 carbon atoms].

As the crosslinking structure of the polymer chain forming the polymer matrix, there can be mentioned a physical bond such as hydrogen bond or ion bond which is resulted by way of forming ion pair and a chemical bond comprising covalent bond. However, the physical bond comprising hydrogen bond has a disadvantage such that the bond state is changed by the bond being broken due to temperature change or pH change. Therefore, the covalent bond which is resulted by way of chemical bonding is preferred because the bond state is difficult to be changed due to temperature change or pH change. Particularly, the crosslinking structure of the polymer chain is preferred to be a structure represented by the following general formula (5) in which segments are crosslinked, because this structure makes the segment represented by the general formula (1) to readily form a stable structure.

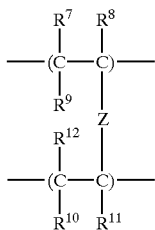
(5)

In the general formula (5), $R^7$ to $R^{12}$ are respectively H or an alkyl group, preferably H or $CH_3$. Z is a group of forming a crosslinking structure. There is no particular limitation for the group Z as long as the both sides thereof have a bonding hand capable of being bonded to certain atom of other group as shown in the general formula (5). Specifically, the group Z is preferred to be a group having at least one kind of a substituent group selected from the group consisting of —CO—, —OCOO—, —CONH—, —CONR—, —OCONH—, —NH—, —NHR—, —SO—, —$SO_2$— (R is an alkyl group), and an ether group or a functional group. The group Z is more preferred to be a polyether group containing two or more ether groups.

The crosslinking structure of the polymer chain may be a structure comprising a modification of the structure represented by the foregoing general formula (5), which is represented by the following general formula (6).

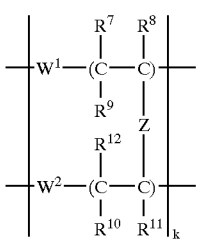
(6)

(Wherein k is a positive integer of more than 1, and $W^1$ and $W^2$ show respectively a structure which will be described below.)

Here, when the foregoing general formula (1) is E and the foregoing general formula (2) is F, $W_1$ has a structure represented by $E_m$ and $W_2$ has a structure represented by $F_n$, or each of $W_1$ and $W_2$ has a structure represented by $E_mF_n$, $E_jF_mE_n$, $F_jE_mF_n$, $(EF)_n$, $(EFE)_n$ or $(FEF)_n$. Here, for instance, EF indicates a structure comprising E and F. EFE indicates a structure comprising E, F, and E, which are arranged while being connected with each other. $E_n$, $E_m$ and $E_n$ indicate respectively a structure in which a unit comprising E is repeated j, m or n time(s). $F_j$, $F_m$ and $F_n$ indicate, respectively, a structure in which a unit comprising F is repeated j, m or n time(s). $(EF)_n$ indicates a structure in which a unit comprising E and F is repeated n time(s). Numbers j, m and n are, respectively, a positive integer greater than 1.

Incidentally, as well as in the case of the general formula indicating ordinary copolymers, the general formula (6) does not indicate that the entire polymers always form constant repeating units but it indicates that repeating units are formed in a state where the entire polymers are averaged.

The ion conductor structural body of the present invention is desired to have a glass transition temperature preferably in a range of −20 to −120° C., more preferably in a range of −30 to −100° C., most preferably in a range of −50 to −100° C. The glass transition temperature here is meant a transition temperature indicating a phenomenon of a structural change which is specific in a polymer, namely, a relaxation temperature of the thermal motion of the main chain of the polymer. In general, a polymer has properties such that as the temperature of the polymer is increase, the structure is changed from a glass-like rigid structure in which the thermal motion of the main chain of the polymer (hereinafter referred to as polymer's main chain) is not occurred into a rubber-like soft structure having a freedom of an extent in that the thermal motion of the polymer's main chain is relaxed, then into a liquid in which the polymer's main chain completely has a freedom. That is, the temperature at which the structure of the polymer is changed from the glass-like structure into the rubber-like structure is corresponding to the glass transition temperature. Due to a factor that the polymer is structurally changed from the glass-like structure into the rubber-like structure, the thermal motion of the polymer's main chain is relatively actively occurred. This makes such that dispersion of ions is readily occurred in the ion conductor structural body and as a result, the ion conductivity of the ion conductor structural body is improved.

In the case where the glass transition temperature of the ion conductor structural body exceeds −20° C. (that is, higher than −20 C.), even when the ion conductor structural body is maintained at relatively low temperature, there is a tendency in that not only a reduction in the thermal motion of the polymer matrix constituting the ion conductor structural body is occurred but also a reduction in the dispersion of the ions is occurred, wherein a reduction in the ion conductivity of the ion conductor structural body is occurred. On the other hand, in the case where the glass transition temperature of the ion conductor structural body is lower than −120° C., when the ion conductor structural body is maintained at relatively high temperature, there is a tendency in that the polymer matrix is softened to a large extent to results in a reduction in the mechanical strength of the ion conductor structural body.

To control the glass transition temperature of the ion conductor structural body can be performed by controlling the glass transition temperature of the polymer matrix itself, which constitutes the ion conductor structural body, or by increasing the solvent content in the ion conductor structural body. To control the glass transition temperature of the polymer matrix itself can be performed by forming the polymer matrix using a polymer whose glass transition temperature is low, or in the case where the polymer matrix has such a crosslinking structure as described in the above, by increasing or decreasing the crosslinking density of the crosslinking structure.

The above-described glass transition temperature can be obtained by a compressive load method using a thermomechanical analyzer or by a thermal analysis method using a differential scanning calorimeter.

The mechanical strength of the ion conductor structural body can be expressed by a Young's modulus which is computed from a deformation rate obtained when a load such as pressure or tension is applied.

The ion conductor structural body of the present invention is desired to have a mechanical strength of preferably more than $1 \times 10^5$ Pa or more preferably more than $2 \times 10^5$ Pa in terms of the Young's modulus. When the ion conductor structural body is of a tensile strength in this range as the mechanical strength, there is an advantage such that particularly when the ion conductor structural body is configured to be in a film-like state and it is used in a rechargeable battery, the processing efficiency upon the production of the rechargeable battery is significantly improved.

The electrolyte used in the ion conductor structural body of the ion conductor structural body of the present invention can include salts comprising cation selected from the group consisting of lithium ion, sodium ion, potassium ion, and tetraalkyl ammonium ion and Lewis acid ion selected from the group consisting of $BF_4^-$, $PF_6^-$, $AsF_6^-$, $ClO_4^-$, $CF_3SO_3^-$, $(CF_3SO_2)_2N^-$, $(CF_3SO_2)_3C^-$, and $BPh_4^-$ (with Ph being a phenyl group); hydroxides of alkali metal such as lithium hydroxide, sodium hydroxide, and potassium hydroxide, and mixtures of these. Of these, lithium salts are particularly preferred.

The solvent used in the ion conductor structural body of the present invention can include solvents capable of functioning as a plasticizer, that is, solvents capable of plasticizing the polymer matrix constituting the ion conductor structural body of the present invention and which have an affinity with the polymer matrix. Of these, solvents capable of dissolving the foregoing electrolyte are particularly preferred because the dispersion of the ions in the ion conductor structural body is improved. It is preferred that the content of the solvent is in a range of 1 to 20 in terms of a ratio of the weight of the solvent/the weight of the polymer matrix. In this case, the mechanical strength of the ion conductor structural body is prevented from being reduced. It is more preferred that said range is one when the polymer matrix contains the solvent in a saturated state.

For the rate of the content of the electrolyte to that of the solvent, it is desired to be preferably in a range of 0.5 to 3 mol/dm$^3$ or more preferably in a range of 1 to 2.5 mol/dm$^3$. In this case, particularly when a large quantity of current is flown, the concentration polarization of the electrolyte is difficult to occur and because of this, the ion conductivity of the ion conductor structural body is prevented from being reduced.

In order to produce such an ion conductor structural body that has aforesaid ratio of the weight of the solvent/the weight of the polymer matrix, a due care is necessary to be made about a combination of the polymer matrix and the solvent. Specifically, it is preferred to selectively use a solvent having a solubility parameter which is preferably in a range of 15.0 to 30.0 $(J/cm^3)^{1/2}$ or more preferably in a range of 17.0 to 30.0 $(J/cm^3)^{1/2}$, wherein the solubility of the electrolyte (the retaining electrolyte) becomes good. For the polymer matrix in the case of using such solvent, when the solubility parameter of the entire polymer chain is in a range of 14.0 to 28.0 $(J/cm^3)^{1/2}$, the solvent becomes to be stably contained in the polymer matrix and the mechanical strength of the polymer matrix is prevented from being reduced and therefore, this solubility parameter range is preferred. When a difference between the solubility parameter of the solvent and that of the polymer matrix is large, the affinity of the solvent with the polymer matrix is diminished. But when said difference is small, the polymer matrix becomes capable of stably containing the solvent therein and the stability is improved such that the solvent is prevented from being leaked from the polymer matrix upon the application of pressure. Thus, the difference between the solubility parameter of the solvent and that of the polymer matrix is preferred to be small.

The above solubility parameter ($\delta((J/cm^3)^{1/2})$) can be expressed to be a square root of a coagulation energy of the solvent and it is a characteristic value ($\delta$) of the solvent which is computed in accordance with the equation: $\delta=(\Delta hvap/V^0)^{1/2}$ (wherein $\Delta hvap$ is a molar vaporization heat of the solvent, and $V^0$ is a molar volume of the solvent).

For instance, water is $\delta=42$, ethanol is $\delta=22.4$, and hexane is $\delta=14.6$. Separately, the solubility parameter ($\delta$) of a polymer is a value which is experimentally computed based on a presumption in that the solubility parameter of the solvent which imparts an infinite solubility or a maximum swelling degree of the polymer is equal to the solubility parameter of the polymer or a value which is computed from a molecular coagulation energy of the functional group of the polymer. In the present invention, as the solubility parameter of the polymer, a value computed from a molecular coagulation energy of the functional group of the polymer is used. In the present invention, the computation of the solubility parameter ($\delta$) from the molecular coagulation energy of the functional group of the polymer is performed in accordance with the equation: $\delta=\rho\Sigma F/M$ (wherein $\rho$ is a density (g/cm$^3$) of the polymer, F is a sum $((J/cm^3)^{1/2}/mol)$ of molar coagulation constants of the monomer unit, and M is a molecular weight (g/mol) of the monomer unit. The sum $((J/cm^3)^{1/2}/mol)$ can be computed by using a Holy's value described in SOLVENT HANDBOOK edited by KOHDANSHA Scientific Kabushiki Kaisha or POLYMER HANDBOOK Third Edition published by WILLY INTERSCIENCE Publishing Company.

As preferable examples of such solvent, there can be mentioned nonprotic polar solvents. Such nonprotic polar solvent can include ethers, carbonates, nitrites, amides, esters, nitro compounds, sulfur compounds, and halogen compounds. These may be used either singly or in combination two or more of them as the solvent.

Specific preferable examples of such nonprotic polar solvent are acetonitrile, benzonitrile, propylene carbonate, ethylene carbonate, dimethyl carbonate, diethyl carbonate, ethymethyl carbonate, dimethylformamide, tetrahydrofuran, nitrobenzene, dichloroethane, diethoxyethane, 1,2-dimethoxyethane, chlorobenzene, γ-butyrolactone, dioxolan, sulfolan, nitromethane, dimethyl sulfide, dimethyl sufoxide, dimethoxy ethane, methyl formate, 3-methyl-2-oxdazolydinone, 2-methyltetrahydrofuran, 3-propylsydonone, sulfur dioxide, phosphoryl chloride, thionyl chloride, sulfuly chloride, and mixtures of these.

Of these, the solvents having a boiling point of more than 70° C. are preferred in a viewpoint that they are desirably prevented from being vaporized upon the production of the ion conductor structural body and they are also desirably prevented from being deteriorated when the ion conductor structural body is maintained at high temperature. And the solvents having a freezing point of less than −20° C. are preferred in a viewpoint that they are difficult to be coagulated even when the ion conductor structural body is maintained at low temperature and therefore, the ion conductivity of the ion conductor structural body is prevented from being deteriorated. Here, in the case where a certain solvent of the above-mentioned solvent can not satisfy the conditions relating to the boiling point and the coagulation point by itself, when it is used in a form of a mixed solvent with other solvent, the conditions can be satisfied, the solvent can be desirably used.

For the form of the ion conductor structural body, it can be optionally designed into a desired configuration depending upon the use purpose. Thus, there is no particular limitation also for the form of the polymer matrix constituting the ion conductor structural body. For instance, when the ion conductor structural body is configured in a film-like form and used in a rechargeable battery, it may take a manner wherein the polymer matrix is processed into a film-like form, a manner wherein the polymer matrix is made to comprise a powdery polymer matrix and the powdery polymer matrix is processed into a film-like form using a binder or the like, or a manner wherein the polymer matrix is made to comprise a powdery polymer matrix and the powdery polymer matrix is processed into a film-like form by means of heat press or the like.

At this time, in order to the mechanical strength of the ion conductor structural body, it is possible that the ion conductor structural body contains a retaining material comprising one or more kinds of materials selected from the group consisting of powder resin material (comprising a resin which is different from aforesaid binder, if necessary), powdery glass material, powdery ceramic material, nonwoven fabric, and porous film. It is preferred that the powder resin material, powdery glass material, and powdery ceramic material comprise a number of round particles, because they are capable of being contained in the ion conductor structural body in an uniformly distributed state. The amount of the retaining material to be contained in the ion conductor structural body is desired to be preferably in a range of 1 to 50 wt. % or more preferably in a range of 1 to 40 wt. % versus the total amount of the constituents of the ion conductor structural body, in view of the ion conductivity.

In the following, description will be made of a process of producing the ion conductor structural body of the present invention, which comprises at least the foregoing polymer, the foregoing solvent and the foregoing electrolyte.

The ion conductor structural body of the present invention can be produced, for instance, by a process comprising (i) a step of mixing a given monomer represented by the foregoing general formula (3) which has a side chain containing an alkyl group of more than 6 carbon atoms and a polyether group, a given solvent and a given electrolyte to obtain a mixture and (ii) a step of subjecting said mixture to a polymerization treatment to obtain a polymer matrix as an ion conductor structural body. Here, in the general formula (3), $R^1$ and $R^2$ are respectively H or alkyl group of 2 or less carbon atoms, A is a group containing at least a polyether group, and R3 is a group containing at least an alkyl group of 6 or more carbon atoms.

For instance, when in the above step (ii), the mixture containing the monomer having the side chain containing the alkyl group of more than 6 carbon atoms and the polyether group is subjected to polymerization, during the polymerization, the alkyl group and the polyether group are mutually repelled to each other while the alkyl groups being mutually associated to form a state in which the alkyl groups are orientated, for instance, as in a case where a surface active agent having a hydrophilic group and a hydrophobic group forms a orientated structure in a layer state. By forming a state in which a side chain portion having the alkyl group is orientated, a polymer having an orientated structure and in which the main chain portion itself has an orientation property is formed. The polymerization further proceeds while taking a state in which such orientated structure is formed and finally, there is formed a structure comprising a polymer matrix having an orientation property as a whole. In this way, there can be produced an ion conductor structural body having a polymer matrix in which the main chain portion and the side chain portion are respectively orientated as previously described.

As previously described, the present invention provides a process for producing an ion conductor structural body. The production process basically comprises a step of mixing a given monomer having a side chain containing an alkyl group of more than 6 carbon atoms and a polyether group, a given solvent and a given electrolyte to obtain a mixture and a step of subjecting said mixture to a polymerization treatment to obtain a polymer matrix as an ion conductor structural body.

A preferred embodiment of the production process will be described with reference to FIGS. 2 and 3.

FIG. 2 is a schematic flow chart for explaining a preferred embodiment of a process for producing an ion conductor structural body in the present invention. FIG. 3 is a schematic diagram illustrating an example of a polymerization apparatus used in the process shown in FIG. 2. In FIG. 3, reference numeral 301 indicates a polymerization vessel, reference numeral 302 a temperature control device, reference numeral 303 a light energy irradiation device, and reference numeral 304 a mixture which is subjected to polymerization.

Description will be made of the production process of the present invention with reference to FIG. 2.

Step A: A first monomer having a side chain containing an alkyl group of 6 or more carbon atoms and a polyether group in accordance with the general formula (1) a given solvent and a given electrolyte are mixed. If required, a second monomer whose side chain having one or more kinds of polar groups selected from the group consisting of polyether group, cyano group, amino group and amide group, and a polymerization initiator are additionally mixed. Further, if required, a third monomer capable of forming a crosslinking structure is also additionally mixed. Thus, a mixture is obtained. The resultant mixture is stirred until the mixture is homogenized.

Step B: The homogenized mixture (304) is introduced into the polymerization vessel 301 of the polymerization apparatus shown in FIG. 2.

Step C: The mixture 304 contained in the polymerization vessel 301 is subjected to a polymerization treatment by applying activation energy such as heat energy by the temperature control device 302 or light energy by the light energy irradiation device 303 to the mixture 304 contained in the polymerization vessel 301, whereby the monomer(s) in the mixture 304 is polymerized by way of polymerization reaction by virtue of said activation energy to obtain a polymerized product.

Step D: The polymerized product is taken out from the polymerization apparatus. Thus, there is obtained an ion conductor structural body.

The addition amount of each monomer in Step A is adjusted, for example, as follows. The addition amount of the first monomer and that of the second monomer are adjusted so that the mixing ratio of them becomes to be preferably in a range of 0.01 to 1 or more preferably in a range of 0.02 to 0.5 in terms of a ratio of the moles number of the first monomer/that of the second monomer. This makes it possible to achieve good affinity between the resulting polymer matrix and the solvent contained therein.

In the case where the third monomer is used, the addition amount of thereof is adjusted so that the mixing ratio thereof becomes to be preferably in a range of 0.1 to 30 or more preferably in a range of 1 to 10 in terms of a ratio of (the moles number of the first monomer+the moles number of the second monomer)/the moles number of the third monomer. This makes it possible to stably form an ion conducting path in the resulting polymer matrix and to achieve good mechanical strength for said polymer matrix.

The addition amount of the solvent is desired to be preferably in a range of 0.5 to 20 or more preferably in a range of 1 to 10 in terms of a ratio of the weight of the solvent/the sum of the weights of the first to third monomers.

The polymerization treatment in Step C is preferred to be formed, except for a case where gas is generated by the polymerization reaction, in an enclosed system because the composition of a polymerized product afforded is prevented from being changed due to vaporization of the solvent or the monomers. If necessary, it is possible to perform the polymerization treatment while agitating the mixture 304 contained in the polymerization vessel 301 by means of ultrasonic dispersion or the like or while maintaining the temperature of the mixture 304 contained in the polymerization vessel 301 at a prescribed constant temperature in order to prevent occurrence of a separation in a polymerized product afforded, due to precipitates or the like of the monomers.

Further, the polymerization treatment in Step C is preferred to be performed while applying a magnetic field or an electric field to the mixture 304 or while contacting the mixture 304 with a substrate having a hydrophobic surface (including a substrate having a surface applied with a surface treatment by a rubbing treatment or a hydrophobic treatment) in order that a polymer matrix afforded has an improved orientation property. When the polymerization treatment of the mixture 304 is performed while contacting the mixture with the hydrophobic surface of the substrate, an ion conducting path is apt to be readily formed in a polymer matrix afforded. Thus, this method is more preferred. Such hydrophobic surface-bearing substrate is desired to have an aqueous contact angle of preferably more than 20° or more preferably more than 50°. It is preferred for the hydrophobic surface-bearing substrate to have a prescribed aqueous contact angle uniformly over the entire surface, because said ion conducting path will be formed in a uniform state in this case. The hydrophobic surface-bearing substrate may be in a desired form such as a particle-like form, a plate-like form, or a cylindrical form. Of these, the plate-like form is preferred in a viewpoint that the direction of aforesaid ion conducting path formed can be stably and uniformly controlled. Specific examples of such hydrophobic surface-bearing substrate, there can be mentioned substrates formed of a hydrophobic resin selected from the group consisting of fluororesins (such as tetrafluoroethylene, polyvinylidene fluoride, and vinylidene fluoride-hexafluoropropylene copolymer), polyethylene, and polypropylene; substrates made of a metal or glass and which have a surface on which a fluororesin film formed of a fluororesin selected from the group consisting of tetrafluoroethylene, polyvinylidene fluoride, and vinylidene fluoride-hexafluoropropylene copolymer, a polyethylene film or a polypropylene film is laminated; substrates made of a metal or glass and which have a surface coated by a hydrophobic resin selected from the group consisting of fluororesins (such as tetrafluoroethylene, polyvinylidene fluoride, and vinylidene fluoride-hexafluoropropylene copolymer), polyethylene, or polypropylene; and glass substrates whose hydroxyl group has been chemically substituted by a hydrophobic group using a silyling agent or the like. Besides, in the case where an ion conductor structural body of the present invention is provided between the anode and the cathode of a rechargeable battery, there can be mentioned an electrode structural body prepared by incorporating a hydrophobic resin selected from the group consisting of fluororesins (such as tetrafluoroethylene, polyvinylidene fluoride, and vinylidene fluoride-hexafluoropropylene copolymer), polyethylene, and polypropylene thereinto as the hydrophobic surface-bearing substrate.

When such hydrophobic surface-bearing substrate is contacted with the mixture 304 in the polymerization vessel 301, it is preferred to use a polymerization vessel designed to have at least a plane comprising the hydrophobic surface-bearing substrate therein as the polymerization vessel 301. For instance, in the case where a film-like polymer is formed in this polymerization vessel, when the film-like polymer is afforded in a state that the widest face thereof is contacted with the hydrophobic surface-bearing substrate, an ion conducting path becomes to be readily formed in a film thickness direction. This is desirable. In this case, it is more desirable to make such that the film-like polymer is afforded in a state that the opposite sides of the widest face thereof are contacted with the hydrophobic surface-bearing substrate.

For the method for performing the polymerization reaction, there is adopted an appropriate polymerization method depending on the kind of the polymer used. However, it is preferred to adopt a polymerization method using heat energy or ultraviolet light energy, because the polymerization of the monomers can be readily controlled.

In addition, it is preferred to use radical polymerization reaction as the polymerization reaction in Step C, because the polymerization treatment of the mixture 304 can be performed under mild condition. In the case where the polymerization treatment is performed by way of the radical polymerization reaction using ultraviolet light energy, it is preferred that the mixture to be polymerized is maintained constant at a prescribed temperature by heating or cooling the mixture, because the polymerization treatment of the mixture can be stably performed while preventing the temperature thereof from being changed due to the heat caused by the reaction or the infrared from the light source.

Separately, it is preferred to conduct a step of forming a crosslinking structure besides the step of performing the polymerization reaction, the ion conducting path formed in the polymer matrix as the ion conductor structural body is more stabilized and the mechanical strength is more improved. As the method of forming the crosslinking structure, there can be mentioned a method wherein a crosslinking structure is formed after the completion of the polymerization treatment and a method wherein to form the crosslinking structure is performed simultaneously with the polymerization treatment. As the method of forming the crosslinking structure after the completion of the polymerization treatment, there can be mentioned a method wherein using a monomer capable forming a crosslinking structure in a polymer afforded, a radical generating agent is added to generate radicals whereby causing crosslinking reaction or ultraviolet light, electron beam, gamma ray, heat ray, or plasma is radiated to generate radicals whereby causing crosslinking reaction; and a method wherein active groups of a polymer chain of a polymer afforded are partly reacted with a crosslinking agent to cause crosslinking reaction. As the method of forming the crosslinking structure simultaneously with the polymerization treatment, it is possible to adopt any of the above-mentioned methods. However, it is preferred to adopt a method wherein the third monomer capable of forming a crosslinking structure is added to the foregoing mixture containing the first monomer, and if required, the second monomer and the resultant mixture is subjected to the polymerization treatment, because a polymer matrix as an ion conductor structural body in which an ion conducting path is more stably and more uniformly formed is afforded in this case.

For the polymer matrix obtained in the way as above described, it is preferred to be treated by a method of applying a magnetic field or an electric field or by a drawing treatment method in order to improve the orientation property thereof. When any of these methods is performed while heating the polymer matrix, the orientation property of the polymer matrix is more improved.

Separately, besides the method wherein the ion conductor structural body (the polymer matrix) is formed in accordance with the use form, it is possible to adopt a method wherein the ion conductor structural body obtained is used by cutting it to have a desired form and a method wherein the ion conductor structural body obtained is used by pulverizing it into a powdery polymer material and molding the resultant together with a binder into a desired form. Besides, it is also possible to adopt a method wherein the powdery polymer material obtained by pulverizing the ion conductor structural body is processed into a film-like form.

Further, upon forming the ion conductor structural body in the above, it is possible to make such that the ion conductor structural body contain a retaining material. As the method to do this, there can be mentioned a method wherein an appropriate retaining material is introduced into the polymerization vessel 301 together with the mixture for forming a polymer matrix and the mixture containing the retaining material is subjected to the polymerization treatment and a method wherein the polymer material obtained by pulverizing the ion conductor structural body (the polymer matrix) is mixed with an appropriated retaining material or the polymer material is sustained by an appropriate retaining material. As such retaining material, there can be mentioned resin powder, glass powder, ceramic powder, and mixtures of these. Besides, nonwoven fabrics and porous films are also usable as the retaining material. The amount of the retaining material to contained in the ion conductor structural body is desired to be controlled to fall preferably in a range of 1 to 50 wt. % or more preferably in a range of 1 to 40 wt. % versus the sum amount of the constituents of the ion conductor structural body. In this case, there are provided advantages such that the mechanical strength of the ion conductor structural body as a whole, an ion conducting path which extends along the interface between the retaining material and the ion conductor itself is adequately formed, and the occupation volume of the ion conductor itself is diminished. Separately, it is preferred to use the retaining material after the surface thereof is treated by means of corona discharge treatment or plasma treatment, in order to improve the affinity and adhesion of the retaining material with the ion conductor itself.

In the following, detailed description will be made of each of the first monomer, the second monomer, the third monomer, the solvent, the electrolyte, and the polymerization initiator which are used in the above-described process for an ion conductor structural body in the present invention.
First Monomer:

As the first monomer, there is used a monomer having a side chain containing an alkyl group of 6 or more carbon atoms and a polyether group, which has a chemical structure represented by the foregoing general formula (3). As long as the first monomer is a monomer having a chemical structure represented by the general formula (3), it may have other functional group.

Although previously having described, $R^1$ and $R^2$ in the general formula (3) are respectively H or an alkyl group of 2 or less carbon atoms. In a preferred embodiment, $R^1$ and $R^2$ are respectively H or a methyl group. In this case, a polymer matrix afforded has an improved orientation property. As long as substituent group $R^3$ is a group having at least an alkyl group of 6 or more carbon atoms, it may have other functional group. Further, the substituent group $R^3$ may be a straight chain alkyl group or a branched chain alkyl group. However, it is desired that the substituent group $R^3$ is preferably a straight chain alkyl group of 6 to 22 carbon atoms or a alkyl benzyl group having a straight chain alkyl group of 6 to 22 carbon atoms or more preferably a straight chain alkyl group of 8 to 18 carbon atoms, in a viewpoint to form an ion conducting path.

As long as the substituent group A in the general formula (3) is a group containing a polyether group, namely, a group containing a group having more than two ether structures represented by C—O—C, it may have other functional group, or it may be of a straight chain or branched chain structure. Particularly, it is desired to be a group containing preferably at least a group selected from the group consisting of —(CH$_2$—CH$_2$—O)$_n$—, —(CH$_2$—CH(CH$_3$)—O)$_n$—, and —(CH$_2$—CH$_2$—O)$_m$—(CH$_2$—CH(CH$_3$)—O)$_n$— [wherein m and n are respectively a positive integer], more preferably a group containing at least —(CH$_2$—CH$_2$—O)$_n$— [wherein n=2 to 100], most preferably a group containing at least —(CH$_2$—CH$_2$—O)$_n$— [wherein n=5 to 30], in a viewpoint to form an ion conducting path.

In the structure of the general formula (3), it is desired that the ratio between the polyether group of the substituent group A and the alkyl group of the substituent group $R^3$ is preferably in a range of 0.05 to 3.0 or more preferably in a range of 0.1 to 1.0 as a ratio of the molecular weight of the alkyl group of the substituent group $R^3$/the molecular weight of the polyether group of the substituent group A, in a viewpoint that an ion conducting path is formed such that it is stably orientated in this case.

Further, it is desired that the ratio between the group —(CH$_2$—CH$_2$—O)$_n$— of the substituent group A and the alkyl group of the substituent group $R^3$ is preferably in a range of 0.05 to 10 or more preferably in a range of 0.5 to 5.0 as a ratio of the number of carbon atoms of the alkyl group of the substituent group $R^3$/the number of the n of the group —(CH$_2$—CH$_2$—O)$_n$— of the substituent group A.

As preferable specific examples of the first monomer, there can be mentioned those compounds as will be described below:
tetraethyleneglycol n-octylethermethacrylate,
hexaethyleneglycol n-dodecylethermethacrylate,
octaethyleneglycol n-hexadecylethermethacrylate,
eicosaethyleneglycol n-octadecylethermethacrylate,
tetraethyleneglycol n-octyletheracrylate,
tetraethyleneglycol n-octyletheracrylate,
hexaethyleneglycol n-dodecyletheracrylate,
octaethyleneglycol n-hexadecyletheracrylate,
eicosaethyleneglycol n-octadecyletheracrylate,
hexaethyleneglycol n-nonylphenylethermethacrylate, and
eicosaethyleneglycol n-nonylphenylethermethacrylate.
Second Monomer:

As the second monomer, there is used a monomer whose side chain having one or more kinds of polar groups selected from the group consisting of polyether group, cyano group, amono group and amide group, which has a chemical structure represented by the foregoing general formula (4). As long as the second monomer is a monomer having a chemical structure represented by the general formula (4), it may have other functional group.

As previously having described, $R^3$ and $R^4$ in the general formula (4) are respectively H or an alkyl group of 2 or less carbon atoms. In a preferred embodiment, $R^3$ and $R^4$ are respectively H or a methyl group. In this case, a polymer matrix afforded has an improved orientation property. As long as the substituent group B in the general formula (4) is a group having at least a polar group selected from the group consisting of polyether group, cyano group, amino group, amide group and carbonate group, it may have other functional group. Further, the substituent group B may have a straight chain or branched chain alkyl group.

However, it is desired that the substituent group B is preferably a group containing at least a group selected from the group consisting of —(CH$_2$—CH$_2$—O)$_n$—Z, —(CH$_2$—CH(CH$_3$)—O)$_n$—Z, —(CH$_2$—CH$_2$—O)$_m$—(CH$_2$—CH(CH$_3$)—O)$_n$—Z, —(CH$_2$—CH(CH$_3$)—O)$_m$(CH$_2$—CH$_2$—O)$_n$—Z, —(CH$_2$—CH$_2$—O)$_k$—(CH$_2$—CH(CH$_3$)—O)$_m$—(CH$_2$—CH$_2$—O)$_n$—Z, and —(CH$_2$—CH(CH$_3$)—O)$_k$—(CH$_2$—CH$_2$—O)$_m$—(CH$_2$—CH(CH$_3$)—O)$_n$—Z [wherein k, m and n are respectively a positive integer, and Z is H or an alkyl group of 1 to 4 carbon atoms] or more preferably a group containing at least —(CH$_2$—CH$_2$—O)$_n$—Z [wherein n=2 to 100, and Z is H or an alkyl group of 1 to 4 carbon atoms].

As preferable specific examples of the second monomer, there can be mentioned those compounds as will be described below:
tetraethyleneglycolmethylethermethacrylate,
hexaethyleneglycolethylethermethacrylate,
octaethyleneglycol n-butylethermethacrylate,
eicosaethyleneglycolmethylethermethacrylate,
tetraethyleneglycolethylyethermethacrylate,
hexaethyleneglycolmethyletheracrylate,
octaethyleneglycolmethyletheracrylate, and
eicosaethyleneglycolethyletheracrylate.

Third Monomer:

As the third monomer, there is used a monomer capable of forming a crosslinking structure. Specifically, as such monomer, there can be mentioned a monomer capable of forming a physical bond such as an ion bond which is bonded by way of forming a hydrogen bond or ion pair and a monomer capable of forming a chemical bond comprising a covalent bond. However, the physical bond such as hydrogen bond or the like has a tendency in that the bond is broken due to temperature change or pH change to cause a change in the bond state. Therefore, it is preferred to use a monomer capable of forming a chemically bonded covalent bond which is slightly changed due to temperature change or pH change. Such monomer is preferred to have a polymerizable functional group capable of being polymerized with three or more other monomers. Particularly, it is preferred to have a polymerizable functional group capable of being polymerized with three or more other monomers only in the polymerization reaction in the above—described Step C. As such polymerizable functional group, there can be mentioned groups capable of forming a covalent bond such as an ester bond, an amide bond, an ether bond, or an urethane bond by way of condensation polymerization, polycondensation, ring-opening polymerization, or the like and vinyl groups capable of performing addition polymerization. Of these, vinyl groups and cyclic ether groups such as epoxide groups are preferred. The vinyl group can include vinyl group which is generally so called, allyl group, acryl group, methacryl group, and croton group. The epoxide group can include alkylene oxide groups such as ethylene oxide group, propylene oxide group, and glycidyl ether group. Compounds having two or more vinyl groups such as divinyl compounds and trivinyl compounds can be mentioned as preferable specific examples of the third monomer.

Particularly, as preferable specific examples as the third monomer capable of forming a crosslinking structure, there can be mentioned monomers (compounds) which are represented by the following general formula (7).

In the general formula (7), $R^7$ to $R^{12}$ are respectively H or an alkyl group, or preferably, H or a methyl group. Z is a group capable of forming a crosslinking structure. There is no particular limitation for the group Z as long as the both sides thereof have a bonding hand capable of being bonded to certain atom of other group as shown in the general formula (7). Specifically, the group Z is preferred to be a group having at least one kind of a substituent group selected from the group consisting of —CO—, —OCOO—, —CONH—, —CONR—, —OCONH—, —NH—, —NHR—, —SO—, —SO$_2$— (R is an alkyl group), and an ether group or a functional group. The group Z is more preferred to be a polyether group containing two or more ether groups.

As preferable specific examples of the compounds represented by the general formula (3) which are usable as third monomer, there can be mentioned vinyl acrylate, ethyleneglycoldimetacrylate, hexaethyleneglycoldiacrylate, dodecaethyleneglycoldiacrylate, eicosaethyleneglycoldimethacrylate, N,N'-methylenebisacrylamide, diethyleneglycoldimethacrylate, diethyleneglycolbisacrylcarbonate, 1,4-butanedioldiacrylate, pentadecanedioldiacrylate, 1,10-decanedioldimetacrylate, neopentylglycoldimethacrylate, diallylether, diallylsulfide, glycerindimetacrylate, 2-hydroxy-3-acryloxypropylmethacrylate, 2-methaacryloxyethylacid phosphate, dimethyloltricyclodecanediacrylate, hydroxypivalicacid neopentylglycoldiacrylate, bisphenolA diacrylate, and ethyleneoxide addition diacrylate of bisphenol A.

Solvent:

As the solvent used in Step A of the process for producing an electrode structural body in the present invention, it is preferred to use an appropriate solvent which can function as a plasticizer of the ion conductor structural body of the present invention, which can dissolve the monomers without hindering the polymerization reaction of them, and which also can dissolve the electrolyte. It is more preferred to use a solvent which can satisfy these conditions and which can have a high affinity with a polymer matrix afforded as a result of the polymerization reaction, in a viewpoint of forming an uniform polymer matrix. And in the case where the solvent is removed at a later stage, the solvent is preferred to have a high volatility.

As preferable specific examples of such solvent usable as the solvent used in the production process of the present invention, there can be mentioned methanol, ethanol, 1-propanol, 2-propanol, 1-butanol, ethylene glycol, glycerin, diethyl ether, diisopropyl ether, tetrahydrofuran, tetrahydropyran, 1,2-methoxyethane, diethyleneglycol dimethyl ether, acetone, ethyl methyl ketone, cyclohexanone, ethyl acetate, butyl acetate, ethylene carbonate, propylene carbonate, dimethyl carbonate, diethyl carbonate, ethylmethyl carbonate, formamido, N,N-dimethylformamide, N,N-dimethylacetamide, 1,3-dimethyl-2-imidazolidinone, N-methylpyrrolidone, acetonitrile, propionitrile, succinonitrile, benzonitrile, ethylenediamine, triethyleneamine, aniline, pyridine, piperidine, morpholine, methylene chloride, chloroform, 1,2-dichloroethane, chlorobenzene, 1-bromo-2-chloroethane, nitromethane, nitrobenzene, o-nitrotoluene, diethoxyethane, 1,2-dimethoxyethane, δ-butyrolactone, dioxolan, sulfolane, dimethyl sulfide, dimethyl sulfoxide, dimethoxyethane, methyl formate, 3-methyl-2-oxazolidinone, 2-methlytetrahydrofuran, sulfur dioxide, phosphoryl chloride, thionyl chloride, and sulfuryl chloride. These may be used either singly or in combination of two or more of them as mixed solvents.

In the case where a certain solvent selected from the above-mentioned solvents which is difficult to entirely dissolve the monomers is used, it is possible to add a dispersing agent such as a surface active agent to the solvent. In this case, the amount of the dispersing agent to be added to the solvent is desired to be preferably less than 4 wt. % or more preferably less than 3 wt. % versus the amount of the solvent. When the dispersing agent in an amount to exceed 4 wt. % is added, there will be occurred disadvantages such that an ion conducting path having a good orientation property is difficult to be formed in a polymer matrix formed or when said polymer matrix should be well washed, the dispersing agent in a relatively large amount is liable to remain therein to deteriorate the ion conductivity thereof.

Polymerization Initiator:

As the polymerization initiator used in the production process of the present invention, an appropriate polymerization initiator is selectively used depending on the polymerization method such as condensation polymerization, addition polymerization, ring opening polymerization, or the like or the reaction mechanism such as radical polymerization, cation polymerization, anion polymerization, or the like.

As specific examples of the polymerization initiator usable in the production process of the present invention, there can be mentioned azo compounds such as azobisisobutyronitrile, peroxide compounds such as benzoyl peroxide, light absorption decomposing compounds such as potassium persulfate, ammonium persulfate, ketone compounds, and metallocene compounds, inorganic acids such as $H_2SO_4$, $H_3PO_4$, $HClO_4$, and $CCl_3CO_2H$, Friedel-Craft catalysts such as $BF_3$, $AlCl_3$, $TiCl_4$, and $SnCl_4$, $I_2$, $(C_6H_5)_3CCl$, alkali metal compounds, and magnesium compounds. The amount of the polymerization initiator to be added is preferred to be preferably in a range of 0.001 to 10 wt. % or more preferably in a range of 0.01 to 5 wt. % versus the total amount of the monomers used. By properly determining the addition amount of the polymerization initiator in the above range depending on the situation, the monomers are efficiently polymerized to afford a polymer matrix having good mechanical strength.

Electrolyte:

As the electrolyte used in the production process of the present invention, those mentioned in the foregoing description of the ion conductor structural body of the present invention can be optionally used.

In the following, description will be made of the rechargeable battery of the present invention and the process for the production thereof.

A typical embodiment of the rechargeable battery of the present invention comprises (a) an anode, (b) a cathode and (c) an ion conductor structural body provided between said anode and said cathode, said anode having a face which is opposed to a face of said cathode, wherein in that said ion conductor structural body (c) comprises the foregoing ion conductor structural body of the present invention, and the ion conductor structural body is arranged to contact with the anode (a) and the cathode (b) so that an ion conductivity in a direction of connecting said face of said anode (a) and said face of said cathode (b) is increased. The assembly comprising the anode, the ion conductor structural body, and the cathode is enclosed by a battery housing. In the rechargeable battery, because of using the ion conductor structural body in which the electrolyte solution is retained in an immobilized state (that is, a plasticized state), there is not a fear that the electrolyte solution is leaked to the outside, and the battery can be readily sealed in a desirable state by an appropriate housing even when it is relatively thin. Thus, the rechargeable battery of the present invention may be shaped in a desired form such as a sheet-like form, a flat round form, a cylindrical form, or a prismatic form. The structure of the rechargeable battery of the present invention may take a single layer structure, a multi-layer structure, a spiral-wound cylindrical structure, or the like. In the case where the rechargeable battery is of a spiral-wound cylindrical structure, the anode, separator (ion conductor), and cathode are arranged in the named order and they are spiral-wound and because of this, it has advantages such that the battery area can be increased as desired and a high electric current can be flown upon charging and discharging. In the case where the rechargeable battery is of a prismatic structure or a single layer structure, there is an advantage in that it is possible to make a housing device have a large area so that a large-sized rechargeable battery can be installed therein.

Figure 4:
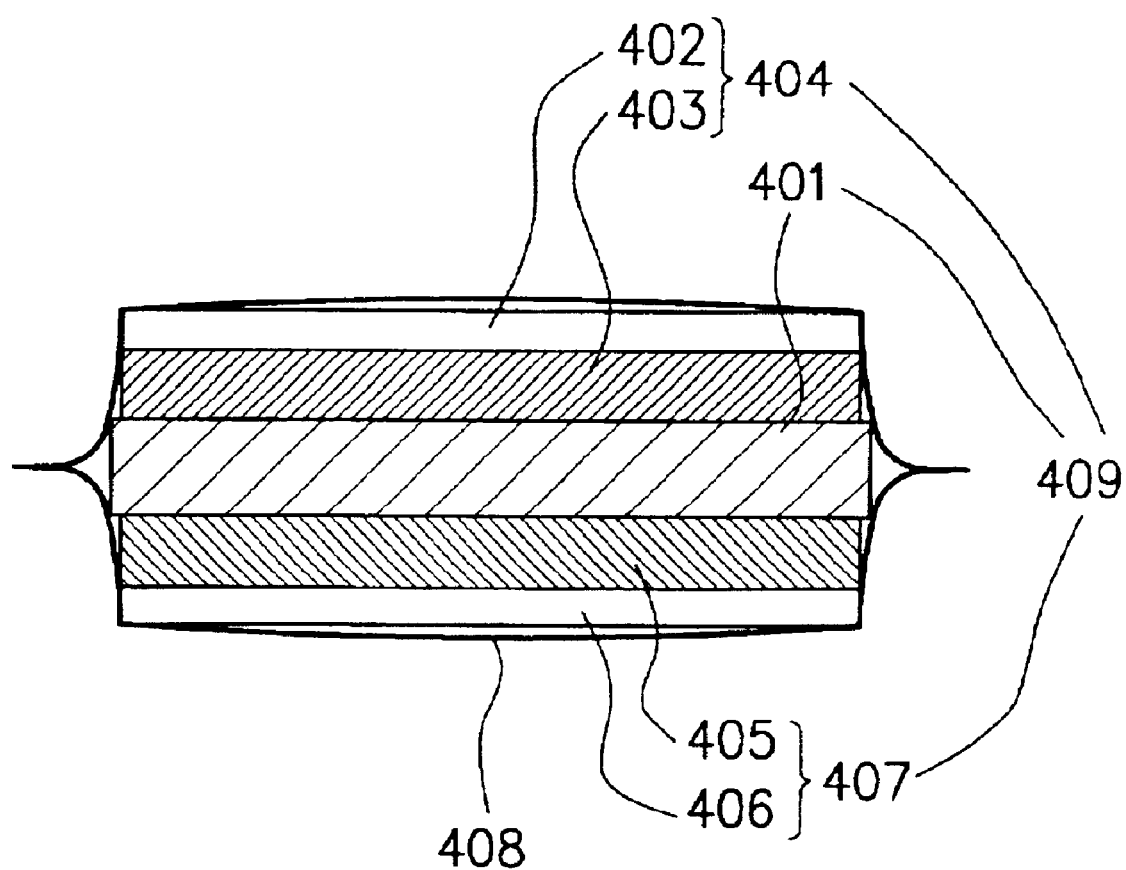
FIG. 4 is a schematic cross-sectional view illustrating the structure of an example of a rechargeable battery according to the present invention.

Detailed description will be made of concrete embodiments of the rechargeable battery of the present invention with reference to FIG. 4 and FIG. 5. It should be understood that these embodiments are only for the explanation purpose and are not intended to restrict the present invention. Particularly, FIG. 4 is a schematic cross-sectional view illustrating an example of a single-layer sheet type rechargeable battery of the present invention. And FIG. 5 is a schematic cross-sectional view illustrating an example of a single-layer flat round type (coin type) rechargeable battery of the present invention.

In FIG. 4, reference numeral 401 indicates an ion conductor structural body (comprising the ion conductor structural body of the present invention), reference numeral 402 an anode collector, reference numeral 403 an anode active material, reference numeral 404 an anode comprising a layer of the anode active material 403 disposed on the anode collector 402, reference numeral 405 a cathode active material, reference numeral 406 a cathode collector, reference numeral 407 a cathode comprising a layer of the cathode active material 405 disposed on the cathode collector 406, reference numeral 408 a battery housing, and reference numeral 409 an electrode stacked body.

Figure 5:
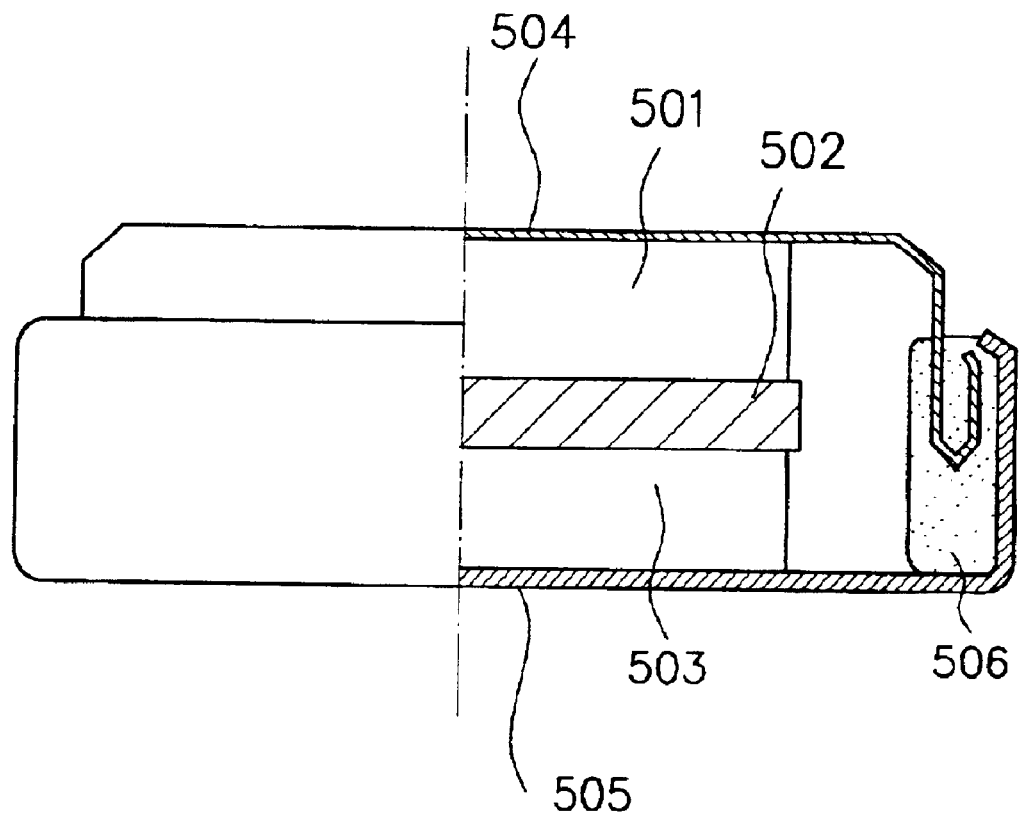
FIG. 5 is a schematic cross-sectional view illustrating the structure of another example of a rechargeable battery according to the present invention.

In FIG. 5, reference numeral 501 indicates an anode, reference numeral 502 an ion conductor structural body (comprising the ion conductor structural body of the present invention), reference numeral 503 a cathode, reference numeral 504 an anode can (an anode terminal), reference numeral 505 a cathode can, and reference numeral 506 a gasket. Although this is not shown in FIG. 5, the anode 501 comprises an active material layer disposed on an anode collector and the cathode 503 comprises a cathode active material layer disposed on a cathode collector.

The rechargeable batteries shown in FIGS. 4 and 5 are of a single layer structure. Any of these rechargeable batteries may be of a multi-layer structure in that a plurality of single layer structures comprising the ion conductor structural body (401, 502) sandwiched between the anode (404, 501) and the cathode (407, 503) are stacked.

The rechargeable battery shown in FIG. 4 may be fabricated by forming an electrode stacked body 409 having a structure comprising the ion conductor structural body 401 sandwiched between a pair of electrodes, that is, the anode 404 and the cathode 407, inserting the electrode stacked body into a battery housing 408 and subjecting the resultant to a caulking treatment to seal it as shown in FIG. 4.

As the method of forming the an electrode stacked body 409, there can be mentioned, for example, methods (i) to (iii) as will be described below.

(i) As the ion conductor structural body 401, there is provided a film-like ion conductor structural body produced in accordance with the foregoing method for the production of the ion conductor structural body of the present invention. The anode 404 and the cathode 407 are laminated respectively on one of the opposite faces of the film-like ion conductor structural body such that their active material layers (403, 405) are opposed to each other through the ion conductor structural body.

(ii) As the ion conductor structural body 401, a film-like ion conductor structural body is formed on the surface of the active material layer (403 or 405) of the anode 404 or the cathode 407 in accordance with the foregoing method for the production of the ion conductor structural body of the present invention, and the anode 404 and the cathode 407 are contacted to each other through their active material layers (403, 405) one of which having film-like ion conductor structural body so that the film-like ion conductor structural body is sandwiched positioned between the two active material layers (403, 405). In this case, it is possible to interpose a film-like ion conductor structural body produced in accordance with the foregoing method for the production of the ion conductor structural body of the present invention between the ion conductor structural body which is formed on the active material layer (403 or 405) and the active material layer (405 or 403) on which no ion conductor structural body is formed. Alternatively, a film-like ion conductor structural body is formed on the surface of each of the active material layers (403, 405) of the anode 404 and the cathode 407 in accordance with the foregoing method for the production of the ion conductor structural body of the present invention, and the anode 404 and the cathode 407 are contacted to each other through their active material layers (403, 405) each having the film-like ion conductor structural body thereon so that the two film-like ion conductor structural bodies are sandwiched between the two active material layers (403, 405). In this case, it is also possible to interpose a film-like ion conductor structural body produced in accordance with the foregoing method for the production of the ion conductor structural body of the present invention between the two ion conductor structural bodies.

(iii) The anode 403 and the cathode 407 are opposed to each other through their active material layers (403, 405) by providing a gap between the two active material layers (403, 405) so that the two active material layers (403, 405) are not mutually contacted, and in accordance with the foregoing method for the production of the ion conductor structural body of the present invention, an ion conductor structural body is formed in said gap, for example, by introducing such a starting mixture for forming a polymer matrix as previously described in the process for the production of the ion conductor structural body of the present invention in aforesaid gap and subjecting the mixture present in the gap to a polymerization treatment, for instance, by way of heat polymerization. The polymerization treatment of the mixture present in the gap may be performed after having been sealed by the battery housing 408.

Incidentally, when the anode or/and the cathode contains an ion conductor structural body of the present invention, the adhesion of the electrode with the ion conductor structural body is more improved and the interfacial resistance between the electrode and the ion conductor structural body is desirably diminished, where the ion conductivity in the electrode is improved and the charge-and-discharge efficiency of the rechargeable battery is improved.

As the method of making the electrode contain the ion conductor structural body, there can mentioned, for example, a method wherein a solution containing at least one or more kinds of materials selected from the group consisting of monomer, oligomer and polymer which are capable of being starting materials to form a polymer matrix of an ion conductor structural body is impregnated in the active material layer of the electrode and the solution is subjected to a polymerization treatment or a crosslinking treatment to form an ion conductor structural body in the active material layer, and a method wherein an ion conductor structural body in a powdery form is admixed in an active material for forming an active material layer of the electrode, followed by forming said active material layer on a collector.

In the rechargeable battery shown in FIG. 5, a stacked body in which the anode 501 (comprising an anode active material layer formed on an anode collector) and the cathode 503 (comprising a cathode active material layer formed on a cathode collector) are stacked through the ion conductor structural body 502 is accommodated in the cathode can 505 (which serves as the cathode terminal) from the cathode side, and the anode side of the stacked body accommodated in the cathode can is covered by the anode cap 504 (which serves as the anode terminal), and the gasket 506 is arranged in the remaining space in the cathode can.

The rechargeable battery shown in FIG. 5 may be fabricated, for example, as will be described below.

(1) An electrode stacked body comprising an ion conductor structural body (502) interposed between an anode (501) and a cathode (503) is prepared in accordance with any of the foregoing methods (i) to (iii) and it is positioned in the cathode can (505).

(2) The electrode staked body is assembled with the anode cap (504) and the gasket (506).

(3) The assembled body obtained in the step (2) is subjected to a caulking treatment, whereby the rechargeable lithium battery is completed.

In the battery fabrication, the preparation of the materials for the rechargeable battery and the assembly of the battery are desired to be conducted in a dry air atmosphere whose moisture having been sufficiently removed or in a dry inert gas atmosphere.

Description will be made of the members used in the fabrication of the rechargeable battery with reference to FIG. 4.

Anode 404:

The anode 404 comprises the collector 402 and the anode active material layer 403 comprising an active material. The term "active material" is a general term of materials which are engaged in the electrochemical reaction of charging and discharging (repetition of said reaction) in the rechargeable battery.

In the case where the rechargeable battery is a rechargeable lithium battery in which oxidation-reduction reaction of lithium ion is used, as the material used in the anode active material layer 403, there can be mentioned materials capable of retaining lithium upon charging such as lithium metals, metals capable of being electrochemically alloyed with lithium, and carbonous materials and transition metal compounds which are capable of intercalating lithium. Such metal capable of being electrochemically alloyed with lithium can include Bi, In, Pb, Si, Ag, Sr, Ge, Zn, Sn, Cd, Sb, Tl, and Hg. The metal preferably comprises an alloy having an amorphous phase, particularly an amorphous alloy of Sn, from a standpoint of improving the adhesion of the anode to the ion conductor structural body. The transition metal compound can include transition metal oxides, transition metal nitrides, and transition metal carbides. The transition metal element of these transition metal compounds can include metal elements having a d-shell or f-shell. Specific examples of such metal element are Sc, Y, lanthanides, actinides, Ti, Zr, Hf, V, Nb, Ta, Cr, Mo, W, Mn, Tc, Re, Fe, Ru, Os, Co, Rh, Ir, Ni, Pb, Pt, Cu, Ag, and Au. Of these, Ti, V, Cr, Mn, Fe, Co, Ni and Cu, which belong to the first transition system metal elements, are particularly preferable.

In the case where the anode active material is in a powdery form, the anode active material layer is formed by mixing said powder anode active material with a binder, if necessary and an electrically conductive auxiliary to obtain a mixture and applying said mixture on the collector by means of coating, and if necessary, press-forming the mixture on the collector, whereby forming the anode. In the case where the anode active material is in a foil or plate-like form, such anode active material is affixed on the surface of the collector to form the anode. Besides, it is possible to form the anode by forming a film of any of the above mentioned materials as the anode active material on the surface of the collector by means of plating of film deposition technique. The film deposition technique include CVD, electron beam evaporation, and sputtering. In any case, the resultant anode is necessary to be sufficiently dried under reduced pressure.

The above binder used upon forming the anode can include polyolefins such as polyethylene and polypropylene, fluororesins such as polyvinylidene fluoride and tetrafluoroethylene polymer, polyvinyl alcohol, cellulose, and polyamide. In the case where an ion conductor structural body is directly formed on the anode, it is preferred to use a hydrophobic binder comprising such fluororesin or the like, in a viewpoint that a polymer matrix afforded has an improved orientation property.

The collector of the anode serves to efficiently supply electric current which is consumed in the buttery reaction upon charging and discharging or efficiently collect electric current generated. Thus, it is desired that the anode collected is constituted by a material which is highly electrically conductive and which is inactive in the battery reaction. Such material can include metals such as Ni, Ti, Cu, Al, Pt, Pd, Au, and Zn, alloys of these metals such as stainless steel, and composite metals comprising two or more of the metals illustrated. The anode collector may be configured in a desired form such as a plate form, a foil form, a mesh form, a sponge form, a fiber form, a punching metal form, or an expanded metal form.

Cathode 407:

The cathode 407 comprises the collector 406 and the cathode active material layer 405 comprising an active material.

In the case where the rechargeable battery is a rechargeable lithium battery in which an oxidation-reduction reaction of a lithium ion is used, as the material used in the cathode active material layer 405, there can be mentioned transition metal compounds that are capable of retaining lithium upon discharging and which are capable of intercalating lithium. Such transition metal compound can include transition metal oxides, transition metal nitrides, and transition metal carbides. The transition metal element of these transition metal compounds can include metal elements having a d-shell or f-shell. Specific examples of such metal element are Sc, Y, lanthanides, actinides, Ti, Zr, Hf, V, Nb, Ta, Cr, Mo, W, Mn, Tc, Re, Fe, Ru, Os, Co, Rh, Ir, Ni, Pb, Pt, Cu, Ag, and Au. Of these, Ti, V, Cr, Mn, Fe, Co, Ni and Cu, which belong to the first transition system metal elements, are particularly preferable. In the case where a material containing no lithium is used as the anode active material upon the fabrication of a rechargeable lithium battery, it is preferred to use a lithium-transition metal oxide compound containing lithium in advance as the cathode active material.

The cathode 407 is preferred to comprise a cathode collector (406) and a cathode active material layer (405) comprising a cathode active material, an electrically conductive auxiliary, and a binder. The cathode may be formed by forming a cathode active material layer comprising a cathode active material, an electrically conductive auxiliary, and a binder on the cathode collector.

The electrically conductive auxiliary can include carbon blacks such as graphite, ketjen black and acetylene black, and powdery metallic material such as nickel powder.

As specific examples of the binder used upon forming the cathode, there can be mentioned polyolefins such as polyethylene and polypropylene, fluororesins such as polyvinylidene fluoride and tetrafluoroethylene polymer, polyvinyl alcohol, cellulose, and polyamide. In the case where an ion conductor structural body is directly formed on the cathode, it is preferred to use a hydrophobic binder comprising such fluororesin or the like, in a viewpoint that a polymer matrix afforded has an improved orientation property.

The collector of the cathode serves to efficiently supply electric current which is consumed in the buttery reaction upon charging and discharging or efficiently collect electric current generated. Thus, it is desired that the cathode collected is constituted by a material which is highly electrically conductive and which is inactive in the battery reaction. Such material can include metals such as Ni, Ti, Al, Pt, Pd, Au, and Zn, alloys of these metals such as stainless steel, and composite metals comprising two or more of the metals illustrated. The cathode collector may be configured in a desired form such as a plate form, a foil form, a mesh form, a sponge form, a fiber form, a punching metal form, or an expanded metal form.

Insulating Packing:

The gasket (506; see, FIG. 5) may be constituted by a fluororesin, a polyamide resin, a polysulfone resin, or a rubber material. The sealing of the battery may be conducted by way of glass-sealing, sealing using an adhesive, welding or soldering, besides the caulking using the insulating packing shown in the case shown in FIG. 5.

Battery Housing:

In the case of FIG. 5, the battery housing comprises the cathode can (505) and the anode can (504). Such battery housing preferably comprises a stainless steel because the cathode can (505) and the anode can (504) function to serve as the battery housing and also as the output terminals. In the case of FIG. 4, the battery housing functions to serve only as a sealing means to seal the battery, the battery housing may comprise a plastic member in a plate form or a film form or a composite member comprising a plastic material and a metallic material such as a laminate film obtained by laminating a metal foil or a deposited metal film by a plastic film.

In the case where the rechargeable battery of the present invention is a rechargeable lithium battery, it is more preferred to use a member which does not allow moisture or gas to pass through the member, and it is important that the rechargeable battery is sealed without having a portion which allows moisture to pass therethrough and invade into the inside of the battery.

In the following, the features and advantages of the present invention will be described in more detail with reference to Examples 1 to 16 relating to an ion conductor structural body of the present invention and Examples 17 to 22 relating to an rechargeable battery of the present invention. It should be understood that these examples are only for illustrative purposes and not intended to restrict the scope of the present invention to these examples.

In the following description, "part" and "%" are meant "part by weight" and "wt. %" respectively.

EXAMPLE 1

In this example, there was prepared an ion conductor structural body as will be described below.

5 parts of n-dodecylpolyethyleneglycol (the number of ethyleneoxide group: 20) acrylate having an alkyl group of 12 carbon atoms as the first monomer whose side chain having an alkyl group and a polyether group; 6 parts of polyethyleneglycol (the number of ethyleneoxide group: 9) methylmethacrylate as the second monomer; and 0.2 part of polyethyleneglycoldimethacrylate (the number of ethleneoxide group: 13) as the third monomer as a crosslinking agent were added to an electrolyte solution obtained by mixing 61 parts of propylene carbonate, 61 parts of ethylene carbonate and 13 parts of lithium tetrafluoroborate as an electrolyte to obtain a mixture.

The resultant mixture was heated to 40° C. and well agitated so that the ingredients were homogeneously dissolved in the solution to obtain a mixture solution. As a radical polymerization initiator, 0.002 parts of azobisisobutylonitrile were added to the mixture solution. Then the mixture solution was introduced into a cell (corresponding to the polymerization vessel 301 in FIG. 3) formed by arranging two quartz glass plates whose one side face having a fluororesin layer formed thereon such that their fluororesin layer-bearing faces are opposed to each other while forming a gap with a thickness of 50 μm between them and sealing their periphery by a spacer made of Teflon. Here, when the aqueous contact angle of the fluororesin layer-bearing face of each quartz glass plate was measured, it was found to be 117°. Then, the cell was heated at 70° C. for one hour, whereby the mixture solution in the cell was subjected to a polymerization treatment via a polymerization reaction, whereby a polymerized product was formed in the cell. The polymerized product was taken out from the cell to obtain a film-like ion conductor structural body having a size of 6 cm (width)×10 cm (length)×50 μm (thickness).

Examination

Examination was conducted of the film-like ion conductor structural body obtained in this example as will be described below.

A film sample obtained from the ion conductor structural body was analyzed by means of an infrared absorption spectrum analyzer, a nuclear magnetic resonance spectrum analyzer, and a mass spectrum analyzer. As a result, there was obtained a result which makes one capable to presume that the monomers would have polymerized at their mixing ratio in the initial mixing stage, whereby a crosslinking structure was afforded in the polymer matrix of the ion conductor structural body. For the confirmation purpose, a film sample obtained from the ion conductor structural body was gradually heated until 300° C. As a result, although oxidation was occurred, no fusion phenomenon was observed. From this, it could be confirmed that the polymer matrix of the ion conductor structural body contains a crosslinking structure chemically bonded thereto.

Using a polarization microscope, a film sample obtained from the ion conductor structural body was observed under cross polarized light from the Nicol prism. As a result, a change from the light field to the dark field was substantially uniformly observed over the entire film plane of the film-like ion conductor structural body (slight change was observed in the dark field when the light field is the largest), and there was observed a structure in that a polymer matrix is arranged in parallel to the film plane.

For a film sample obtained from the ion conductor structural body, the relaxation temperature of the side chain portion of the polymer chain was measured using a viscoelasticity measuring apparatus (DMS), and measurement by means of an X-ray small angle scattering measurement apparatus was performed from various directions including the parallel directions to the film plane (the Y axis direction and Y axis direction) and the thickness direction (the Z axis direction) at room temperature which is lower than the relaxation temperature of the side chain portion. In this measurement, the sample was adjusted so that the form thereof became constant to the measurement direction.

Figure 6:
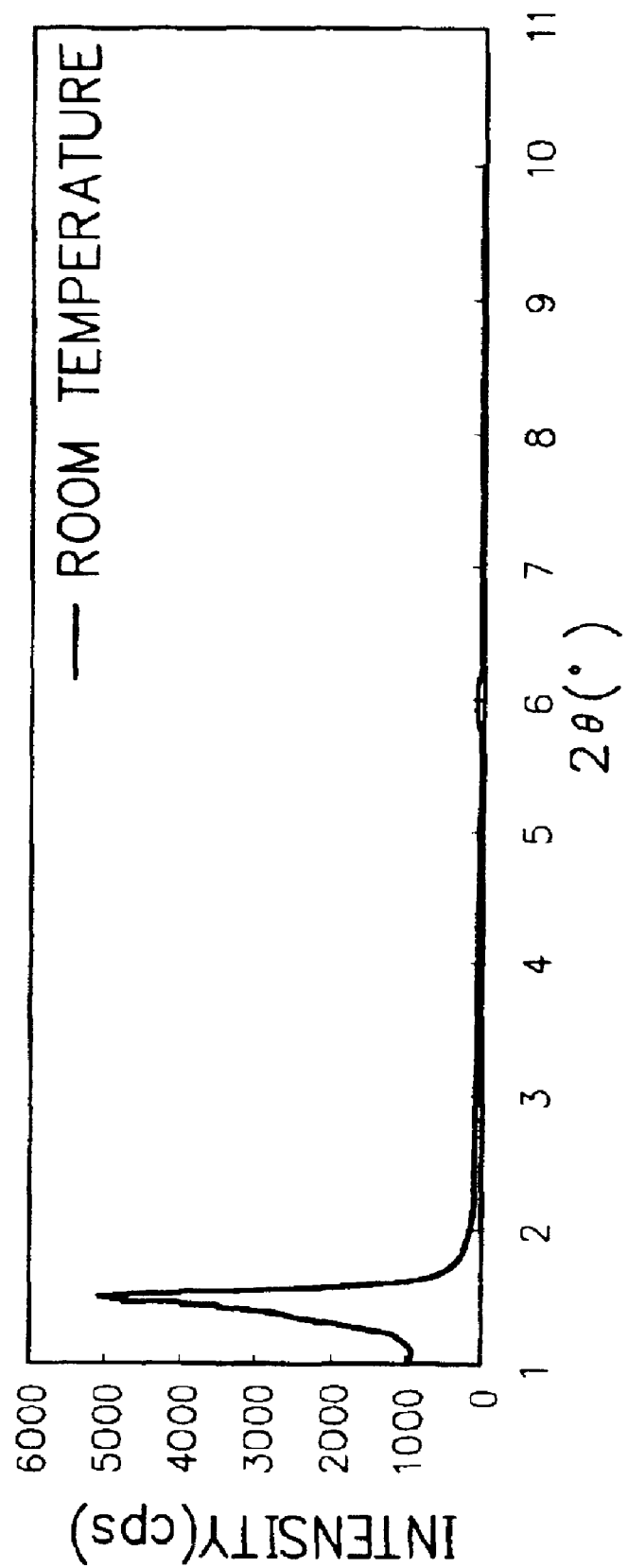
FIG. 6 shows a profile of an ion conductor structural body obtained in Example 1 which will be described later, measured by X-ray small angle scattering.

As a result, when the measurement was performed from the thickness direction (the Z axis direction) to the film plane, a peak as shown in FIG. 6 was appeared, and when the measurement was performed from other directions, although a peak was appeared at the same position, the intensity was significantly smaller than the peak intensity of the Z axis direction. Particularly, the peak intensity of the Z axis direction was 5 times that of the direction where the peak intensity was the weakest, in terms of a peak intensity ratio. In addition, for the direction along the X axis of the film face (the X axis direction), a peak was appeared at a position which is different from the position of the peak of FIG. 6, and the peak at this position was not appeared for other directions than the direction along the film plane (the X-Y plane direction). The peak intensity at this time was the strongest for the X axis direction and it was 8 times that for the direction where the peak intensity was weakest, in terms of a peak intensity ratio.

A film sample obtained from the ion conductor structural body was heated to 100° C. which is higher than the relaxation temperature of the side chain portion, where measurement was performed from the thickness direction (the Z axis direction) to the film plane in the same manner as described in the above. As a result, there was observed a change in that the peak intensity of the peak of FIG. 6 was diminished along with an increase in the temperature. This indicates that the orientation of the side chain portion (102) as shown in FIG. 1(a) is broken by the heating. Such a change was substantially not observed besides the direction perpendicular to the film plane.

The above results make it possible to consider such that in the ion conductor structural body obtained in this example, the main chain portion of the polymer chain is orientated in parallel to the film plane and the side chain portion of the polymer chain is orientated in the thickness direction to the film plane.

The results obtained are collectively shown in Table 1.

Further, a film sample (701) obtained from the ion conductor structural body was sandwiched between the two electrode plates 702 electrically connected to the impedance measuring apparatus 703 (comprising a mΩ meter) in the impedance measuring system shown in FIG. 7, and the resistance value of the sample 701 situated between the two electrode plates 702 was measured by inputting a voltage of 0.1 V and using a sine wave of 1 kHz as the measuring signal, whereby a resistance value (r) was obtained. The thickness (d) and the area (A) of the sample 701 situated between the two electrode plates 702 were measured. Then, in accordance with the equation: δ (ion conductivity)=d/(A×r), there was obtained an ion conductivity (δ) of the sample (the ion conductor structural body) in the thickness direction.

In addition, on a gap electrode [having an electrode-to-electrode width of W and a length (L)] prepared by superposing a patterning mask comprising a negative pattern for forming said gap electrode on a glass plate and depositing an aluminum thereon by means of electron beam deposition, and the above sample was contacted to the gap electrode, where a resistance value (r) of the sample was measured under condition of using 1 kHz for the measuring signal by the impedance measuring apparatus (comprising a mΩ meter), and the thickness (d) of the sample was measured, then in accordance with the equation: δ (ion conductivity)= W/(L×d×r), an ion conductivity (δ) of the ion conductor structural body in the plane direction was obtained.

The ion conductivity of the ion conductor structural body in the thickness direction was found to be 9 times that in the plane direction. The results obtained indicates that the ion conductor structural body has an anisotropy.

Separately, the ion conductivity of the ion conductor structural body at low temperature was measured. The measured ion conductivity was found to be superior to those of the ion conductor structural bodies obtained in comparative examples which will be described later.

The measured results are shown in Table 1.

EXAMPLES 2 TO 5

The procedures of Example 1 were repeated four times (Examples 2 to 5), except that instead of the n-dodecylpolyethyleneglycol (the number of ethyleneoxide group: 20) acrylate having an alkyl group of 12 carbon atoms as the first monomer whose side chain having an alkyl group and a polyether group, n-alkylpolyethyleneglycolacrylate which is different from the one used in Example 1 in terms of the number of carbon atom of the alkyl group was used in each case, to obtain a film-like ion conductor structural body in each case.

Particularly, in each of Examples 2 to 5, except for using 5 parts of n-hexylpolyethyleneglycol (the number of ethyleneoxide group: 20) acrylate [the number of carbon atom of alkyl group: 6] (Example 2), n-octylpolyethyleneglycol (the number of ethyleneoxide group: 20) acrylate [the number of carbon atom of alkyl group: 8] (Example 3), n-octadecylpolyethyleneglycol (the number of ethyleneoxide group: 20) acrylate [the number of carbon atom of alkyl group: 18] (Example 4), or n-tetracosanylpolyethyleneglycol(the number of ethyleneoxide group: 20) acrylate [the number of carbon atom of alkyl group: 24] (Example 5) as the first monomer, the procedures of Example 1 were repeated to obtain a film-like ion conductor structural body in each case.

Examination

Examination was conducted of each of the film-like ion conductor structural bodies obtained in Examples 2 to 5 as will be described below.

A film sample obtained from each of the ion conductor structural bodies was analyzed by means of an infrared absorption spectrum analyzer, a nuclear magnetic resonance spectrum analyzer, and a mass spectrum analyzer. As a result, there were obtained results which make one capable to presume that the monomers would have polymerized at their mixing ratio in the initial mixing stage, whereby a crosslinking structure was afforded in the polymer matrix of the ion conductor structural body. For the confirmation purpose, a film sample obtained from each of the ion conductor structural bodies was gradually heated until 300° C. As a result, although oxidation was occurred, no fusion phenomenon was observed. From this, it could be confirmed that the polymer matrix of each of the ion conductor structural bodies contains a crosslinking structure chemically bonded thereto.

As well as in Example 1, a film sample obtained from each of the ion conductor structural bodies was examined with respect to the orientation property using the polarization microscope, the viscoelasticity measuring apparatus (DMS), and the X-ray small angle scattering measurement apparatus. In each case, there were obtained results which make it possible to consider such that in the ion conductor structural body obtained in each example, the main chain portion of the polymer chain is orientated in parallel to the film plane and the side chain portion of the polymer chain is orientated in the thickness direction to the film plane.

Further, a film sample obtained from each of the ion conductor structural bodies was examined with respect to the ion conductivity in the same manner as in Example 1. In each case, there were obtained results indicating that the ion conductor structural body has an ion conductivity with an anisotropy. In addition, the ion conductivity of the film sample of each ion conductor structural body at low temperature was examined. As a result, each ion conductor structural body was found to have an ion conductivity which is superior to that of any of the ion conductor structural bodies obtained in comparative examples which will be described later.

The results obtained are collectively shown in Table 1.

Separately, for each of the ion conductor structural bodied obtained in Examples 1 to 5 and Comparative Example 2 which will be described later, correlation between the orientation degree (orientation property) of the side chain portion of the segment (whose side chain portion having the alkyl group and the polyether group) constituting the ion conductor structural body and the number of carbon atom of the alkyl group of said segment was examined. The results obtained are graphically shown in FIG. 8. The orientation degree of the side chain of the ion conductor structural body in FIG. 8 is a peak intensity ratio obtained in the following manner. That is, for each ion conductor structural body, there were measured peak intensities corresponding to the side chain portion of the segment constituting the ion conductor structural body for various directions by means of the X-ray small angle scattering measurement apparatus, and of the measured peak intensities, there was computed a ratio (a peak intensity ratio) of the peak intensity for the direction where the peak intensity is the strongest/the peak intensity for the direction where the peak intensity is the weakest.

FIG. 8 illustrates that the orientation property when the number of carbon atom of the alkyl group is more than 6 is superior to that when the number of carbon atom of the alkyl group is 1 (Comparative Example 2) and that when the number of carbon atom of the alkyl group is more than 8, the orientation property is more improved.

EXAMPLES 6 TO 10

The procedures of Example 1 were repeated five times (Examples 6 to 10), except that the mixture solution was prepared as will de described below, to obtain a film-like ion conductor structural body in each case.

Particularly, in each of Examples 6 to 10, 7 parts of n-dodecylpolyethyleneglycol (the number of ethyleneoxide group: 2) acrylate, n-dodecylpolyethyleneglycol (the number of ethyleneoxide group: 5) acrylate, n-dodecylpolyethyleneglycol (the number of ethyleneoxide group: 20) acrylate, n-dodecylpolyethyleneglycol-(the number of ethyleneoxide group: 30) acrylate, or n-dodecylpolyethyleneglycol (the number of ethyleneoxide group: 100) acrylate as the first monomer; 5 parts of polyethyleneglycol (the number of ethyleneoxide group: 9) ethylmethacrylate as the second monomer; and 0.4 parts of polyethyleneglycoldimethacrylate (the number of ethleneoxide group: 23) as the third monomer (as a crosslinking agent) were added to an electrolyte solution obtained by mixing 60 parts of diethoxyethane, 60 parts of ethylene carbonate and 15 parts of lithium hexafluorophosphate as an electrolyte to obtain a mixture. The resultant mixture was heated to 40° C. and well agitated so that the ingredients were homogeneously dissolved in the solution to obtain a mixture solution. Except for this, the procedures of Example 1 were repeated to obtain a film-like ion conductor structural body in each case.

Examination

Examination was conducted of each of the film-like ion conductor structural bodies obtained in Examples 6 to 10 as will be described below.

A film sample obtained from each of the ion conductor structural bodies was analyzed by means of an infrared absorption spectrum analyzer, a nuclear magnetic resonance spectrum analyzer, and a mass spectrum analyzer. As a result, there were obtained results which make one capable to presume that the monomers would have polymerized at their mixing ratio in the initial mixing stage, whereby a crosslinking structure was afforded in the polymer matrix of the ion conductor structural body. For the confirmation purpose, a film sample obtained from each of the ion conductor structural bodies was gradually heated until 300° C. As a result, although oxidation was occurred, no fusion phenomenon was observed. From this, it could be confirmed that the polymer matrix of each of the ion conductor structural bodies contains a crosslinking structure chemically bonded thereto.

As well as in Example 1, a film sample obtained from each of the ion conductor structural bodies was examined with respect to the orientation property using the polarization microscope, the viscoelasticity measuring apparatus (DMS), and the X-ray small angle scattering measurement apparatus. In each case, there were obtained results which make it possible to consider such that in the ion conductor structural body obtained in each example, the main chain portion of the polymer chain is orientated in parallel to the film plane and the side chain portion of the polymer chain is orientated in the thickness direction to the film plane.

Further, a film sample obtained from each of the ion conductor structural bodies was examined with respect to the ion conductivity in the same manner as in Example 1. In each case, there were obtained results indicating that the ion conductor structural body has an ion conductivity with an anisotropy. In addition, the ion conductivity of the film sample of each ion conductor structural body at low temperature was examined. As a result, each ion conductor structural body was found to have an ion conductivity which is superior to that of any of the ion conductor structural bodies obtained in comparative examples which will be described later.

The results obtained are collectively shown in Table 1.

Separately, for each of the ion conductor structural bodied obtained in Examples 6 to 10 and Comparative Example 3 which will be described later, correlation between the orientation degree (orientation property) of the side chain portion of the segment (whose side chain portion having the alkyl group and the polyether group) constituting the ion conductor structural body and the number of ethyleneoxide group of the polyether group of said segment was examined. The results obtained are graphically shown in FIG. 9. The orientation degree of the side chain of the ion conductor structural body in FIG. 9 is a peak intensity ratio obtained in the following manner. That is, for each ion conductor structural body, there were measured peak intensities corresponding to the side chain portion of the segment constituting the ion conductor structural body for various directions by means of the X-ray small angle scattering measurement apparatus, and of the measured peak intensities, there was computed a ratio (a peak intensity ratio) of the peak intensity for the direction where the peak intensity is the strongest/the peak intensity for the direction where the peak intensity is the weakest.

FIG. 9 illustrates that the orientation property when the number of ethyleneoxide group of the polyether group is more than 2 is superior to that when no ethyleneoxide is present (Comparative Example 3) and that when the number of ethyleneoxide group of the polyether group is more than 5, the orientation property is more improved.

EXAMPLES 11 TO 14

The procedures of Example 1 were repeated four times (Examples 11 to 14), except that the mixture solution was prepared as will de described below, to obtain a film-like ion conductor structural body in each case.

Particularly, in each of Examples 11 to 14, 10 parts of n-octadecyltetraethyleneglycolacrylate (the number of carbon atom of the alkyl group/the number of ethyleneoxide group=4.5), n-octadecyldiethyleneglycolacrylate (the number of carbon atom of the alkyl group/the number of ethyleneoxide group=9), n-dodecylpolyethyleneglycol (the number of ethyleneoxide group: 30) acrylate (the number of carbon atom of the alkyl group/the number of ethyleneoxide group=0.4), or n-octylpolyethyleneglycol (the number of ethyleneoxide group: 90) acrylate (the number of carbon atom of the alkyl group/the number of ethyleneoxide group=0.088) as the first monomer; 5 parts of tetraethyleneglycolbutylmethacrylate as the second monomer; and 0.2 part of polyethyleneglycoldimethacrylate (the number of ethleneoxide group: 13) as the third monomer (as a crosslinking agent) were added to an electrolyte solution obtained by mixing 61 parts of propylene carbonate, 61 parts of ethylene carbonate and 13 parts of lithium tetrafluoroborate as an electrolyte to obtain a mixture. The resultant mixture was heated to 40° C. and well agitated so that the ingredients were homogeneously dissolved in the solution to obtain a mixture solution. Except for this, the procedures of Example 1 were repeated to obtain a film-like ion conductor structural body in each case.

Examination

Examination was conducted of each of the film-like ion conductor structural bodies obtained in Examples 11 to 14 as will be described below.

A film sample obtained from each of the ion conductor structural bodies was analyzed by means of an infrared absorption spectrum analyzer, a nuclear magnetic resonance spectrum analyzer, and a mass spectrum analyzer. As a result, there were obtained results which make one capable to presume that the monomers would have polymerized at their mixing ratio in the initial mixing stage, whereby a crosslinking structure was afforded in the polymer matrix of the ion conductor structural body. For the confirmation purpose, a film sample obtained from each of the ion conductor structural bodies was gradually heated until 300° C. As a result, although oxidation was occurred, no fusion phenomenon was observed. From this, it could be confirmed that the polymer matrix of each of the ion conductor structural bodies contains a crosslinking structure chemically bonded thereto.

As well as in Example 1, a film sample obtained from each of the ion conductor structural bodies was examined with respect to the orientation property using the polarization microscope, the viscoelasticity measuring apparatus (DMS), and the X-ray small angle scattering measurement apparatus. In each case, there were obtained results which make it possible to consider such that in the ion conductor structural body obtained in each example, the main chain portion of the polymer chain is orientated in parallel to the film plane and the side chain portion of the polymer chain is orientated in the thickness direction to the film plane.

Further, a film sample obtained from each of the ion conductor structural bodies was examined with respect to the ion conductivity in the same manner as in Example 1. In each case, there were obtained results indicating that the ion conductor structural body has an ion conductivity with an anisotropy. In addition, the ion conductivity of the film sample of each ion conductor structural body at low temperature was examined. As a result, each ion conductor structural body was found to have an ion conductivity which is superior to that of any of the ion conductor structural bodies obtained in comparative examples which will be described later.

The results obtained are collectively shown in Table 1.

Separately, for each of the ion conductor structural bodied obtained in Examples 11 to 14 and Example 1 in which the number of carbon atom of the alkyl group/the number of ethyleneoxide group is 0.6, correlation between the orientation degree (orientation property) of the side chain portion of the segment (whose side chain portion having the alkyl group and the polyether group) constituting the ion conductor structural body and the ratio of the number of carbon atom of the alkyl group/the number of ethyleneoxide group of said segment was examined. The results obtained are graphically shown in FIG. 10. The orientation degree of the side chain of the ion conductor structural body in FIG. 10 is a peak intensity ratio obtained in the following manner. That is, for each ion conductor structural body, there were measured peak intensities corresponding to the side chain portion of the segment constituting the ion conductor structural body for various directions by means of the X-ray small angle scattering measurement apparatus, and of the measured peak intensities, there was computed a ratio (a peak intensity ratio) of the peak intensity for the direction where the peak intensity is the strongest/the peak intensity for the direction where the peak intensity is the weakest.

FIG. 10 illustrates that the orientation property is more improved when the ratio of the number of carbon atom of the alkyl group/the number of ethyleneoxide group is 0.6 or 4.5.

EXAMPLE 15

The procedures of Example 1 were repeated, except that instead of the cell, a retaining member prepared as will be described below was used, to obtain an ion conductor structural body.

90 parts of a natural graphite fine powder were heat-treated at 2000° C. in an argon gas stream and 10 parts of a polyvinylidene fluoride powder to obtain a mixture and the mixture was mixed with N-methyl-2-pyrrolidone to obtain a paste. The paste was coated on a surface of a copper foil, followed by drying at 150° C. under reduced pressure, whereby an electrode member having an electrode layer formed thereon was obtained. Here, when the aqueous contact angle of the electrode layer was examined, it was found to be 65°. In this way, there were obtained two electrode members. A porous film made of polyethylene was sandwiched between the two electrode members such that the electrode layer-bearing face of each electrode member was laminated on one of the opposite faces of the porous film, whereby a retaining member having a stacked structure was obtained. Then, a mixture solution (containing a radical polymerization initiator) prepared in accordance with the method of preparing the mixture solution in Example 1 and which was impregnated in the two electrode layers and the porous film of the retaining member. The retaining member thus treated was subjected to a polymerization treatment in the same manner as in Example 1. Thus, there was obtained a stacked film-like ion conductor structural body.

Examination

Examination was conducted of the stacked film-like ion conductor structural body obtained in this example as will be described below.

A stacked film-like sample obtained from the ion conductor structural body was analyzed by means of an infrared absorption spectrum analyzer, a nuclear magnetic resonance spectrum analyzer, and a mass spectrum analyzer. As a result, there were obtained results lead to a presumption that the monomers would have polymerized at their mixing ratio in the initial mixing stage, whereby a crosslinking structure was afforded in the polymer matrix of the ion conductor structural body. In order to confirm this presumption, a stacked film-like sample obtained from the ion conductor structural body was gradually heated up to 300° C. As a result, although oxidation occurred, no fusion phenomenon was observed. This confirmed that the polymer matrix of the ion conductor structural body contains a crosslinking structure chemically bonded thereto.

As well as in Example 1, a stacked film-like sample obtained from the ion conductor structural body was examined with respect to the orientation property using the polarization microscope, the viscoelasticity measuring apparatus (DMS), and the X-ray small angle scattering measurement apparatus. As a result, it is possible to consider that in the ion conductor structural body obtained in this example, the main chain portion of the polymer chain is orientated in parallel to the film plane and the side chain portion of the polymer chain is orientated in the thickness direction to the film plane.

Further, a s stacked film-like sample obtained from the ion conductor structural body was examined with respect to the ion conductivity in the same manner as in Example 1. As a result, there were obtained results indicating that the ion conductor structural body has an ion conductivity with an anisotropy. In addition, the ion conductivity of the sample of the ion conductor structural body at low temperature was examined. As a result, the ion conductor structural body was found to have an ion conductivity that is superior to that of the ion conductor structural body obtained in Comparative Example 4, which will be described later.

The results obtained are collectively shown in Table 1.

EXAMPLE 16

The procedures of Example 1 were repeated, except that the mixture solution was prepared as will be described below without using the second monomer, to obtain a film-like ion conductor structural body.

11 parts of n-nonylphenylpolyethyleneglycol polypropyleneglycol (the number of ethyleneoxide group: 10, the number of propyleneoxide group: 10) acrylate having an alkyl group of 9 carbon atoms as the first monomer whose side chain having an alkyl group and a polyether group; and 0.2 part of polyethyleneglycoldimethacrylate (the number of ethleneoxide group: 13) as the third monomer (as a crosslinking agent) were added to an electrolyte solution obtained by mixing 61 parts of propylene carbonate, 61 parts of ethylene carbonate and 13 parts of lithium tetrafluoroborate as an electrolyte to obtain a mixture.

The resultant mixture was heated to 40° C. and well agitated so that the ingredients were homogeneously dissolved in the solution to obtain a mixture solution. After this, following the procedures of Example 1, there was obtained a film-like ion conductor structural body.

Examination

Examination was conducted of the film-like ion conductor structural body obtained in this example as will be described below.

A film sample obtained from the ion conductor structural body was analyzed by means of an infrared absorption spectrum analyzer, a nuclear magnetic resonance spectrum analyzer, and a mass spectrum analyzer. As a result, there were obtained results which make one capable to presume that the monomers would have polymerized at their mixing ratio in the initial mixing stage, whereby a crosslinking structure was afforded in the polymer matrix of the ion conductor structural body. For the confirmation purpose, a film sample obtained from the ion conductor structural body was gradually heated until 300° C. As a result, although oxidation was occurred, no fusion phenomenon was observed. From this, it could be confirmed that the polymer matrix of the ion conductor structural body contains a crosslinking structure chemically bonded thereto.

As well as in Example 1, a film sample obtained from the ion conductor structural body was examined with respect to the orientation property using the polarization microscope, the viscoelasticity measuring apparatus (DMS), and the X-ray small angle scattering measurement apparatus. As a result, there were obtained results which make it possible to consider such that in the ion conductor structural body obtained in this example, the main chain portion of the polymer chain is orientated in parallel to the film plane and the side chain portion of the polymer chain is orientated in the thickness direction to the film plane.

Further, a film sample obtained from the ion conductor structural body was examined with respect to the ion conductivity in the same manner as in Example 1. As a result, there were obtained results indicating that the ion conductor structural body has an ion conductivity with an anisotropy. In addition, the ion conductivity of the film sample of the ion conductor structural body at low temperature was examined. As a result, the ion conductor structural body was found to have an ion conductivity which is superior to that of any of the ion conductor structural bodies obtained in comparative examples which will be described later.

The results obtained are collectively shown in Table 1.

COMPARATIVE EXAMPLE 1

The procedures of Example 1 were repeated, except that the first monomer was not used, to obtain a film-like ion conductor structural body.

11 parts of polyethyleneglycol (the number of ethyleneoxide group: 9) methylmethacrylate and 0.2 part of polyethyleneglycoldimethacrylate (the number of ethleneoxide group: 13) as a crosslinking agent were added to an electrolyte solution obtained by mixing 61 parts of propylene carbonate, 61 parts of ethylene carbonate and 13 parts of lithium tetrafluoroborate as an electrolyte to obtain a mixture. The resultant mixture was heated to 40° C. and agitated so that the ingredients were homogeneously dissolved in the solution to obtain a mixture solution. After this, following the procedures of Example 1, there was obtained a film-like ion conductor structural body.

Examination

Examination was conducted of the film-like ion conductor structural body obtained in this comparative example as will be described below.

As well as in Example 1, a film sample obtained from the ion conductor structural body was examined with respect to the orientation property using the polarization microscope, the viscoelasticity measuring apparatus (DMS), and the X-ray small angle scattering measurement apparatus. As a result, it was found that in the ion conductor structural body obtained in this comparative example, the main chain portion and the side chain portion of the polymer chain are not orientated. Further, a film sample obtained from the ion conductor structural body was examined with respect to the ion conductivity in the same manner as in Example 1. As a result, it was found that the ion conductivity in the thickness direction is substantially the same as that in the film plane direction.

The results obtained are collectively shown in Table 1.

COMPARATIVE EXAMPLE 2

The procedures of Example 1 were repeated, except that a monomer whose alkyl group comprising one carbon atom was used as the first monomer, to obtain a film-like ion conductor structural body.

5 parts of polyethyleneglycol (the number of ethyleneoxide group: 20) methylmethacrylate having an alkyl group of 1 carbon atom; 6 parts of polyethyleneglycol (the number of ethyleneoxide group: 9) methylmethacrylate; and 0.2 part of polyethyleneglycoldimethacrylate (the number of ethyleneoxide group: 13) as a crosslinking agent were added to an electrolyte solution obtained by mixing 61 parts of propylene carbonate, 61 parts of ethylene carbonate and 13 parts of lithium tetrafluoroborate as an electrolyte to obtain a mixture. The resultant mixture was heated to 40° C. and agitated so that the ingredients were homogeneously dissolved in the solution to obtain a mixture solution. After this, following the procedures of Example 1, there was obtained a film-like ion conductor structural body.

Examination

Examination was conducted of the film-like ion conductor structural body obtained in this comparative example as will be described below.

As well as in Example 1, a film sample obtained from the ion conductor structural body was examined with respect to the orientation property using the polarization microscope, the viscoelasticity measuring apparatus (DMS), and the X-ray small angle scattering measurement apparatus. As a result, it was found that in the ion conductor structural body obtained in this comparative example, the main chain portion and the side chain portion of the polymer chain are not orientated. Further, a film sample obtained from the ion conductor structural body was examined with respect to the ion conductivity in the same manner as in Example 1. As a result, it was found that the ion conductivity in the thickness direction is substantially the same as that in the film plane direction.

The results obtained are collectively shown in Table 1.

COMPARATIVE EXAMPLE 3

The procedures of Example 6 were repeated, except that dodecylacrylate was used as the first monomer, to obtain a film-like ion conductor structural body.

7 parts of dodecylacrylate; 5 parts of polyethyleneglycol (the number of ethyleneoxide group: 9) ethylmethacrylate; and 0.4 part of polyethyleneglycoldimethacrylate (the number of ethleneoxide group: 23) as a crosslinking agent were added to an electrolyte solution obtained by mixing 60 parts of diethoxyethane, 60 parts of ethylene carbonate and 15 parts of lithium hexafluorophosphate as an electrolyte to obtain a mixture. The resultant mixture was heated to 40° C. and well agitated so that the ingredients were homogenously dissolved in the solution to obtain a mixture solution. After this, following the procedures of Example 6, there was obtained a film-like ion conductor structural body.

Examination

Examination was conducted of the film-like ion conductor structural body obtained in this comparative example as will be described below.

As well as in Example 1, a film sample obtained from the ion conductor structural body was examined with respect to the orientation property using the polarization microscope, the viscoelasticity measuring apparatus (DMS), and the X-ray small angle scattering measurement apparatus. As a result, although the main chain portion and the side chain portion of the polymer chain of the ion conductor structural body were orientated, their orientation magnitudes were smaller than those in Example 6. Further, a film sample obtained from the ion conductor structural body was examined with respect to the ion conductivity in the same manner as in Example 1.

The results obtained are collectively shown in Table 1.

COMPARATIVE EXAMPLE 4

The procedures of Example 15 were repeated, except that as the mixture solution, a mixture solution prepared as described below was used, to obtain a stacked film-like ion conductor structural body.

11 parts of polyethyleneglycol (the number of ethyleneoxide group: 9) methylmethacrylate and 0.2 parts of polyethyleneglycoldimethacrylate (the number of ethleneoxide group: 13) as a crosslinking agent were added to an electrolyte solution obtained by mixing 61 parts of propylene carbonate, 61 parts of ethylene carbonate and 13 parts of lithium tetrafluoroborate as an electrolyte to obtain a mixture. The resultant mixture was heated to 40° C. and agitated so that the ingredients were homogeneously dissolved in the solution to obtain a mixture solution. Except for this, following the procedures of Example 15, there was obtained a stacked film-like ion conductor structural body.

Examination

Examination of the stacked film-like ion conductor structural body obtained in this comparative example was conducted as described below. As well as in Example 1, a sample obtained from the ion conductor structural body was examined with respect to the orientation property using the polarization microscope, the viscoelasticity measuring apparatus (DMS), and the X-ray small angle scattering measurement apparatus. As a result, it was found that in the ion conductor structural body obtained in this comparative example, the main chain portion and the side chain portion of the polymer chain are not orientated. Further, a sample obtained from the ion conductor structural body was examined with respect to the ion conductivity in the same manner as in Example 1. As a result, it was found that the ion conductivity in the thickness direction is substantially the same as that in the film plane direction.

The results obtained are collectively shown in Table 1.

COMPARATIVE EXAMPLE 5

There was prepared a film-like ion conductor structural body using a hydrophilic polymer without using a monomer.

Particularly, 10 parts of straight chain polyacrylonitrile, 40 parts of ethylene carbonate as a plasticizer, 40 parts of propylene carbonate also as a plasticizer, and 10 parts of lithium tetrafluoroborate as an electrolyte were mixed to obtain a mixture solution. The mixture solution was introduced into a cell formed by arranging two quartz glass plates whose one side face having a fluororesin layer formed thereon such that their fluororesin layer-bearing faces are opposed to each other while forming a gap with a thickness of 50 μm between them and sealing their periphery by a spacer made of Teflon. Then, the cell was cooled to 0° C. to obtain a film-like ion conductor structural body having a size of 6 cm (width)×10 cm (length)×50 μm (thickness).

Examination

Examination was conducted of the film-like ion conductor structural body obtained in this comparative example as will be described below.

As well as in Example 1, a film sample obtained from the ion conductor structural body was examined with respect to the orientation property using the polarization microscope, the viscoelasticity measuring apparatus (DMS), and the X-ray small angle scattering measurement apparatus. As a result, it was found that in the ion conductor structural body obtained in this comparative example, the main chain portion and the side chain portion of the polymer chain are not orientated. Further, a film sample obtained from the ion conductor structural body was examined with respect to the ion conductivity in the same manner as in Example 1. As a result, it was found that the ion conductivity in the thickness direction is substantially the same as that in the film plane direction.

The results obtained are collectively shown in Table 1.

Total Observation

Shown in Table 1 are normalized values of the orientation properties and the ion conductivities of the ion conductor structural bodies obtained in Examples 1 to 16 and Comparative Examples 1 to 5. Particularly, the values of Examples 2 to 16 and the values of Comparative Examples 1 to 5 are values normalized based on the values of Example 1.

Separately, in FIG. 11, there are graphically shown correlations between the ion conductivities and the temperature changes of the ion conductor structural bodies obtained in Examples 1 and 3 and Comparative Example 5. The ion conductivity values of each of said three examples in FIG. 11 are values obtained by comparing the ion conductivities of each ion conductor structural body in the thickness direction with respect to temperature changes with the ion conductivities of the ion conductor structural (of Comparative Example 1) in the thickness direction with respect to temperature changes.

As the graphs shown in FIG. 11 illustrate, it is understood that the ion conductivities of Example 1 and 3 particularly at low temperature are superior to those of Comparative Example 5 at low temperature.

TABLE 1

|  | monomer whose side chain has a alkyl group and polyether group | synthesis method (main different point from Example 1) | orientation property[*1] | | | | ion conductivity[*2] | | |
|---|---|---|---|---|---|---|---|---|---|
|  |  |  | side chain portion | | main chain portion | | | | |
|  |  |  | orientation property | peak intensity ratio | orientation direction | peak intensity ratio | ion conductivity at 25° C. | ion conductivity at −20° C. | anisotropic ion conductivity |
| Example 1 | dodecypolyethyleglycol (ethylene oxide number: 20) acrylate | alkyl group carbon number: 12 | thickness direction | 5 | film plane direction | 8 | 1 | 1 | 9 |
| Example 2 | hexylpolyethyleneglycol (ethylene oxide number: 20) acrylate | alkyl group carbon number: 6 | thickness direction | 2 | film plane direction | 4.5 | 0.8 | 0.8 | 7.5 |
| Example 3 | octylpolyethyleneglycol (ethylene oxide number: 20) acrylate | alkyl group carbon number: 8 | thickness direction | 4 | film plane direction | 5.5 | 0.9 | 0.8 | 8 |
| Example 4 | octadecylpolyethyleneglycol (ethylene oxide number: 20) acrylate | alkyl group carbon number: 18 | thickness direction | 6 | film plane direction | 8.5 | 1.1 | 0.9 | 9 |
| Example 5 | tetracosanyl polyethyleneglycol (ethylene oxide number: 20) acrylate | alkyl group carbon number: 24 | thickness direction | 6.2 | film plane direction | 9 | 0.8 | 0.8 | 7 |
| Example 6 | dodecylpolyethyleneglycol (ethylene oxide number: 2) acrylate | ethylene oxide number: 2 | thickness direction | 3.5 | film plane direction | 5.5 | 0.8 | 0.8 | 5.8 |
| Example 7 | dodecylpolyethyleneglycol (ethylene oxide number: 5) acrylate | ethylene oxide number: 5 | thickness direction | 5.5 | film plane direction | 6.5 | 0.9 | 0.9 | 7.8 |
| Example 8 | dodecylpolyethyleneglycol (ethylene oxide number: 20) acrylate | ethylene oxide number: 20 | thickness direction | 6 | film plane direction | 8 | 1 | 0.9 | 8.5 |
| Example 9 | dodecylpolyethyleneglycol (ethylene oxide number: 30) acrylate | ethylene oxide number: 30 | thickness direction | 5.8 | film plane direction | 7.5 | 0.9 | 0.8 | 8.2 |
| Example 10 | dodecylpolyethyleneglycol (ethylene oxide number: 100) acrylate | ethylene oxide number: 100 | thickness direction | 5 | film plane direction | 5.5 | 0.8 | 0.8 | 6.8 |
| Example 11 | octadecyltetraethyleneglycol acrylate | alkyl group carbon/number/ ethylene oxide number: 4.5 | thickness direction | 5.8 | film plane direction | 7.5 | 0.9 | 1 | 8.5 |
| Example 12 | octadecyldiethyleneglycol acrylate | alkyl group carbon number/ ethylene oxide number: 9 | thickness direction | 4 | film plane direction | 5.5 | 0.9 | 0.9 | 6.5 |
| Example 13 | dodecypolyethyleneglycol (ethylene oxide number: 30) acrylate | alkyl group carbon number/ ethylene oxide number: 0.4 | thickness direction | 4.5 | film plane direction | 5 | 0.9 | 0.9 | 7.1 |
| Example 14 | octylpolyethyleneglycol (ethylene oxide number: 90) acrylate | alkyl group carbon number/ ethylene oxide number: 0.088 | thickness direction | 2.5 | film plane direction | 4 | 0.8 | 0.8 | 5.1 |
| Example 15 | dodecypolyethyleneglycol (ethylene oxide number: 20) acrylate | electrode used | thickness direction | 4 | film plane direction | 4.4 | 0.9 | 0.9 | 5.9 |
| Example 16 | dodecypolyethyleneglycol (ethylene oxide number: 20) acrylate | polar group-bearing monomer is absent | thickness direction | 7 | film plane direction | 9 | 0.8 | 0.8 | 8.5 |
| Comparative Example 1 | none | monomer whose side chain has a alkyl group and | none | 1 | none | 1 | 0.3 | 0.4 | 1 |

TABLE 1-continued

| | monomer whose side chain has a alkyl group and polyether group | synthesis method (main different point from Example 1) | orientation property*1 | | | | ion conductivity*2 | | |
|---|---|---|---|---|---|---|---|---|---|
| | | | side chain portion | | main chain portion | | | | |
| | | | orientation property | peak intensity ratio | orientation direction | peak intensity ratio | ion conductivity at 25° C. | ion conductivity at −20° C. | anisotropic ion conductivity |
| Comparative Example 2 | polyethyleneglycol (ethylene oxide number: 20) methylmethacrylate | polyether group is absent alkyl group carbon number: 1 | none | 1 | none | 1 | 0.3 | 0.3 | 1 |
| Comparative Example 3 | none | dodecyl acrylate used | thickness direction | 2 | film plane direction | 3.5 | 0.6 | 0.6 | 3 |
| Comparative Example 4 | none | electrode used | none | 1 | none | 1 | 0.4 | 0.3 | 1 |
| Comparative Example 5 | none | polyacrylonitrile used | none | 1 | none | 1 | 0.3 | 0.3 | 1 |

NOTES in Table 1:
*1ORIENTATION PROPERTY
For a given ion conductor structural body, in accordance with the method described in Example 1, the measurement by the X-ray small angle measurement apparatus was conducted from various directions including the direction in parallel to the film plane and the thickness direction to the film plane, and the direction where the peaks corresponding to the side chain portion and the main chain became the strongest was made to the orientation direction. As the peak intensity, there was used a ratio of a peak intensity for the direction where a peak intensity became the strongest to a peak intensity for the direction where a peak intensity became the weakest.
*2ION CONDUCTIVITY
The ion conductivity was obtained in accordance with the method described in Example 1 wherein for a given ion conductor structural body, there are measured an impedance value in the thickness direction at 25° C. and that in the thickness direction at −20° C., and based on the resultant impedance values, there is computed an ion conductivity. The ion conductivities of Examples 2 to 16 and Comparative Examples 1 to 5 are normalized values based on the ion conductivity of Example 1.

The anisotropic conductivity was obtained by a manner wherein for a given ion conductor structural body, there were measured ion conductivities in the thickness direction and those in the film plane direction in accordance with the method described in Example 1, and based on the resultant ion conductivities, there is computed an anisotropic conductivity in accordance with the equation: the ion conductivity in a direction perpendicular to the film plane of the ion conductor structural body/the ion conductivity in a direction parallel to the film plane of the ion conductor structural body.

EXAMPLES 17 TO 19

Using the mixture solutions obtained in Examples 1, 4 and 9, there were three single-layer sheet type rechargeable batteries having such structure as shown in FIG. 4. Particularly, the mixture solution obtained in Example 1 was used in Example 17, the mixture solution obtained in Example 4 was used in Example 18, and the mixture solution obtained in Example 8 was used in Example 19. Each of the resultant rechargeable batteries was subjected to capacity test and charge-and-discharge test. As a result, each of the resultant rechargeable batteries was found to have a high capacity and a prolonged charge-and-discharge cycle life. The results are collectively shown in Table 2.

Specifically, each rechargeable battery was produced by a manner wherein an anode and a cathode are prepared, the anode and the cathode are affixed respectively one of the opposite faces of a retaining member comprising a porous film such that the anode and the cathode are opposed to each other through the retaining member to obtain an electrode stacked body, a mixture solution containing at least a monomer whose side chain having an alkyl group and a polyether group, a solvent and an electrolyte is impregnated between the anode and the cathode of the electrode stacked body, the electrode stacked body is enclosed and sealed by a moisture-proof film which comprises a laminate film comprising a polypropylene film/an aluminum foil/a polyethylenetrephthalate film, followed by subjecting a polymerization treatment.

The steps of producing each single-layer sheet type rechargeable battery will be described.
1. Preparation of Anode 404:

90 parts of a natural graphite fine powder heat-treated at 2000° C. in an argon gas stream and 10 parts of a polyvinylidene fluoride powder were mixed to obtain a mixture, and the mixture was mixed with 100 parts of N-methyl-2-pyrrolidone to obtain a paste. The paste was applied on a copper foil as a collector 402, followed by subjecting to drying at 150° C. under reduced pressure to form an anode active material layer 403. The collector 402 having the anode active material layer 403 formed thereon was cut into a piece having a prescribed size. A nickel lead was spot-welded to the collector of the resultant piece. Thus, there was obtained an anode 404. In this way, there were prepared three anodes 404.
2. Preparation of Cathode 407:

90 parts of a lithium cobaltate powder, 5 parts of an acetylene black powder, and 5 parts of a polyvinylidene fluoride powder were mixed to obtain a mixture. The mixture was mixed with 100 parts of N-methyl-2-pyrrolidone to obtain a paste. The paste was applied on an aluminum foil as a collector 406, followed by drying at 150° C. under reduced pressure to form a cathode active material layer 405 on the collector 406. The cathode active material layer 405 formed on the collector 406 was subjected to a press-forming treatment by means of a roll press. The resultant was cut into a piece having a prescribed size. An aluminum lead was ultrasonic-welded to the collector of the resultant piece. Thus, there was obtained a cathode 407. In this way, there were prepared three cathodes 407.
3. Fabrication of Single-layer Type Rechargeable Battery:

The fabrication of the rechargeable battery was conducted in an argon gas atmosphere.

EXAMPLE 17

The anode 404 obtained in the above step 1 and the cathode 407 obtained in the above step 2 were affixed respectively one of the opposite faces of a porous film made of polyethylene as a retaining member such that the anode active material layer 403 of the anode 404 and the cathode active material layer 405 of the cathode 407 were opposed to each other through the porous film, to obtain an electrode stacked body. A mixture solution prepared in accordance with the method of preparing the mixture solution in Example 1 was impregnated in between the anode and the cathode of the electrode stacked body. Then, the electrode stacked body was enclosed and sealed by a moisture-proof film which comprises a laminate film comprising a polypropylene film/an aluminum foil/a polyethylenetrephthalate film. The electrode stacked body thus sealed was subjected a polymerization treatment where the electrode stacked body was heated at 70 for one hour. Thus, there was obtained a single-layer sheet type rechargeable battery having such structure as shown in FIG. 4.

EXAMPLE 18

The anode 404 obtained in the above step 1 and the cathode 407 obtained in the above step 2 were affixed respectively one of the opposite faces of a porous film made of polyethylene as a retaining member such that the anode active material layer 403 of the anode 404 and the cathode active material layer 405 of the cathode 407 were opposed to each other through the porous film, to obtain an electrode stacked body. A mixture solution prepared in accordance with the method of preparing the mixture solution in Example 4 was impregnated in between the anode and the cathode of the electrode stacked body. Then, the electrode stacked body was enclosed and sealed by a moisture-proof film which comprises a laminate film comprising a polypropylene film/an aluminum foil/a polyethylenetrephthalate film. The electrode stacked body thus sealed was subjected a polymerization treatment where the electrode stacked body was heated at 70 for one hour. Thus, there was obtained a single-layer sheet type rechargeable battery having such structure as shown in FIG. 4.

EXAMPLE 19

The anode 404 obtained in the above step 1 and the cathode 407 obtained in the above step 2 were affixed respectively one of the opposite faces of a porous film made of polyethylene as a retaining member such that the anode active material layer 403 of the anode 404 and the cathode active material layer 405 of the cathode 407 were opposed to each other through the porous film, to obtain an electrode stacked body. A mixture solution prepared in accordance with the method of preparing the mixture solution in Example 8 was impregnated in between the anode and the cathode of the electrode stacked body. Then, the electrode stacked body was enclosed and sealed by a moisture-proof film which comprises a laminate film comprising a polypropylene film/an aluminum foil/a polyethylenetrephthalate film. The electrode stacked body thus sealed was subjected a polymerization treatment where the electrode stacked body was heated at 70 for one hour. Thus, there was obtained a single-layer sheet type rechargeable battery having such structure as shown in FIG. 4.

EXAMPLE 20

In this example, there was prepared a single-layer sheet type rechargeable battery having such structure as shown in FIG. 4 as will be described below.

1. Preparation of Anode 405 and Cathode 407:

There was prepared an anode 405 in the same manner described in the step 1 in Examples 17 to 19. Similarly, there was prepared a cathode 407 in the same manner described in the step 2 in Examples 17 to 19.

2. Treatment of the Anode and the Cathode:

There was provided a mixture solution prepared by mixing a mixture comprising 5 parts of n-dodecylpolyethyleneglycol(the number of ethyleneoxide group: 20) acrylate; 6 parts of polyethyleneglycol (the number of ethyleneoxide group: 9) methacrylate; 0.2 part of polyethyleneglycoldimethacrylate (the number of ethyleneoxide group: 13) as a crosslinking agent; and 0.04 part of 1-hydroxycyclohexylyphenylketone as a radical polymerization initiator with an electrolyte solution of 1 mole/dm$^3$ obtained by dissolving lithium tetrafluoroborate in a mixed solvent obtained by mixing propylene carbonate and dimethyl carbonate at a volume ratio of 1:1. 140 parts of the mixture solution were impregnated in the anode active material layer 403 of the anode 404, followed by subjecting to a polymerization treatment by irradiating ultraviolet light of 10 mW/cm$^2$ for one hour, whereby the anode active material layer 403 of the anode 404 was made to contain an ion conductor structural body formed therein. Similarly, 140 parts of the mixture solution were impregnated in the cathode active material layer 405 of the cathode 407, followed by subjecting to a polymerization treatment by irradiating ultraviolet light of 10 mW/cm$^2$ for one hour, whereby the cathode active material layer 405 of the cathode 407 was made to contain an ion conductor structural body formed therein.

3. Fabrication of Single-layer Type Rechargeable Battery:

The treated anode 404 obtained in the above step 2 and the treated cathode 407 obtained in the above step 2 were affixed respectively one of the opposite faces of a porous film made of polyethylene as a retaining member such that the anode active material layer 403 of the anode 404 and the cathode active material layer 405 of the cathode 407 were opposed to each other through the porous film, to obtain an electrode stacked body. A mixture solution prepared in accordance with the method of preparing the mixture solution in Example 1 was impregnated in between the anode and the cathode of the electrode stacked body. Then, the electrode stacked body was enclosed and sealed by a moisture-proof film which comprises a laminate film comprising a polypropylene film/an aluminum foil/a polyethylenetrephthalate film. The electrode stacked body thus sealed was subjected a polymerization treatment where the electrode stacked body was heated at 70 for one hour. Thus, there was obtained a single-layer sheet type rechargeable battery having such structure as shown in FIG. 4.

EXAMPLE 21

In this example, there was prepared a single-layer sheet type rechargeable battery having such structure as shown in FIG. 4 as will be described below.

1. Preparation of Anode 405 and Cathode 407:

There was prepared an anode 405 in the same manner described in the step 1 in Examples 17 to 19. Similarly, there was prepared a cathode 407 in the same manner described in the step 2 in Examples 17 to 19.

2. Fabrication of Single-layer Type Rechargeable Battery:

A coating liquid containing silica beads having an average particle size of 25 $\mu$m was coated on the surface of the anode active material layer 403 of the anode 404 obtained in the above 1 to form a spacer thereon. Then, the anode 404 thus treated and the cathode 407 obtained in the above step 1 were stacked such that the anode active material layer 404 (having the spacer thereon) of the anode 404 and the cathode active material layer 405 of the cathode 407 were opposed to each other, to obtain an electrode stacked body.

Separately, there was provided a mixture solution prepared by mixing a mixture comprising 7 parts of n-octadecylpolyethyleneglycol (the number of ethyleneoxide group: 10) acrylate; 4 parts of polyethyleneglycol (the number of ethyleneoxide group: 6) methylmethacrylate; 0.3 part of polyethyleneglycoldimethacrylate (the number of ethyleneoxide group: 23) as a crosslinking agent; and 0.002 part of azobisisobutylonitrile as a radical polymerization initiator with an electrolyte solution obtained by mixing 61 parts of diethyl carbonate, 61 parts of ethylene carbonate, and 13 parts of lithium hexafluorophosphate as an electrolyte.

The mixture solution was impregnated in between the anode 404 and the cathode 407 of the electrode stacked body. Then, the electrode stacked body was subjected to a polymerization treatment by heating the electrode stacked body at 70° C. for one hour.

The electrode stacked body thus subjected to the polymerization treatment was enclosed and sealed by a moisture-proof film which comprises a laminate film comprising a polypropylene film/an aluminum foil/a polyethylenetrephthalate film. Thus, there was obtained a single-layer sheet type rechargeable battery having such structure as shown in FIG. 4.

EXAMPLE 22

In this example, there was prepared a single-layer sheet type rechargeable battery having such structure as shown in FIG. 4 as will be described below.

1. Preparation of Anode 405 and Cathode 407:

There was prepared an anode 405 in the same manner described in the step 1 in Examples 17 to 19. Similarly, there was prepared a cathode 407 in the same manner described in the step 2 in Examples 17 to 19.

2. Treatment of the Anode and the Cathode:

There was provided a mixture solution prepared by mixing a mixture comprising 5 parts of n-dodecylpolyethyleneglycol (the number of ethyleneoxide group: 20) acrylate; 6 parts of polyethylene glycol (the number of ethyleneoxide group: 9) methacrylate; 0.2 part of polyethyleneglycoldimethacrylate (the number of ethyleneoxide group: 13) as a crosslinking agent; and 0.04 part of 1-hydroxycyclohexylyphenylketone as a radical polymerization initiator with an electrolyte solution of 1 mole/dm$^3$ obtained by dissolving lithium tetrafluoroborate in a mixed solvent obtained by mixing propylene carbonate and dimethyl carbonate at a volume ratio of 1:1. 140 parts of the mixture solution were impregnated in the anode active material layer 403 of the anode 404, followed by subjecting to a polymerization treatment by irradiating ultraviolet light of 10 mW/cm$^2$ for one hour, whereby the anode active material layer 403 of the anode 404 was made to contain an ion conductor structural body formed therein. Similarly, 140 parts of the mixture solution were impregnated in the cathode active material layer 405 of the cathode 407, followed by subjecting to a polymerization treatment by irradiating ultraviolet light of 10 mW/cm$^2$ for one hour, whereby the cathode active material layer 405 of the cathode 407 was made to contain an ion conductor structural body formed therein.

3. Fabrication of Single-layer Type Rechargeable Battery:

The treated anode 404 obtained in the above step 2 and the treated cathode 407 obtained in the above step 2 were affixed respectively one of the opposite faces of a film-like ion conductor structural body prepared in the same manner as in Example 1 to obtain an electrode stacked body.

The electrode stacked body was enclosed and sealed by a moisture-proof film which comprises a laminate film comprising a polypropylene film/an aluminum foil/a polyethylenetrephthalate film. Thus, there was obtained a single-layer sheet type rechargeable battery having such structure as shown in FIG. 4.

COMPARATIVE EXAMPLE 6 AND 7

Comparative Example 6

The procedures of Example 17 were repeated, except that the mixture solution used in the fabrication of single-layer type rechargeable battery was changed to a mixture solution prepared in the same manner of Comparative Example 1, to obtain a single-layer type rechargeable battery.

COMPARATIVE EXAMPLE 7

The procedures of Example 17 were repeated, except that the mixture solution used in the fabrication of single-layer type rechargeable battery was changed to a mixture solution prepared in the same manner of Comparative Example 2, to obtain a single-layer type rechargeable battery.

COMPARATIVE EXAMPLE 8

The procedures of Example 22 were repeated, except that the ion conductor structural body used therein was changed to an ion conductor structural body prepared in the same manner as in Comparative Example 1, to obtain a single-layer type rechargeable battery.

COMPARATIVE EXAMPLE 9

In this comparative example, there was prepared a single-layer type rechargeable battery as will be described below.

1. Preparation of Anode 405 and Cathode 407:

There was prepared an anode 405 in the same manner described in the step 1 in Examples 17 to 19. Similarly, there was prepared a cathode 407 in the same manner described in the step 2 in Examples 17 to 19.

2. Fabrication of Single-layer Type Rechargeable Battery:

The anode 404 obtained in the above step 1 and the cathode 407 obtained in the above step 1 were affixed respectively one of the opposite faces of a porous film made of polyethylene as a retaining member such that the anode active material layer 403 of the anode 404 and the cathode active material layer 405 of the cathode 407 were opposed to each other through the porous film, to obtain an electrode stacked body. Then, an electrolyte solution of 1 mole/dm$^3$ obtained by dissolving lithium tetrafluoroborate in a mixed solvent obtained by mixing propylene carbonate and dimethyl carbonate at a volume ratio of 1:1 was impregnated in between the anode and the cathode of the electrode stacked body. The electrode stacked body was enclosed and sealed by a moisture-proof film which comprises a laminate film comprising a polypropylene film/an aluminum foil/a polyethylenetrephthalate film. Thus, there was obtained a single-layer sheet type rechargeable battery.

Evaluation of Battery Characteristics

For each of the rechargeable batteries obtained in Examples 17 to 22 and Comparative Examples 6 to 9, evaluation was conducted with respect to battery characteristics, i.e., battery capacity, and charge-and-discharge cycle life in the following manner.

The evaluated results are collectively shown in Table 2. In Table 2, the values of Example 17 obtained in the evaluation are respectively set at 1, and the values of other examples and comparative examples are relative values to the values of Example 17.

1. Evaluation of Battery Capacity:

The battery capacity was evaluated by way of capacity test. In this test, there were performed (a) capacity test under ordinary environment with 25° C. and (b) capacity test under severe environment with −25° C. In the capacity test (a), battery capacity at 1C discharge and battery capacity at 3C discharge are evaluated.

The capacity test was performed through charging and discharging cycle test as will be described below.

(1) Capacity Test Under Environment with 25° C.:

A charging and discharging cycle wherein under environment with 25° C., the rechargeable battery is charged for 5 hours at a constant electric current of a value of 0.2 C (an electric current of 0.2 time a value of the capacity/the time, obtained on the basis of an electric capacitance calculated from the cathode active material of the rechargeable battery; in other words, an electric current value when the entire capacity of the rechargeable battery is charged or discharged at a constant electric current for 5 hours) then the rechargeable battery is discharged at the same electric current value until the battery voltage becomes 2.5 V is repeated 3 times (1st to 3rd cycles). After this, as 4th cycle, under environment with 25° C., the rechargeable battery is charged at a constant electric current of 0.2 C for 5 hours and it is discharged at a constant electric current value of 1 C (an electric current of 1 time a value of the capacity/the time, obtained on the basis of an electric capacitance calculated from the cathode active material of the rechargeable battery) until the battery voltage becomes 2.5 V.

A ratio of the discharged capacity (mAh) to the charged capacity (mAh) in the 4th cycle is calculated.

The resultant ratio is made to be "capacity at 1C discharge" and it is shown in Table 2.

After the 4th cycle, a charging and discharging cycle wherein under environment with 25° C., the rechargeable battery is charged at a constant electric current value of 0.2 for 5 hours and it is discharged at the same electric current value until the battery voltage becomes 2.5 V is repeated 3 times (5th to 7th cycles).

After this, as 8th cycle, under environment with 25° C., the rechargeable battery is charged at a constant electric current of 0.2 C for 5 hours and it is discharged at a constant electric current value of 3 C (an electric current of 3 times a value of the capacity/the time, obtained on the basis of an electric capacitance calculated from the cathode active material of the rechargeable battery) until the battery voltage becomes 2.5 V.

A ratio of the discharged capacity (mAh) to the charged capacity (mAh) in the 8th cycle is calculated.

The resultant ratio is made to be "capacity at 3C discharge" and it is shown in Table 2.

(2) Capacity Test Under Environment with −25° C.:

After the above 8th cycle, as 9th cycle, the rechargeable battery is charged at a constant electric current value of 0.2 C for five hours under environment with 25° C., after this, the rechargeable battery is cooled to −25° C., then the rechargeable battery is discharged at a constant electric current of 1 C until the battery voltage becomes 2.5 V under environment with −25° C.

A ratio of the discharged capacity (mAh) to the charged capacity (mAh) in the 9th cycle is calculated.

The resultant ratio is made to be "capacity at −25° C." and it is shown in Table 2.

2. Evaluation of charge-and-discharge cycle life:

The charge-and-discharge cycle life of the rechargeable battery is evaluated by the charging and discharging cycle test. The charging and discharging cycle test is conducted by repeating a cycle of alternately performing charging and discharging with a constant electric current value of 0.5 C (an electric current of 0.5 time a value of the capacity/the time, obtained on the basis of the discharged electricity quantity in the 3rd cycle in the above capacity test under environment with 25° C.) and taking a pause for 10 minutes. And the number of the charging and discharging cycles when the initial battery capacity becomes less than 60% is made to be a charge-and-discharge cycle life for the battery.

This result is shown in Table 2.

TABLE 2

| | capacity test at 25° C. | | capacity test at −20° C. | charge-and-discharge cycle life |
|---|---|---|---|---|
| | capacity at 1 C discharge | capacity at 3 C discharge | | |
| Example 17 | 1 | 1 | 1 | 1 |
| Example 18 | 1 | 1 | 0.9 | 1 |
| Example 19 | 1 | 1.1 | 1.1 | 1 |
| Example 20 | 1.1 | 1 | 1 | 1 |
| Example 21 | 1.1 | 1.1 | 1.1 | 1 |
| Example 22 | 1 | 0.9 | 1 | 0.9 |
| Comparative Example 6 | 0.8 | 0.5 | 0.6 | 0.8 |
| Comparative Example 7 | 0.9 | 0.5 | 0.4 | 0.8 |
| Comparative Example 8 | 0.7 | 0.4 | 0.5 | 0.7 |
| Comparative Example 9 | 1.2 | 1.3 | 1.2 | 1 |

What is claimed is:

1. A process for producing an ion conductor structural body comprising at least a polymer matrix, a solvent capable of functioning as a plasticizer and an electrolyte, said process comprising the steps of:
   (a) mixing (i) a monomer represented by the following general formula (3), (ii) a solvent, (iii) an electrolyte and (iv) a polymerization initiator to obtain a mixture;
   (b) subjecting said mixture to a polymerization treatment by way of a polymerization reaction to form a polymer matrix as said ion conductor structural body

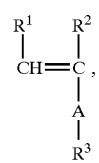

(3)

wherein $R^1$ and $R^2$ is respectively H or an alkyl group of 2 or less carbon atoms, A is a group containing at least a polyether group, and $R^3$ is a group having at least an alkyl group of 6 or more carbon atoms; and
   (c) a step of forming a crosslinking structure in said polymer matrix by a crosslinking reaction,
   wherein said crosslinking structure comprises a covalent bond.

2. A rechargeable battery comprising an anode, a cathode and an ion conductor structural body provided between said anode and said cathode, said anode having a face which is opposed to a face of said cathode, wherein said ion conductor structural body comprises an ion conductor structural body (i) which principally comprises a polymer matrix, a solvent capable of functioning as a plasticizer and an electrolyte, said polymer matrix comprising a polymer chain having at least a segment represented by the following general formula (1), a main chain portion of said polymer chain and a side chain portion of said segment having an orientation property, and said polymer matrix having a crosslinked structure, and said ion conductor structural body (i) is arranged such that an ion conductivity in a direction of connecting said face of said anode and said face of said cathode is increased

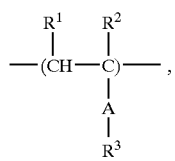
(1)

wherein $R^1$ and $R^2$ are respectively H or an alkyl group of 2 or less carbon atoms, A is a group having at least a polyether group, and $R^3$ is a group having at least a alkyl group of more than 6 carbon atoms, wherein said anode or/and said cathode contain said ion conductor structural body.

3. A process for producing a rechargeable battery comprising an anode, a cathode and an ion conductor structural body provided between said anode and said cathode, said anode having a face which is opposed to a face of said cathode, such that an ion conductivity in a direction of connecting said face of said anode and said face of said cathode is increased, the process comprising:

forming said anode and/or said cathode to contain said ion conductor structural body having a high ion conductivity and an excellent mechanical strength, principally comprising (a) a polymer matrix, (b) a solvent capable of functioning as a plasticizer and (c) an electrolyte; and arranging said ion conductor structural body between said anode and said cathode, wherein said polymer matrix (a) comprises a polymer chain having at least a segment represented by the following general formula (1), a main chain portion of said polymer chain and a side chain portion of said segment have an orientation property, and said polymer matrix has a crosslinked structure

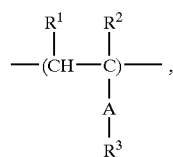
(1)

wherein $R^1$ and $R^2$ are respectively H or an alkyl group of 2 or less carbon atoms, A is a group having at least a polyether group, and $R^3$ is a group having at least a alkyl group of more than 6 carbon atoms.

4. The process according to claim 3, further including a step of forming said ion conductor structural body on said anode or/and said cathode and arranging the anode and the cathode so as to oppose to each other.

5. The process according to claim 3, wherein a solution containing at least one kind of a material selected from the group consisting of a polymer, a monomer and an oligomer which are capable of being starting materials for forming a polymer matrix of said ion conductor structural body is impregnated in an active material layer of said anode or/and an active material layer of said cathode and said polymer matrix is formed in said active material layer of said anode or/and said active material layer of said cathode.

6. The process according to claim 5, wherein the formation of said ion conductor structural body is performed by way of polymerization reaction or/and crosslinking reaction.

7. The process according to claim 5, wherein said anode or/and said cathode are formed by admixing said ion conductor structural body in an active material and disposing said active material on a collector.

* * * * *

UNITED STATES PATENT AND TRADEMARK OFFICE
CERTIFICATE OF CORRECTION

PATENT NO.     : 6,953,642 B2
DATED          : October 11, 2005
INVENTOR(S)    : Tomoya Yamamoto et al.

It is certified that error appears in the above-identified patent and that said Letters Patent is hereby corrected as shown below:

Title page,
Item [56], References Cited, FOREIGN PATENT DOCUMENTS, "JP 2000285751 * 10/2000" should read -- JP 2000-285751 * 10/2000 --.
Item [57], ABSTRACT,
Line 8, "structure." should read -- structure: --;
Line 11, "a" (second occurrence) should read -- an --; and
Line 12, "atoms.)" should read -- atoms). --.

Column 1,
Line 54, "has reported" should read -- has been reported --; and
Line 57, "been" should be deleted.

Column 2,
Line 38, "Documents" should read -- Document --.

Column 3,
Line 4, "are" should read -- is --.

Column 4,
Line 39, "structure." should read -- structure: --;
Line 51, "a" (second occurrence) should read -- an --; and
Line 52, "atoms.)" should read -- atoms). --.

Column 5,
Line 37, "an" should read -- a --; and
Line 67, "structure." should read -- structure: --.

Column 6,
Line 12, "a" (second occurrence) should read -- an --;
Line 13, "atoms.)" should read -- atoms). --;
Line 22, "provide" should read -- provides --; and
Line 67, "a" (first occurrence) should read -- an --.

Column 7,
Line 29, "(2)." should read -- (2): --;
Line 41, "group.)" should read -- group). --; and
Line 62, "combination two" should read -- combination of two --.

Column 8,
Line 11, "body." should read -- body: --;
Line 21, "is" should read -- are --;

UNITED STATES PATENT AND TRADEMARK OFFICE
CERTIFICATE OF CORRECTION

PATENT NO. : 6,953,642 B2
DATED : October 11, 2005
INVENTOR(S) : Tomoya Yamamoto et al.

It is certified that error appears in the above-identified patent and that said Letters Patent is hereby corrected as shown below:

Column 8 (cont'd),
Line 24, "atoms.)" should read -- atoms). --;
Line 38, "a" should read -- an --; and
Line 67, "(4)." should read -- (4): --.

Column 9,
Line 8, "is" should read -- are --;
Line 12, "group.)" should read -- group). --;
Line 31, "combination two" should read -- combination of two --; and
Line 43, "provide" should read -- provides --.

Column 10,
Line 33, "crosslingking" should read -- crosslinking --.

Column 11,
Line 3, "numerals" should read -- numeral --;
Line 15, "structurally" should read -- structural --;
Line 41, "starveling" should read -- traveling --; and
Line 67, "molecular" should read -- molecule --.

Column 12,
Line 4, "two-molecular" should read -- two-molecule --.

Column 13,
Line 9, "mean" should read -- means --; and
Line 20, "sate" should read -- state --.

Column 14,
Line 36, "a" should read -- an --; and
Line 66, "matrix)" should read -- matrix --.

Column 15,
Line 4, "is" should be deleted;
Line 5, "meant" should read -- means --; and
Line 28, "filed." should read -- field. --.

Column 16,
Line 37, "nor" should read -- or --; and
Line 51, "alky" should read -- alkyl --.

UNITED STATES PATENT AND TRADEMARK OFFICE
CERTIFICATE OF CORRECTION

PATENT NO. : 6,953,642 B2
DATED : October 11, 2005
INVENTOR(S) : Tomoya Yamamoto et al.

It is certified that error appears in the above-identified patent and that said Letters Patent is hereby corrected as shown below:

Column 19,
Line 28, "(6)." should read -- (6): --;
Line 43, "below.)" should read -- below). --; and
Line 51, "$E_n$," should read -- $E_j$, --.

Column 20,
Line 1, "is meant" should read -- means --; and
Line 6, "increase," should read -- increased, --.

Column 22,
Line 29, "nation two" should read -- nation of two --;
Line 37, "sufoxide" should read -- sulfoxide --; and
Line 40, "sulfuly" should read -- sulfuryl --.

Column 23,
Line 6, "to the" should read -- to improve the --;
Line 17, "an" should read -- a --; and
Line 38, "R3" should read -- $R^3$ --.

Column 26,
Line 42, "capable forming" should read -- capable of forming --.

Column 27,
Line 14, "contain" should read -- contains --;
Line 28, "to" should be deleted;
Line 56, "having described," should read -- having been described, --; and
Line 67, "a" (first occurrence) should read -- an --.

Column 28,
Line 29, "$R^3$is" should read -- $R^3$ is --.

Column 29,
Line 23, "tetraethyleneglycolethylyethermethacrylate," should read
-- tetraethyleneglycolethylethermethacrylate, --; and
Line 29, "an" (third occurrence) should read -- a --.

Column 30,
Line 29, "ethyleneglycoldimetacrylate" should read -- ethyleneglycoldimethacrylate --;
Line 35, "decanedioldimetacrylate" should read -- decanedioldimethacrylate --;
Line 36, "glycerindimetacrylate" should read -- glycerindimethacrylate --;
Line 53, "an" should read -- a --; and

UNITED STATES PATENT AND TRADEMARK OFFICE
CERTIFICATE OF CORRECTION

PATENT NO. : 6,953,642 B2
DATED : October 11, 2005
INVENTOR(S) : Tomoya Yamamoto et al.

It is certified that error appears in the above-identified patent and that said Letters Patent is hereby corrected as shown below:

Column 30 (cont'd),
Line 65, "formamido," should read -- formamide, --.

Column 33,
Line 8, "an" should be deleted.

Column 34,
Line 41, "staked" should read -- stacked --.

Column 35,
Line 30, "technique" should read -- techniques --;
Line 43, "buttery" should read -- battery --; and
Line 65, "compound" should read -- compounds --.

Column 36,
Line 32, "buttery" should read -- battery --.

Column 37,
Line 33, "parts" should read -- part --;
Line 34, "were" should read -- was --; and
Line 44, "117°" should read -- 117°C --.

Column 39,
Line 27, "indicates" should read -- indicate --.

Column 40,
Line 41, "bodied" should read -- bodies --.

Column 41,
Line 4, "de" should read -- be --;
Line 8, "acrylate," should read -- acrylate [Example 6], --;
Line 10, "n-dodecylpolyethyleneglycol" should read
-- [Example7], n-dodecylpolyethyleneglycol --;
Line 11, "acrylate, n-dodecylpolyethyleneglycol-(the" should read
-- acrylate [Example 8], n-dodecylpolyethyleneglycol (the --;
Line 12, "acrylate, or" should read -- acrylate [Example 9], or --; and
Line 14, "acrylate as" should read -- acrylate [Example 10] as --.

UNITED STATES PATENT AND TRADEMARK OFFICE
CERTIFICATE OF CORRECTION

PATENT NO.    : 6,953,642 B2
DATED         : October 11, 2005
INVENTOR(S)   : Tomoya Yamamoto et al.

It is certified that error appears in the above-identified patent and that said Letters Patent is hereby corrected as shown below:

Column 42,
Line 6, "bodied" should read -- bodies --;
Line 37, "de" should read -- be --;
Line 42, "group = 4.5)," should read -- group = 4.5) [Example 11], --;
Line 44, "group = 9)," should read -- 9 [Example 12], --;
Line 47, "group = 0.40), or" should read -- group = 0.4) [Example 13], or --; and
Line 50, "(0.088) as" should read -- 0.088 [Example 14] as --.

Column 43,
Line 42, "bodied" should read -- bodies --.

Column 44,
Line 23, "and" should be deleted;
Line 24, "which" should be deleted; and
Line 61, "s" should be deleted.

Column 47,
Line 34, "homogenously" should read -- homogeneously --; and
Line 45, "part" should read -- part --.

Column 49,
Table 1, line 17, "a" should read -- an --; and
Table 1, line 65, "a" should read -- an --.

Column 51,
Table 1, line 7, "a" should read -- an --; and
Line 59, "respectively one" should read -- respectively to one --.

Column 53,
Lines 4, 25 and 46, "respectively one" should read -- respectively to one --;
Lines 15, 36 and 57, "polyethylenetrephthalate" should read
-- polyethyleneterephthalate --;
Lines 18, 39 and 60, "70 for" should read -- 70°C. for --.

Column 54,
Line 35, "respectively one" should read -- respectively to one --;
Line 46, "polyethylenetrephthalate" should read -- polyethyleneterephthalate --; and
Line 49, "70 for" should read -- 70°C. for --.

UNITED STATES PATENT AND TRADEMARK OFFICE
CERTIFICATE OF CORRECTION

PATENT NO. : 6,953,642 B2
DATED : October 11, 2005
INVENTOR(S) : Tomoya Yamamoto et al.

It is certified that error appears in the above-identified patent and that said Letters Patent is hereby corrected as shown below:

Column 55,
Line 25, "polyethylentreph-" should read -- polyethylenetereph- --.

Column 56,
Lines 1 and 46, "respectively one" should read -- respectively to one --;
Line 7, "enetrephthalate" should read -- eneterephthalate --; and
Line 59, "ethylenetrephthalate" should read -- ethyleneterephthalate --.

Column 58,
Line 54, "is" should read -- are --.

Column 59,
Line 22, "a" (second occurrence) should read -- an --.

Column 60,
Line 16, "a" (second occurrence) should read -- an --; and
Line 36, "claim 5," should read -- claim 3, --.

Signed and Sealed this

Twenty-eighth Day of March, 2006

JON W. DUDAS
*Director of the United States Patent and Trademark Office*